United States Patent
Stephens et al.

(10) Patent No.: US 9,854,409 B2
(45) Date of Patent: Dec. 26, 2017

(54) USING PUSH NOTIFICATIONS TO TRIGGER AN ANNOUNCING UE TO UPDATE LOCATION INFO IN LTE DIRECT

(71) Applicant: QUALCOMM Incorporated, San Diego, CA (US)

(72) Inventors: Arthur Stephens, Georgetown, TX (US); Michaela Vanderveen, Tracy, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/607,009

(22) Filed: Jan. 27, 2015

(65) Prior Publication Data
US 2016/0088583 A1    Mar. 24, 2016

Related U.S. Application Data

(60) Provisional application No. 62/052,419, filed on Sep. 18, 2014.

(51) Int. Cl.
*H04W 24/00* (2009.01)
*H04W 4/06* (2009.01)
(Continued)

(52) U.S. Cl.
CPC .......... *H04W 4/06* (2013.01); *G06F 21/6209* (2013.01); *H04L 63/104* (2013.01); *H04W 4/005* (2013.01); *H04W 4/008* (2013.01); *H04W 4/02* (2013.01); *H04W 8/005* (2013.01); *H04W 64/00* (2013.01); *H04W 68/005* (2013.01); *H04W 76/023* (2013.01); *G06F 2221/2111* (2013.01); *G06F 2221/2141* (2013.01); *H04W 8/08* (2013.01); *H04W 8/18* (2013.01); *H04W 92/18* (2013.01)

(58) Field of Classification Search
CPC ...... H04W 64/00; H04W 4/008; H04W 8/005
USPC .................. 455/456.6, 456.1, 41.2
See application file for complete search history.

(56) References Cited

U.S. PATENT DOCUMENTS 8,000,719 B1 * 8/2011 Lambert ............... H04W 64/00
                                                    455/456.1
8,509,734 B1 * 8/2013 Gupta .................... G06Q 20/04
                                                    455/405

(Continued)

FOREIGN PATENT DOCUMENTS

| WO | 2009009355 A2 | 1/2009 |
| WO | 2014014327 A1 | 1/2014 |
| WO | 2014129450 A1 | 8/2014 |

OTHER PUBLICATIONS

3GPP TS 23.303V12.0.0 3rd Generation Partnership Project; Technical Specification Group Services and System Aspects; Proximity-based services (ProSe);Stage 2 (Release 12)(Feb. 2014).*

(Continued)

*Primary Examiner* — Charles Shedrick
(74) *Attorney, Agent, or Firm* — Arent Fox, LLP

(57) ABSTRACT

A method, an apparatus, and a computer program product for wireless communication are provided. The apparatus receives, from a second UE, a first signal including a first expression code associated with the second UE, and determines at least a second expression code using the first expression code, the at least a second expression code associated with the second UE.

22 Claims, 34 Drawing Sheets

(51) Int. Cl.
*H04W 4/02* (2009.01)
*H04W 4/00* (2009.01)
*H04W 8/00* (2009.01)
*H04W 64/00* (2009.01)
*H04W 68/00* (2009.01)
*H04W 76/02* (2009.01)
*H04L 29/06* (2006.01)
*G06F 21/62* (2013.01)
*H04W 92/18* (2009.01)
*H04W 8/08* (2009.01)
*H04W 8/18* (2009.01)

(56) References Cited

U.S. PATENT DOCUMENTS

| | | | |
|---|---|---|---|
| 2005/0235056 A1* | 10/2005 | Chen | H04L 67/22 709/223 |
| 2005/0246769 A1* | 11/2005 | Bao | H04L 63/08 726/16 |
| 2007/0013584 A1 | 1/2007 | Camp, Jr. et al. | |
| 2009/0016248 A1 | 1/2009 | Li et al. | |
| 2010/0205316 A1* | 8/2010 | Xue | H04L 63/062 709/229 |
| 2010/0279706 A1* | 11/2010 | Dicke | H04M 1/72572 455/456.1 |
| 2012/0015668 A1* | 1/2012 | Mgrdechian | G06Q 30/0207 455/456.1 |
| 2012/0106738 A1* | 5/2012 | Belenkiy | H04L 9/0872 380/270 |
| 2013/0035114 A1* | 2/2013 | Holden | H04W 4/028 455/456.3 |
| 2013/0281121 A1* | 10/2013 | Poppleton | H04W 64/00 455/456.2 |
| 2013/0295968 A1* | 11/2013 | Nielsen | H04L 67/18 455/456.3 |
| 2013/0324114 A1* | 12/2013 | Raghothaman | H04W 76/023 455/426.1 |
| 2014/0004796 A1* | 1/2014 | Cakulev | H04W 76/023 455/41.2 |
| 2014/0018102 A1* | 1/2014 | Brewer | H04W 8/18 455/456.2 |
| 2014/0164761 A1* | 6/2014 | Kufluk | H04L 63/10 713/155 |
| 2014/0341121 A1 | 11/2014 | Chang et al. | |
| 2014/0342735 A1* | 11/2014 | Liao | H04W 8/04 455/435.1 |
| 2015/0289127 A1* | 10/2015 | Ou | H04W 8/005 455/426.1 |
| 2016/0007304 A1 | 1/2016 | Morita | |
| 2016/0088586 A1 | 3/2016 | Stephens et al. | |

OTHER PUBLICATIONS

Huawei, et al., "Architecture Consideration for Proximity Services with Infrastructure", 3GPP Draft, S2-130122, 3rd Generation Partnership Project (3GPP), Mobile Competence Centre, 650, Route Des Lucioles, F-06921 Sophia-Antipolis Cedex, France, vol. SA WG2, No. Prague, Czech Republic, Jan. 28, 2013-Feb. 1, 2013, Jan. 22, 2013 (Jan. 22, 2013), pp. 1-4, XP050684684; Retrieved from the Internet: URL: http://www.3gpp.org/ftp/tsg_sa/WG2_Arch/TSGS2_95_Prague/Docs/ [retrieved on Jan. 22, 2013].
International Search Report and Written Opinion—PCT/US2015/050469—ISA/EPO—dated Jan. 5, 2016.

\* cited by examiner

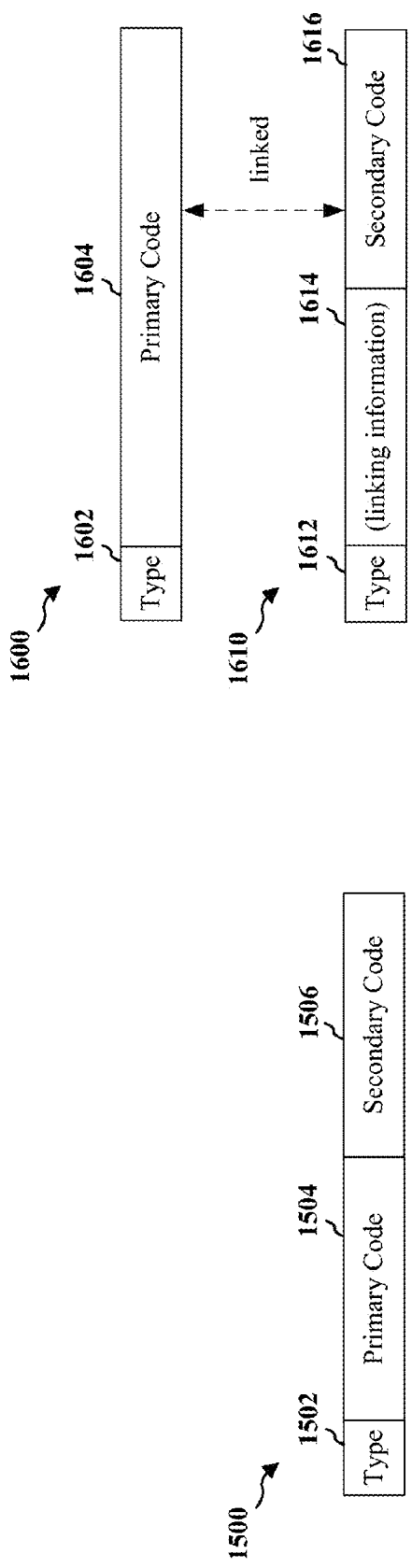

US 9,854,409 B2

USING PUSH NOTIFICATIONS TO TRIGGER AN ANNOUNCING UE TO UPDATE LOCATION INFO IN LTE DIRECT

CROSS-REFERENCE TO RELATED APPLICATION(S)

This application claims the benefit of U.S. Provisional Application Ser. No. 62/052,419, entitled "USING PUSH NOTIFICATIONS TO TRIGGER AN ANNOUNCING UE TO UPDATE LOCATION INFO IN LTE DIRECT" and filed on Sep. 18, 2014, which is expressly incorporated by reference herein in its entirety.

BACKGROUND

Field

The present disclosure relates generally to communication systems, and more particularly, to using push notifications to trigger an announcing user equipment (UE) to update location info in LTE Direct.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. For example, the apparatus may be a network device. In an aspect, the method performed by the network device includes receiving, from a first user equipment (UE), a request for information associated with a discovered second UE, the information comprising location information associated with the second UE, determining whether the first UE is authorized to receive the location information, and sending a message configured to initiate reporting of the location information by the second UE based on the determination.

In an aspect, the request for the location information is received in a match report message from the first UE.

In an aspect, the method further includes receiving the location information from a second network device or from the second UE, and sending the location information to the first UE.

In an aspect, the location information is sent to the first UE in a match report acknowledgment message.

In an aspect, the location information received from the second UE is included in metadata associated with the second UE.

In an aspect, the method further includes sending, to the first UE, a message comprising a location-carrying code to be announced by the second UE along with the location information, or a security key to enable determination of the location information to be announced by the second UE.

In an aspect, the network device includes means for receiving, from a first UE, a request for information associated with a discovered second UE, the information comprising location information associated with the second UE, means for determining whether the first UE is authorized to receive the location information, and means for sending a message configured to initiate reporting of the location information by the second UE based on the determination.

In an aspect, the request for the location information is received in a match report message from the first UE.

In an aspect, the network device further includes means for receiving the location information from a second network device or from the second UE, and means for sending the location information to the first UE.

In an aspect, the location information is sent to the first UE in a match report acknowledgment message.

In an aspect, the location information received from the second UE is included in metadata associated with the second UE.

In an aspect, the network device further includes means for sending, to the first UE, a message comprising a location-carrying code to be announced by the second UE along with the location information, or a security key to enable determination of the location information to be announced by the second UE.

In an aspect, the network device includes a memory and at least one processor coupled to the memory and configured to receive, from a first UE, a request for information associated with a discovered second UE, the information comprising location information associated with the second UE, determine whether the first UE is authorized to receive the location information, and send a message configured to initiate reporting of the location information by the second UE based on the determination.

In an aspect, the request for the location information is received in a match report message from the first UE.

In an aspect, the at least one processor further configured to receive the location information from a second network device or from the second UE, and send the location information to the first UE.

In an aspect, the location information is sent to the first UE in a match report acknowledgment message.

In an aspect, the location information received from the second UE is included in metadata associated with the second UE.

In an aspect, the at least one processor further configured to send, to the first UE, a message comprising a location-carrying code to be announced by the second UE along with the location information, or a security key to enable determination of the location information to be announced by the second UE.

In an aspect, a computer program product stored on a computer-readable medium includes code that when executed on at least one processor performs the steps of receiving, from a first user equipment (UE), a request for information associated with a discovered second UE, the information comprising location information associated with the second UE, determining whether the first UE is authorized to receive the location information, sending a message configured to initiate reporting of the location information by the second UE based on the determination.

In an aspect of the disclosure, a method, a computer program product, and an apparatus are provided. For example, the apparatus may be a first UE. In an aspect, the method performed by the first UE includes discovering a second UE through a proximity service (ProSe) discovery, Bluetooth Low-Energy (BTLE) discovery, or Wi-Fi Alliance Neighbor-aware Networking (WFA NAN) discovery, sending, to a network device, a request for location information associated with the second UE, and receiving the location information when the first UE is authorized to receive the location information.

In an aspect, the request for the location information is sent to the network device in a match report message.

In an aspect, the location information is received from the network device in a match report acknowledgment message.

In an aspect, the location information is received from the second UE in a broadcast message. In such aspect, the method further includes receiving, from the network device, a message comprising a location-carrying code to be announced by the second UE along with the location information, and processing the broadcast message using the location-carrying code.

In an aspect, the location information is received from the second UE in a broadcast message, the location information being protected with a security key. In such aspect, the method further includes receiving, from the network device, a message comprising the security key, and processing the broadcast message announced by the second UE using the security key to determine the location information.

In an aspect, the network device is a ProSe function server.

In an aspect, the first UE includes means for discovering a second UE through a ProSe discovery, BTLE discovery, or WFA NAN discovery, means for sending, to a network device, a request for location information associated with the second UE, and means for receiving the location information when the first UE is authorized to receive the location information.

In an aspect, the request for the location information is sent to the network device in a match report message.

In an aspect, the location information is received from the network device in a match report acknowledgment message.

In an aspect, the location information is received from the second UE in a broadcast message. In such aspect, the first UE further includes means for receiving, from the network device, a message comprising a location-carrying code to be announced by the second UE along with the location information, and means for processing the broadcast message using the location-carrying code.

In an aspect, the location information is received from the second UE in a broadcast message, the location information being protected with a security key. In such aspect, the first UE further includes means for receiving, from the network device, a message comprising the security key, and means for processing the broadcast message announced by the second UE using the security key to determine the location information.

In an aspect, the network device is a proximity services (ProSe) function server.

In an aspect, a first UE includes a memory and at least one processor coupled to the memory and configured to discover a second UE through a ProSe discovery, BTLE discovery, or WFA NAN discovery, send, to a network device, a request for location information associated with the second UE, and receive the location information when the first UE is authorized to receive the location information.

In an aspect, the request for the location information is sent to the network device in a match report message.

In an aspect, the location information is received from the network device in a match report acknowledgment message.

In an aspect, the location information is received from the second UE in a broadcast message. In such aspect, the at least one processor is further configured to receive, from the network device, a message comprising a location-carrying code to be announced by the second UE along with the location information, and process the broadcast message using the location-carrying code.

In an aspect, the location information is received from the second UE in a broadcast message, the location information being protected with a security key. In such aspect, the at least one processor further configured to receive, from the network device, a message comprising the security key, and process the broadcast message announced by the second UE using the security key to determine the location information.

In an aspect, the network device is a proximity services (ProSe) function server.

In an aspect, a computer program product stored on a computer-readable medium includes code that when executed on at least one processor performs the steps of discovering a second UE through a ProSe discovery, BTLE discovery, or WFA NAN discovery, sending, to a network device, a request for location information associated with the second UE, receiving the location information when the first UE is authorized to receive the location information.

In an aspect of the disclosure, a method, a computer program product, and an apparatus are provided. For example, the apparatus may be a first UE. In an aspect, the method performed by the first UE includes receiving, from a second UE, a first signal comprising a first expression code associated with the second UE, determining at least a second expression code using the first expression code, the at least a second expression code associated with the second UE.

In an aspect, determining the at least a second expression code comprises receiving, from the second UE, a second signal comprising a first prefix and the at least a second expression code, applying a function to the first expression code to generate a second prefix, comparing the second prefix to the first prefix, and determining the at least a second expression code in the second signal when the second prefix matches the first prefix.

In an aspect, the determining the at least a second expression code includes sending the first expression code to a network device, and receiving the at least a second expression code associated with the second UE from the network device.

In an aspect, the first signal including the first expression code is received in a first discovery resource and the second signal comprising the at least a second expression code is received in a second discovery resource, wherein the first discovery resource is independent of the second discovery resource.

In an aspect, the function is a hash function.

In an aspect, the first expression code is sent to the network device in a match report message.

In an aspect, the network device is a ProSe Function.

In an aspect, at least one of the first expression code and the at least a second expression code corresponds to a service of the second UE or an application of the second UE.

In an aspect, the first UE includes means for receiving, from a second UE, a first signal comprising a first expression code associated with the second UE, and means for determining at least a second expression code using the first expression code, the at least a second expression code associated with the second UE.

In an aspect, the means for determining the at least a second expression code is configured to receive, from the second UE, a second signal comprising a first prefix and the at least a second expression code, apply a function to the first expression code to generate a second prefix, compare the second prefix to the first prefix, and determine the at least a second expression code in the second signal when the second prefix matches the first prefix.

In an aspect, the means for determining the at least a second expression code is configured to send the first expression code to a network device, and receive the at least a second expression code associated with the second UE from the network device.

In an aspect, the first signal including the first expression code is received in a first discovery resource and the second signal comprising the at least a second expression code is received in a second discovery resource, wherein the first discovery resource is independent of the second discovery resource.

In an aspect, the function is a hash function.

In an aspect, the first expression code is sent to the network device in a match report message.

In an aspect, the network device is a ProSe Function.

In an aspect, at least one of the first expression code and the at least a second expression code corresponds to a service of the second UE or an application of the second UE.

In an aspect, the first UE includes a memory and at least one processor coupled to the memory and configured to receive, from a second UE, a first signal comprising a first expression code associated with the second UE, and determine at least a second expression code using the first expression code, the at least a second expression code associated with the second UE.

In an aspect, the at least one processor determines the at least a second expression code by receiving, from the second UE, a second signal comprising a first prefix and the at least a second expression code, applying a function to the first expression code to generate a second prefix, comparing the second prefix to the first prefix, determining the at least a second expression code in the second signal when the second prefix matches the first prefix.

In an aspect, the at least one processor determines the at least a second expression code by sending the first expression code to a network device, and receiving the at least a second expression code associated with the second UE from the network device.

In an aspect, the first signal including the first expression code is received in a first discovery resource and the second signal comprising the at least a second expression code is received in a second discovery resource, wherein the first discovery resource is independent of the second discovery resource.

In an aspect, the function is a hash function.

In an aspect, the first expression code is sent to the network device in a match report message.

In an aspect, the network device is a ProSe Function.

In an aspect, at least one of the first expression code and the at least a second expression code corresponds to a service of the second UE or an application of the second UE.

In an aspect, a computer program product stored on a computer-readable medium comprises code that when executed on at least one processor performs the steps of receiving, at a first UE from a second UE, a first signal comprising a first expression code associated with the second UE, and determining at least a second expression code using the first expression code, the at least a second expression code associated with the second UE.

In an aspect of the disclosure, a method, a computer program product, and an apparatus are provided. For example, the apparatus may be a network device. In an aspect, the method performed by the network device includes receiving a first expression code from a first UE, the first expression code associated with a second UE, identifying at least a second expression code using the first expression code, the at least a second expression code associated with the second UE, sending, to the first UE, the at least a second expression code associated with the second UE.

In an aspect, the method further includes determining metadata associated with the first expression code, and sending the determined metadata to the first UE.

In an aspect, the first expression code is received in a match report message from the first UE.

In an aspect, the network device is a ProSe Function.

In an aspect, the network device includes means for receiving a first expression code from a first UE, the first expression code associated with a second UE, means for identifying at least a second expression code using the first expression code, the at least a second expression code associated with the second UE, means for sending, to the first UE, the at least a second expression code associated with the second UE.

In an aspect, the network device includes means for determining metadata associated with the first expression code, and means for sending the determined metadata to the first UE.

In an aspect, first expression code is received in a match report message from the first UE.

In an aspect, the network device is a ProSe Function.

In an aspect, the network device includes a memory, and at least one processor coupled to the memory and configured to receive a first expression code from a first UE, the first expression code associated with a second UE, identify at least a second expression code using the first expression code, the at least a second expression code associated with the second UE, and send, to the first UE, the at least a second expression code associated with the second UE.

In an aspect, the at least one processor is further configured to determine metadata associated with the first expression code, and send the determined metadata to the first UE.

In an aspect, the first expression code is received in a match report message from the first UE.

In an aspect, the network device is a ProSe Function.

In an aspect, a computer program product stored on a computer-readable medium includes code that when executed on at least one processor performs the steps of receiving a first expression code from a first user equipment (UE), the first expression code associated with a second UE, identifying at least a second expression code using the first expression code, the at least a second expression code associated with the second UE; and sending, to the first UE, the at least a second expression code associated with the second UE.

In an aspect of the disclosure, a method, a computer program product, and an apparatus are provided. For example, the apparatus may be an announcing UE. In an aspect, the method performed by the announcing UE includes determining a first location of the announcing UE when the announcing UE is stationary, transmitting a first signal comprising a first expression code, the first expression code associated with first metadata stored in a server, the first metadata indicating the first location, determining a second location of the announcing UE when the announcing UE is moving, updating the first metadata stored in the server with second metadata, transmitting a second signal comprising a second expression code, the second expression code associated with the second metadata, transmitting a third signal comprising a third expression code, the third expression code indicating the second location, wherein the second metadata is configured to enable decoding of the third expression code.

In an aspect, the method further includes determining a third location of the announcing UE when the announcing UE is no longer moving, updating the second metadata stored in the server with third metadata, the third metadata indicating the third location, and transmitting a fourth signal comprising a fourth expression code, the fourth expression code associated with the third metadata.

In an aspect, at least one of the first, second, third, and fourth expression codes comprises a ProSe Expression Code that corresponds to a ProSe Application Name.

In an aspect, at least one of the first metadata indicating the first location or the third expression code indicating the second location comprises geographic coordinates.

In an aspect, the third expression code comprises a private expression, and wherein the second metadata comprises at least one of a code and key information configured to enable matching and decoding of the private expression.

In an aspect, the announcing UE includes means for determining a first location of the announcing UE when the announcing UE is stationary, means for transmitting a first signal comprising a first expression code, the first expression code associated with first metadata stored in a server, the first metadata indicating the first location, means for determining a second location of the announcing UE when the announcing UE is moving, means for updating the first metadata stored in the server with second metadata, means for transmitting a second signal comprising a second expression code, the second expression code associated with the second metadata, and means for transmitting a third signal comprising a third expression code, the third expression code indicating the second location, wherein the second metadata is configured to enable decoding of the third expression code.

In an aspect, the announcing UE further includes means for determining a third location of the announcing UE when the announcing UE is no longer moving, means for updating the second metadata stored in the server with third metadata, the third metadata indicating the third location, and means for transmitting a fourth signal comprising a fourth expression code, the fourth expression code associated with the third metadata.

In an aspect, at least one of the first, second, third, and fourth expression codes comprises a ProSe Expression Code that corresponds to a ProSe Application Name.

In an aspect, at least one of the first metadata indicating the first location or the third expression code indicating the second location comprises geographic coordinates.

In an aspect, the third expression code comprises a private expression, and wherein the second metadata comprises at least one of a code and key information configured to enable matching and decoding of the private expression.

In an aspect, an announcing UE includes a memory, and at least one processor coupled to the memory and configured to determine a first location of the announcing UE when the announcing UE is stationary, transmit a first signal comprising a first expression code, the first expression code associated with first metadata stored in a server, the first metadata indicating the first location, determine a second location of the announcing UE when the announcing UE is moving, update the first metadata stored in the server with second metadata, transmit a second signal comprising a second expression code, the second expression code associated with the second metadata, and transmit a third signal comprising a third expression code, the third expression code indicating the second location, wherein the second metadata is configured to enable decoding of the third expression code.

In an aspect, the at least one processor further configured to determine a third location of the announcing UE when the announcing UE is no longer moving, update the second metadata stored in the server with third metadata, the third metadata indicating the third location, and transmit a fourth signal comprising a fourth expression code, the fourth expression code associated with the third metadata.

In an aspect, at least one of the first, second, third, and fourth expression codes comprises a ProSe Expression Code that corresponds to a ProSe Application Name.

In an aspect, at least one of the first metadata indicating the first location or the third expression code indicating the second location comprises geographic coordinates.

In an aspect, the third expression code comprises a private expression, and wherein the second metadata comprises at least one of a code and key information configured to enable matching and decoding of the private expression.

In an aspect, a computer-readable medium storing computer executable code for wireless communication comprises code for determining a first location of an announcing UE when the announcing UE is stationary, transmitting a first signal comprising a first expression code, the first expression code associated with first metadata stored in a server, the first metadata indicating the first location, determining a second location of the announcing UE when the announcing UE is moving, updating the first metadata stored in the server with second metadata, transmitting a second signal comprising a second expression code, the second expression code associated with the second metadata, and transmitting a third signal comprising a third expression code, the third expression code indicating the second location, wherein the second metadata is configured to enable decoding of the third expression code.

In an aspect of the disclosure, a method, a computer program product, and an apparatus are provided. For example, the apparatus may be a first UE. In an aspect, the method performed by the first UE includes receiving, from a second UE, a first signal comprising a first expression code associated with the second UE, determining first metadata associated with the first expression code, monitoring for a second signal from the second UE based on the first metadata, the second signal comprising a second expression code that includes a first location of the second UE, and determining the first location of the second UE from the second expression code using the first metadata.

In an aspect, the method further includes receiving, from the second UE, a third signal comprising a third expression code associated with the second UE, determining second metadata associated with the third expression code, and determining a second location of the second UE from the second metadata.

In an aspect, at least one of the first, second, and third expression codes comprises a ProSe Expression Code that corresponds to a ProSe Application Name.

In an aspect, the first location of the second UE included in the second expression comprises geographic coordinates.

In an aspect, the second expression code comprises a private expression, and wherein the first metadata comprises at least one of a code and key information configured to enable matching and decoding of the private expression.

In an aspect, the first UE includes means for receiving, from a second UE, a first signal comprising a first expression code associated with the second UE, means for determining first metadata associated with the first expression code, means for monitoring for a second signal from the second UE based on the first metadata, the second signal comprising a second expression code that includes a first location of the second UE, and means for determining the first location of the second UE from the second expression code using the first metadata.

In an aspect, the first UE further includes means for receiving, from the second UE, a third signal comprising a third expression code associated with the second UE, means for determining second metadata associated with the third expression code, and means for determining a second location of the second UE from the second metadata.

In an aspect, at least one of the first, second, and third expression codes comprises a ProSe Expression Code that corresponds to a ProSe Application Name.

In an aspect, the first location of the second UE included in the second expression comprises geographic coordinates.

In an aspect, the second expression code comprises a private expression, and wherein the first metadata comprises at least one of a code and key information configured to enable matching and decoding of the private expression.

In an aspect, the first UE includes a memory, and at least one processor coupled to the memory and configured to receive, from a second UE, a first signal comprising a first expression code associated with the second UE, determine first metadata associated with the first expression code, monitor for a second signal from the second UE based on the first metadata, the second signal comprising a second expression code that includes a first location of the second UE, determine the first location of the second UE from the second expression code using the first metadata.

In an aspect, the at least one processor is further configured to receive, from the second UE, a third signal comprising a third expression code associated with the second UE, determine second metadata associated with the third expression code, and determine a second location of the second UE from the second metadata.

In an aspect, at least one of the first, second, and third expression codes comprises a ProSe Expression Code that corresponds to a ProSe Application Name.

In an aspect, the first location of the second UE included in the second expression comprises geographic coordinates.

In an aspect, the second expression code comprises a private expression, and wherein the first metadata comprises at least one of a code and key information configured to enable matching and decoding of the private expression.

In an aspect, a computer-readable medium storing computer executable code for wireless communication includes code for receiving, at a first UE from a second UE, a first signal comprising a first expression code associated with the second UE, determining first metadata associated with the first expression code, monitoring for a second signal from the second UE based on the first metadata, the second signal comprising a second expression code that includes a first location of the second UE, and determining the first location of the second UE from the second expression code using the first metadata.

BRIEF DESCRIPTION OF THE DRAWINGS

FIG. 15 is a diagram illustrating a format for transmission of multiple ProSe application codes by a device in a single discovery resource.

FIG. 16 is a diagram illustrating code linking in accordance with various aspects of the disclosure.

DETAILED DESCRIPTION

Figure 1:
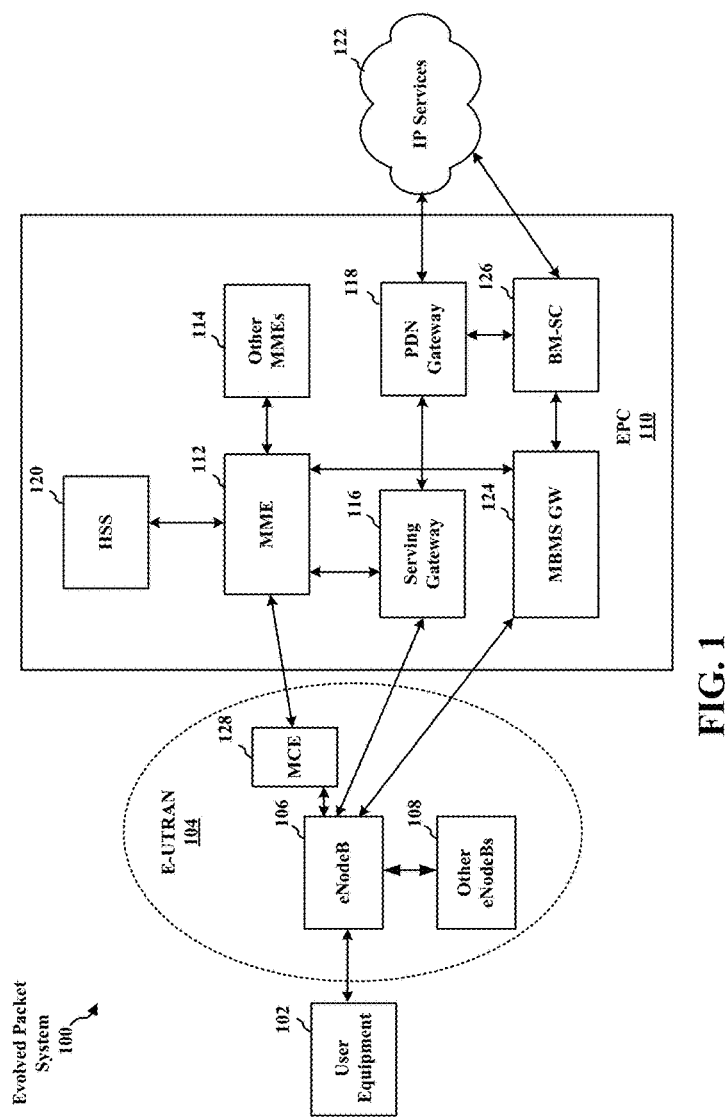
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
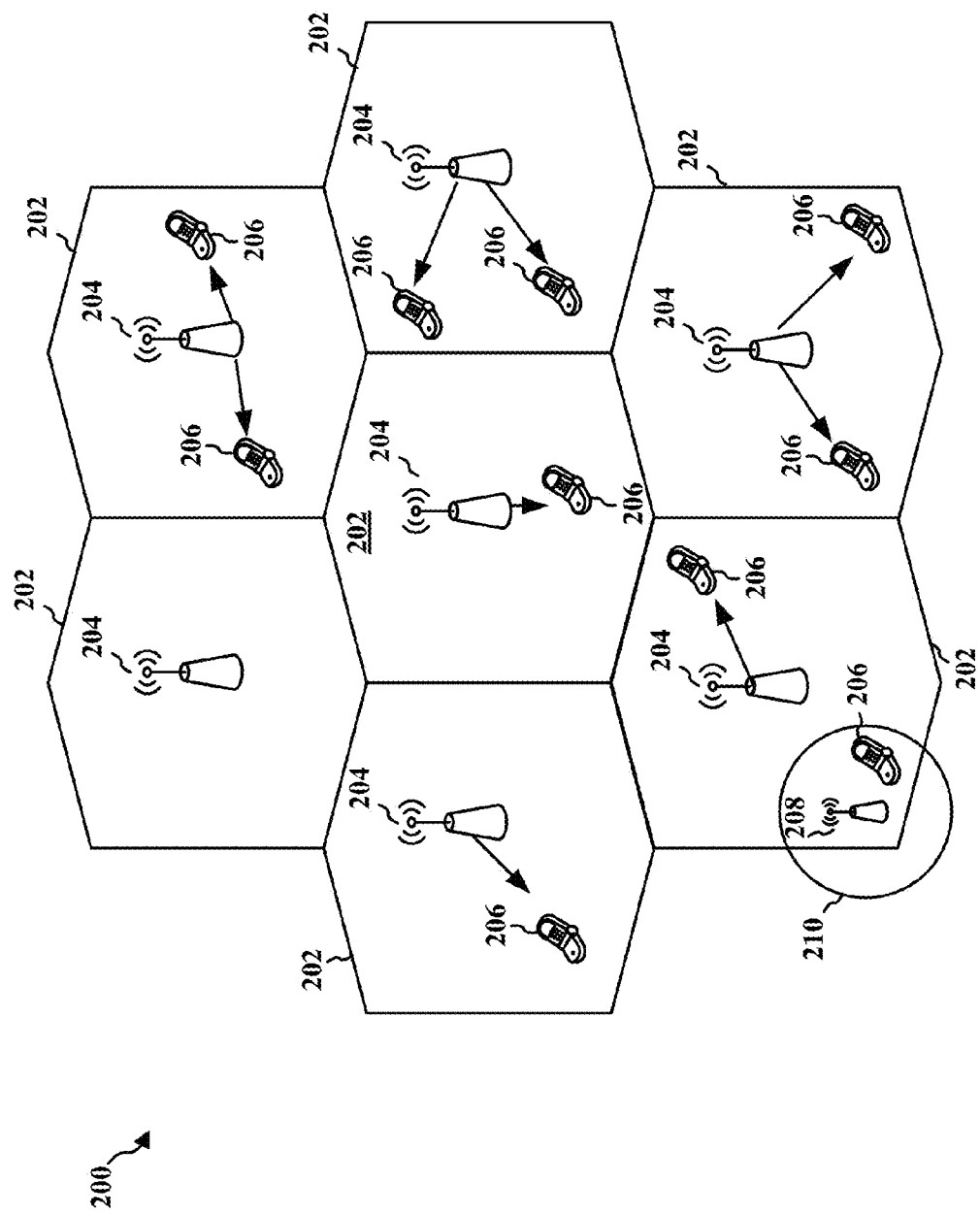
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
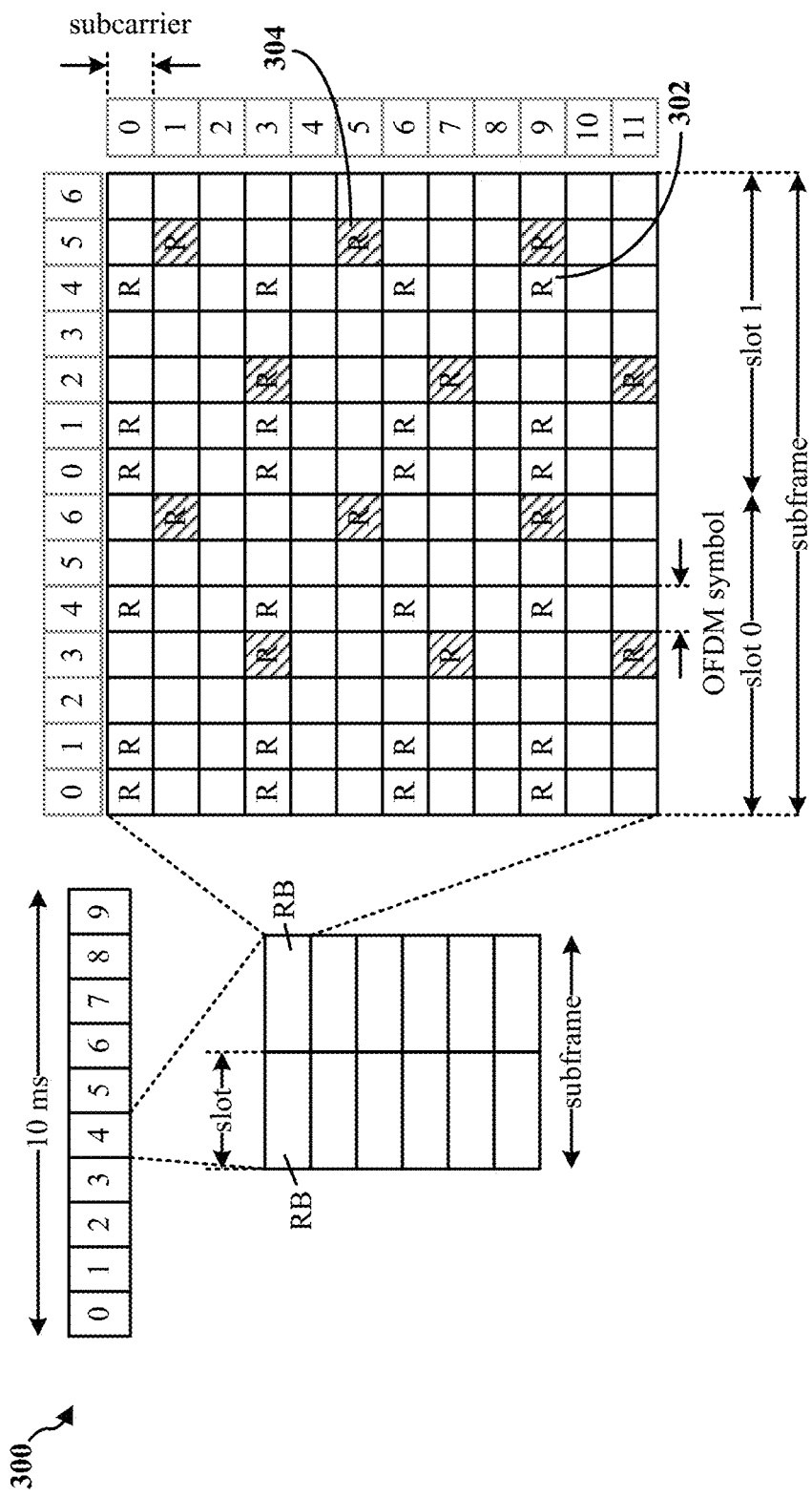
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
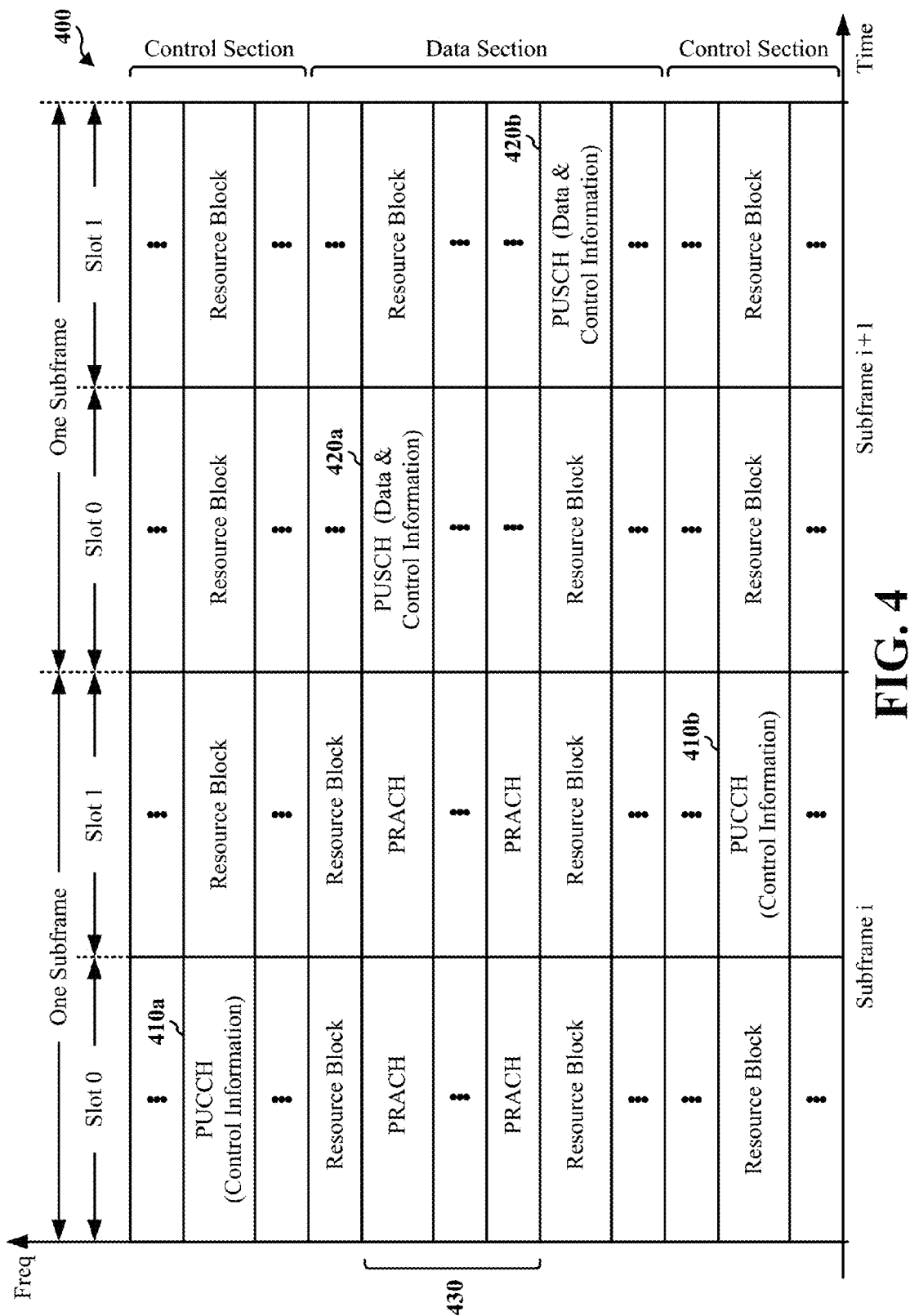
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
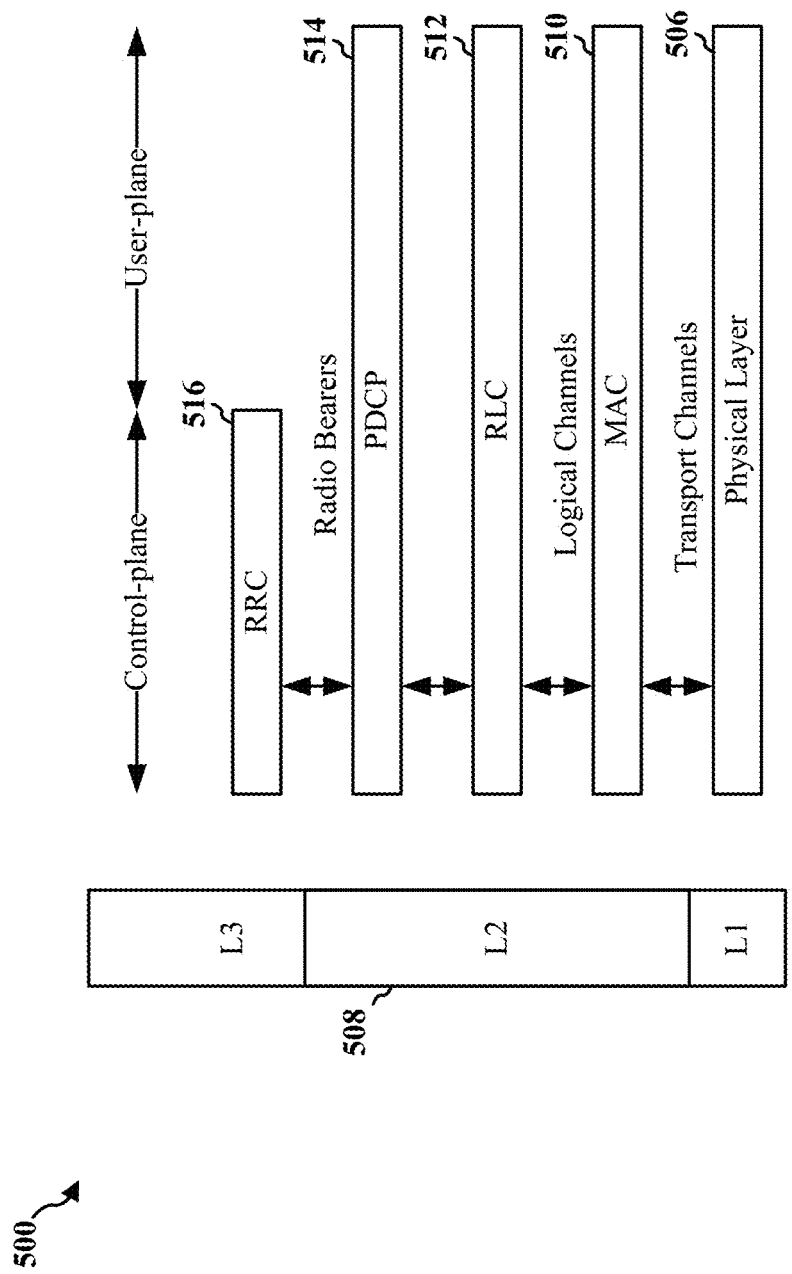
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
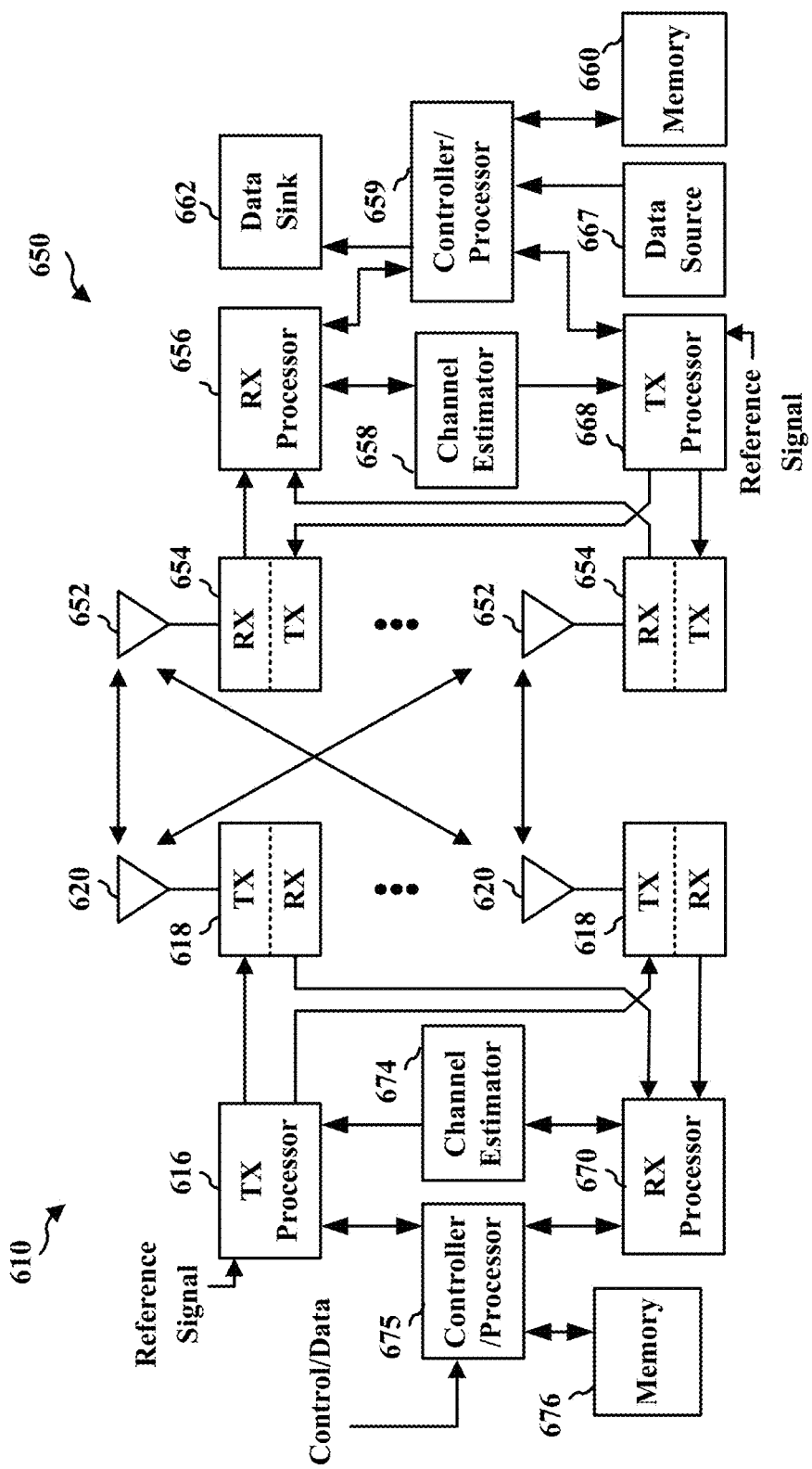
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
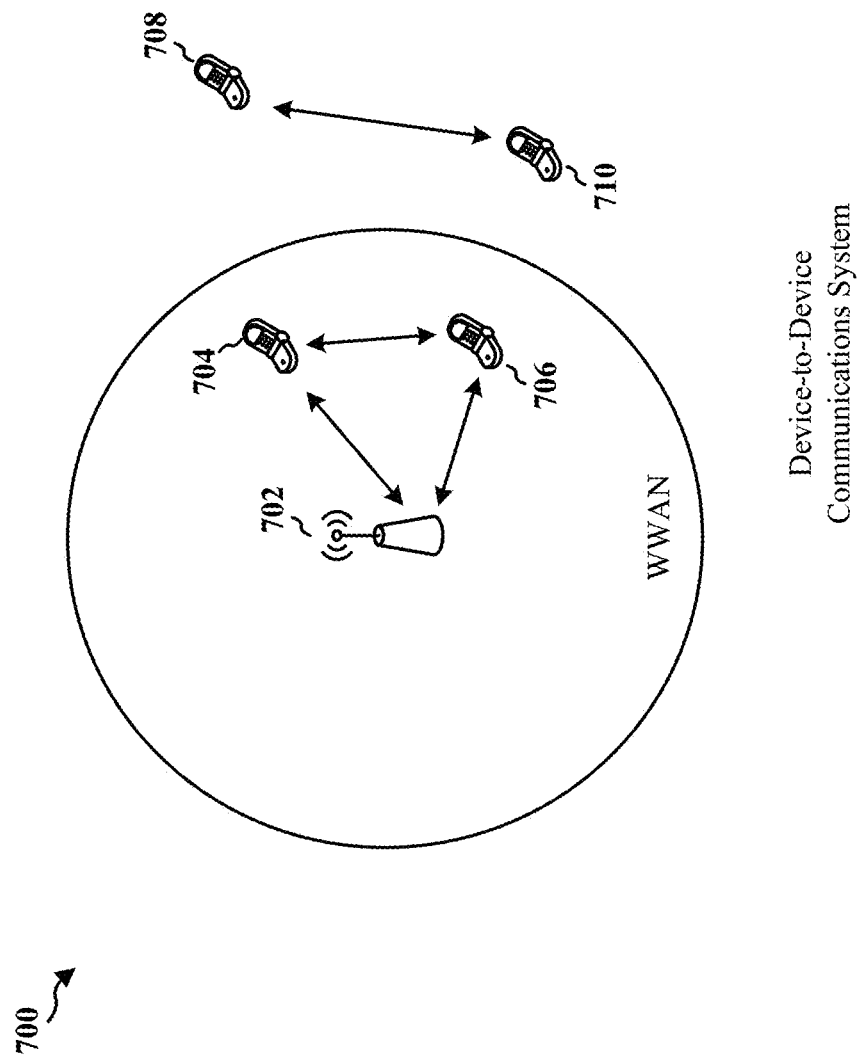
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

LTE-Direct or proximity service (ProSe) discovery is a process by which mobile devices periodically broadcast short bit strings (e.g., referred to as "ProSe application codes," or simply "expressions codes") over-the-air, while other mobile devices in proximity attempt to detect the codes in an efficient manner. For example, the other mobile devices may monitor for codes and filter only the codes that are of interest to the applications operating in those mobile devices. A ProSe code is associated with an application-layer (e.g. human-readable) name referred to as a ProSe Application Name. The ProSe Application Name may be a component of a ProSe Application Identifier (PAI)). An application publishing a ProSe Application Name results in the modem announcing the corresponding code, while an application subscribing to a (set of) ProSe Application Name(s) results in the modem monitoring for the corresponding code(s). Conventional LTE-Direct discovery procedures, while battery-efficient and privacy-sensitive, do not provide an accurate location of a discovered mobile device. For example, a mobile device may discover another mobile device and only know that the discovered mobile device is somewhere in proximity, which may be within a 500 m radius. It should be noted that discovery is uni-directional, such that the discovered mobile device does not know whether or when it has been discovered by one or more mobile devices in proximity.

For mobile devices that wish to make their location known, one option is to always (or at least always when moving) broadcast some succinct location information along with a code or expression used by other mobile devices for discovery. However, this approach may waste resources (e.g., over-the-air discovery resources) if there is no other mobile device in proximity actually interested in that location information.

Figure 8:
FIG. 8 is a diagram illustrating a mobile network.

FIG. 8 is a diagram illustrating a mobile network 800. In an aspect, the mobile network 800 includes a number of users with proximity service enabled mobile devices. For example, one or more mobile devices in FIG. 8 may periodically broadcast an announcement (e.g., announcement 802 or announcement 803) that enables discovery by another mobile device (e.g., mobile device 804). In such example, the mobile device 804 may discover another mobile device in proximity and which offers a service or content of interest. However, the mobile device 804 performing discovery may not be able to accurately determine the locations of the discovered mobile devices.

Figure 9:
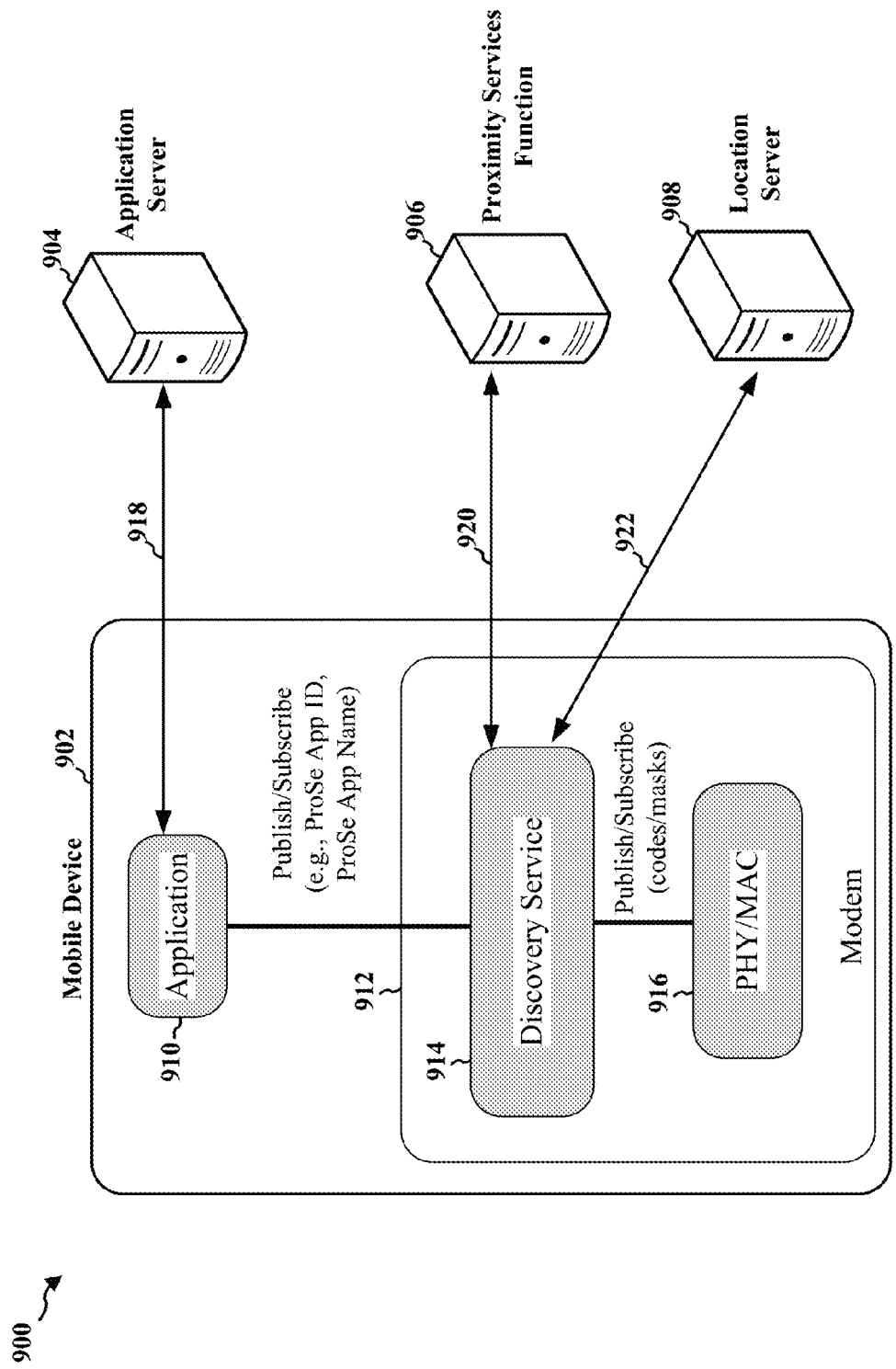
FIG. 9 is a diagram illustrating a mobile network.

FIG. 9 is a diagram illustrating a mobile network 900. As shown in FIG. 9, mobile network 900 includes a mobile device 902, an application server 904, a ProSe Function 906, and a location server 908. As further shown in FIG. 9, the mobile device 902 includes an application 910 and a modem 912. In the present disclosure, the term ProSe Function may refer to a logical function for proximity services implemented by a server or other network entity.

In an aspect, the application server 904 may configure applications with ProSe application names and/or may store the metadata (e.g., a set of auxiliary information) for each ProSe application name. The ProSe Function 906 may be configured to allocate ProSe application codes, look up ProSe application codes, and/or store metadata for each ProSe application code. The metadata is associated with both the ProSe application name and the allocated ProSe application code. The location server 908 may be configured to determine accurate location information for each mobile device.

In an aspect, as shown in FIG. 9, when the mobile device 902 is operating as a device discoverer, the discovery service module 914 may send a ProSe application code received from a discovered mobile device to the ProSe Function 906 via data path 920. The ProSe Function 906 may look up the ProSe application code to determine the ProSe application name that corresponds to that code. The ProSe Function 906 may then send the ProSe application name to the mobile device 902 via data path 920. When the mobile device 902 is operating as an announcer/discoveree, the discovery service module 914 may place accurate location information of the mobile device 902 into the location server 908 via data path 922. In general, depending on the role of the mobile device 902, as further shown in FIG. 9, the application 910 may communicate with application server 904 via data path 918 to receive configuration information to subscribe to ProSe Application names of interest or to publish ProSe Application Names. These operations result in mobile devices either broadcasting a code or monitoring for a set of codes. When a mobile device finds some codes that match its interest, the mobile device may send those codes to the network to obtain the associated ProSe Application Names.

Figure 10:
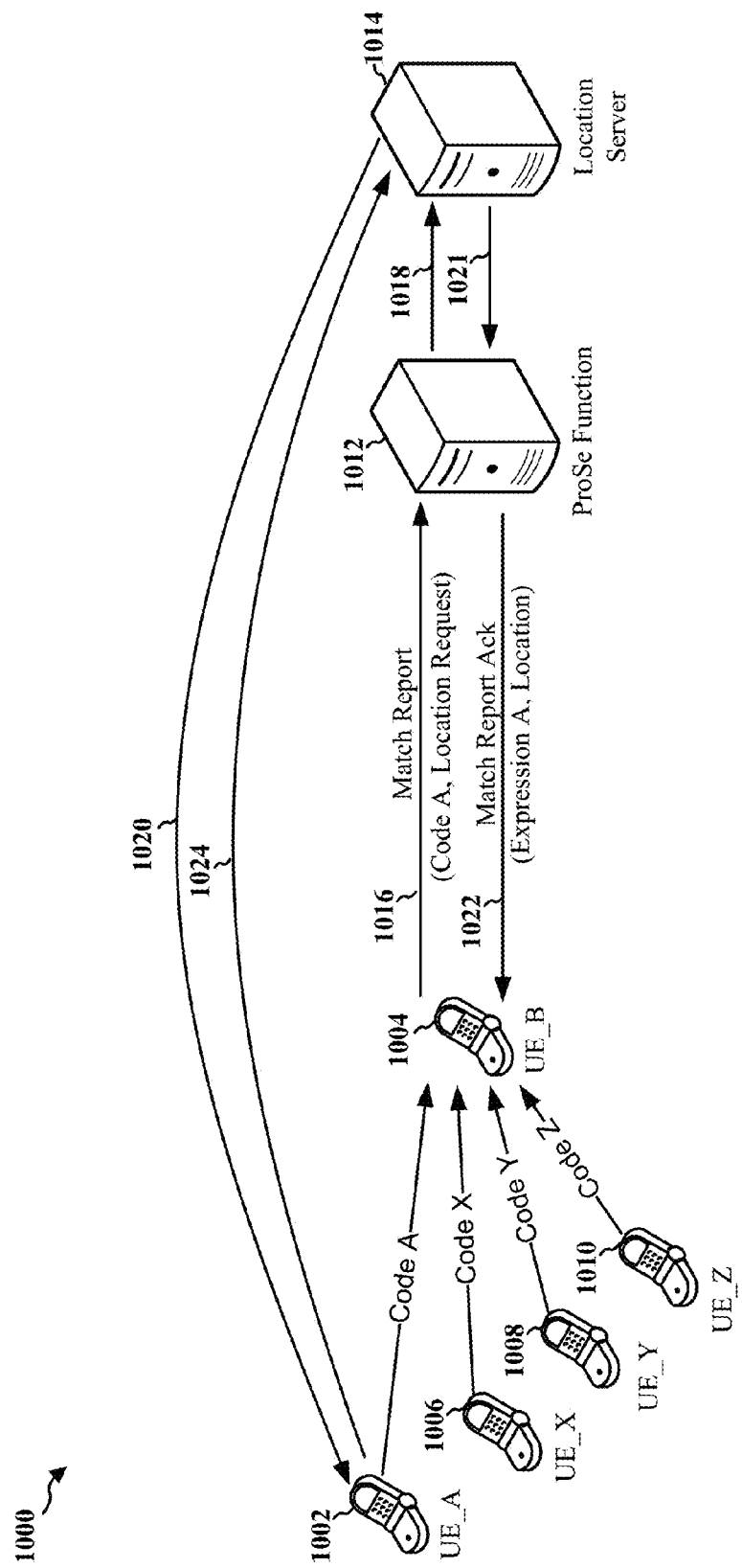
FIG. 10 is diagram illustrating an open location discovery procedure in a network.

FIG. 10 is diagram illustrating an open location discovery procedure in a network 1000. Network 1000 includes UE_A 1002, UE_B 1004, UE_X 1006, UE_Y 1008, UE_Z 1010, ProSe Function 1012, and location server 1014.

As shown in FIG. 10, UE_A 1002, UE_X 1006, UE_Y 1008, and/or UE_Z 1010 may each periodically broadcast a unique code (e.g., a short bit string) over-the-air. In an aspect, the unique code may be a ProSe application code associated with a UE. For example, as shown in FIG. 10, UE_A 1002, UE_X 1006, UE_Y 1008, and UE_Z 1010 may respectively broadcast ProSe application codes "Code A," "Code X," "Code Y," and "Code Z." UE_B 1004 may discover UEs of interest by listening to the broadcasted ProSe application codes and filtering the ProSe application codes of interest to the UE_B 1004. For example, UE_B 1004 may determine that Code A is of interest to the UE_B 1004. In such example, UE_A 1002 may be a mobile dog grooming service looking for business and may be configured to provide its accurate location to any interested UE.

In an aspect, the UE_B 1004 may send a message 1016 to the ProSe Function 1012. In such aspect, the message 1016 may include a request for information associated with Code A and a request for location information associated with the UE (e.g., UE_A 1002) that broadcasted Code A. In an aspect, the message 1016 may be a match report message that must be sent by a UE (e.g., UE_B 1004) to a ProSe Function in order for the UE to obtain the application-layer meaning (e.g., a ProSe Application Name) of the discovered code (e.g., Code A). The ProSe Function 1012 may determine whether UE_B 1004 is authorized to receive ProSe services and/or the requested location information. If UE_B 1004 is authorized, the ProSe Function 1012 may trigger the UE_A 1002 to take location measurements and to report the measurements to the ProSe Function 1012. For example, the ProSe Function 1012 may trigger the UE_A 1002 by sending a request 1018 to the location server 1014 for the requested location information. In an aspect, the location server 1014 may be an LTE location server. The location server 1014 may then send a message 1020 to the UE_A 1002 using LTE protocols for location information, such as SUPL (Secure User Plane Location). The UE_A 1002 may upload the requested location information 1024 to the location server 1014 in response to the message 1020. For example, the message 1020 may be a push notification.

In an aspect, if the UE (e.g., UE_A 1002) discovered by the UE_B 1004 is no longer of interest to the UE_B 1004, the UE_B 1004 may send a message to the ProSe Function 1012 indicating that the discovered UE (e.g., UE_A 1002) is no longer of interest to the UE_B 1004. The ProSe Function 1012 may forward the message to the location server 1014. The location server 1014 may then send a message (e.g., a push notification) to the UE_A 1002 that causes the UE_A 1002 to no longer upload the location information to the location server 1014. However, it should be understood that the UE_A 1002 may still continue to upload its location information for other UEs (e.g., UEs different from UE_B 1004) that have discovered UE_A 1002 and which are interested in the location of UE_A 1002.

In another aspect, a UE (e.g., UE_A 1002) discovered by the UE_B 1004 may implement a timer such that the UE uploads its location information to the location server 1014 while the timer is running. If the UE_B 1004 does not renew its interest in the location of the discovered UE prior to expiration of the timer, the discovered UE may no longer upload the location information to the location server 1014. It should be understood, however, that the UE (e.g., UE_A 1002) discovered by UE_B 1004 may still continue to upload its location information for other UEs (e.g., UEs different from UE_B 1004) that have discovered the UE and which are interested in the location of UE if the UE_B 1004 has not renewed its interest in the location of the discovered UE prior to expiration of the timer.

The location server 1014 may send a message 1021 that includes the location information to the ProSe Function 1012. The ProSe Function 1012 may then send a message 1022 to UE_B 1004 including information associated with Code A (e.g., a ProSe Application Name, such as "Expression.A") and the location information (e.g., LTE-based location) associated with UE_A 1002. In an aspect, the message 1022 may be a match report acknowledgment message.

Figure 11:
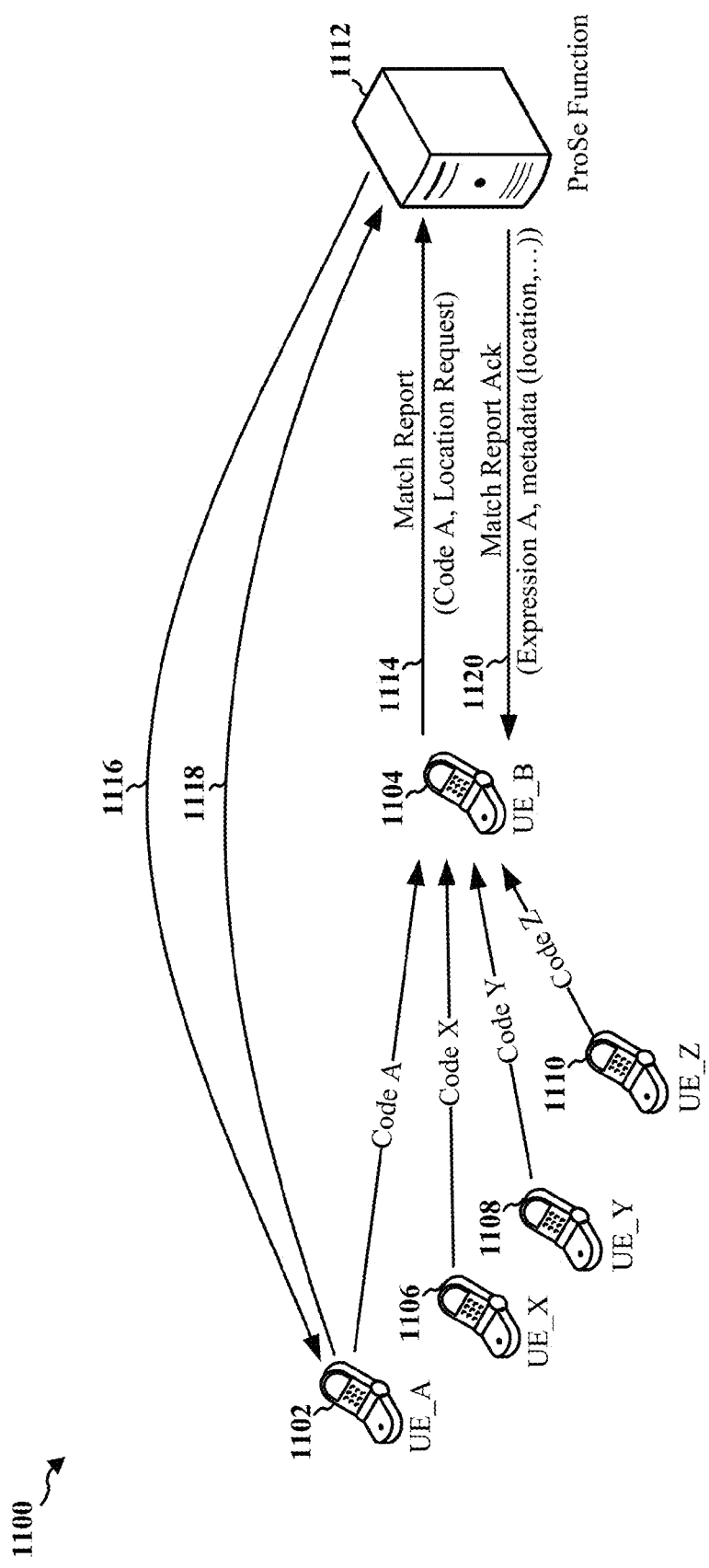
FIG. 11 is diagram illustrating an open location discovery procedure in a network.

FIG. 11 is diagram illustrating an open location discovery procedure in a network 1100. Network 1100 includes UE_A 1102, UE_B 1104, UE_X 1106, UE_Y 1108, UE_Z 1110, and ProSe Function 1112.

As shown in FIG. 11, UE_A 1102, UE_X 1106, UE_Y 1108, and/or UE_Z 1110 may each periodically broadcast a unique code (e.g., a short bit string) over-the-air. In an aspect, the unique code may be a ProSe application code associated with a UE. For example, as shown in FIG. 11, UE_A 1102, UE_X 1106, UE_Y 1108, and UE_Z 1110 may respectively broadcast ProSe application codes "Code A," "Code X," "Code Y," and "Code Z." The UE_B 1104 may discover UEs of interest by listening to the broadcasted ProSe application codes and filtering the ProSe application codes of interest to the UE_B 1104. For example, UE_B 1104 may determine that Code A is of interest to the UE_B 1104. In such example, UE_A 1102 may be a mobile dog grooming service looking for business and may be configured to provide its accurate location to any interested UE.

In an aspect, the UE_B 1104 may send a message 1114 to the ProSe Function 1112. In such aspect, the message 1114 may include a request for information associated with Code A and a request for location information associated with the UE (e.g., UE_A 1002) that broadcasted Code A. In an aspect, the message 1114 may be a match report message that must be sent by a UE (e.g., UE_B 1104) to a ProSe Function in order for the UE to obtain the application-layer meaning (e.g., a ProSe Application Name) of the discovered code (e.g., Code A). The ProSe Function 1112 may determine whether UE_B 1104 is authorized to receive ProSe services and/or the requested location information. If UE_B 1104 is authorized, the ProSe Function 1112 may trigger the UE_A 1102 to include location information in its metadata or to update its metadata with location information. For example, the ProSe Function 1112 may trigger the UE_A 1102 by sending a message 1116 to the UE_A 1102 using LTE protocols requesting the UE_A 1102 to update metadata of the UE_A 1102 with current location information. For example, the message 1116 may be a push notification. In an aspect, the UE_A 1102 may determine its location information via an operating system (e.g., Android) making use of a location obtaining feature based on GPS (or GLONASS, or Beidou, or WiFi) receiver.

In an aspect, the UE_A 1102 may send updated metadata 1118 to the ProSe Function 1112. Yet in another aspect, the UE_A 1102 may send updated metadata 1118 to the ProSe Function via the Application Server (not shown) as in FIG. 9. After the ProSe Function 1112 obtains the metadata, the ProSe Function 1112 may send a message 1120 to UE_B 1004 including information associated with Code A (e.g., a ProSe Application Name, such as "Expression.A") and metadata from the UE_A 1102. In an aspect, the metadata in the message 1120 may include the location information (e.g., GPS data or coordinates) associated with UE_A 1102. In another aspect, the metadata in the message 1120 may not include the location information associated with UE_A 1102 and may include an indication that a trigger has been sent to UE_A 1102 for publishing/broadcasting the location information over the air. In such aspect, the UE_B 1104 may listen for the location information of the UE_A 1102 along with the codes (e.g., Code A) announced by UE_A 1102. In an aspect, the message 1120 may be a match report acknowledgment message. In an aspect, the match report message may contain location, or, if it is too long to delay the match report acknowledgment, the match report acknowledgement without any location information. In an aspect, the ProSe Function 1112 may send a proximity alert message to the UE_B 1104, indicating that UE_A 1102 is interested in the services of the UE_B 1104 and is located in proximity.

Figure 12:
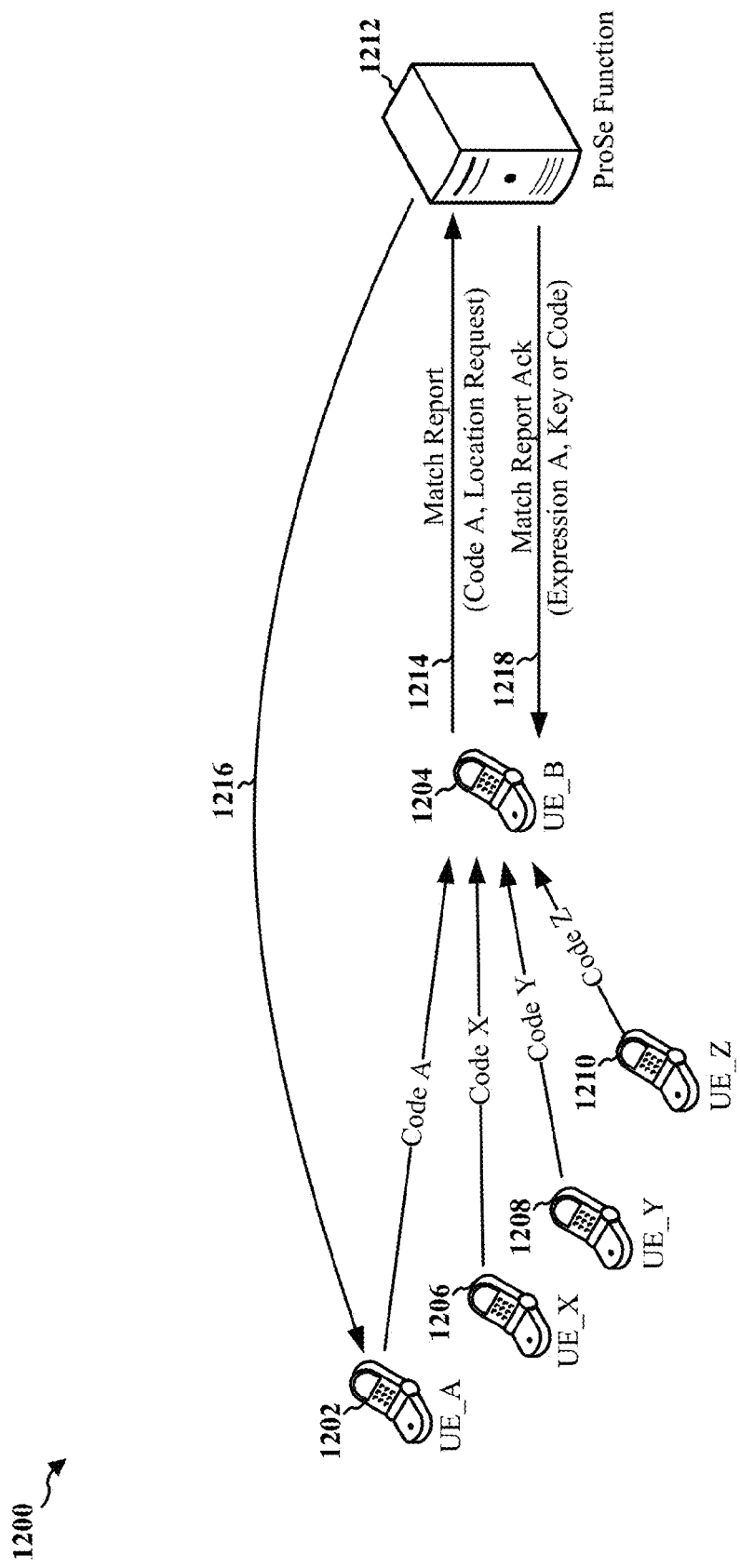
FIG. 12 is diagram illustrating a restricted location discovery procedure in a network.

FIG. 12 is a diagram illustrating a restricted location discovery procedure in a network 1200. Network 1200 includes UE_A 1202, UE_B 1204, UE_X 1206, UE_Y 1208, UE_Z 1210, and ProSe Function 1212.

As shown in FIG. 12, UE_A 1202, UE_X 1206, UE_Y 1208, and/or UE_Z 1210 may each periodically broadcast a unique code (e.g., a short bit string) over-the-air. In an aspect, the unique code may be a ProSe application code associated with a UE. For example, as shown in FIG. 12, UE_A 1202, UE_X 1206, UE_Y 1208, and UE_Z 1210 may respectively broadcast ProSe application codes "Code A," "Code X," "Code Y," and "Code Z." The UE_B 1204 may discover UEs of interest by listening to the broadcasted ProSe application codes and filtering the ProSe application codes of interest to the UE_B 1204. For example, UE_B 1204 may determine that Code A is of interest to the UE_B 1204. In such example, UE_A 1202 may be a private person with a social networking identifier, and may be configured to provide its accurate location to only a restricted set of pre-selected UEs (e.g., close friends and selected family members).

In an aspect, the UE_B 1204 may send a message 1214 to the ProSe Function 1212. In such aspect, the message 1214 may include a request for information associated with Code A and a request for location information associated with the UE (e.g., UE_A 1202) that broadcasted Code A. In an aspect, the message 1214 may be a match report message that must be sent by a UE (e.g., UE_B 1204) to a ProSe Function in order for the UE to obtain the application-layer meaning (e.g., a ProSe Application Name) of the discovered code (e.g., Code A). The ProSe Function 1212 may determine whether UE_B 1204 is authorized to receive ProSe services and/or the requested location information (i.e., whether UE_B 1204 is in the set of pre-selected UEs that UE_A 1202 authorized to get its accurate location information). If UE_B 1204 is authorized, the ProSe Function 1212 may trigger the UE_A 1202 to determine its current location and to report the location information over-the-air such that only the authorized UEs may obtain the location information, or to update its metadata. For example, the ProSe Function 1212 may trigger the UE_A 1202 by sending a message 1216 to the UE_A 1202 including a request to report location information of the UE_A 1202 and/or update metadata of the UE_A 1202 with the location information. For example, the message 1216 may be a push notification.

If the UE_A 1202 chooses to update the metadata of UE_A 1202, the UE_A 1202 obtains the location of UE_A 1202 using standard non-LTE techniques (e.g. obtaining location information via a high level operating system (e.g., Android) using a GPS receiver as previously described) and sends the location information to the ProSe Function 1212. In such aspect, the ProSe Function 1212 may send a message 1218 to the authorized UE_B 1204 including information associated with Code A (e.g., a ProSe Application Name, such as "Expression.A" in FIG. 12) with the metadata containing the location information. For example, the ProSe Application Name may be configured to describe a restaurant. In such example, the ProSe Application Name may be "ProSeApp.Food.Restaurants.Italian." In an aspect, the ProSe Application Name may be preceded by a PLMN ID. In an aspect, the message 1218 may be a match report acknowledgment message. In an aspect, the match report acknowledgement may be delayed and only sent when the LTE location is available at a LTE location server.

If the UE_A 1202 chooses to report its location information over-the-air, the UE_A 1202 may start announcing its location information along with Code A. In an aspect, the location information announced by the UE_A 1202 may be protected (e.g., encrypted) with a security key. In such aspect, the ProSe Function 1212 may include the security key in the message 1218 sent to the authorized UE_B 1204. The UE_B 1204 may use the security key to determine the obfuscated location information received from the UE_A

1202. In another aspect, the location information announced by the UE_A 1202 may not be protected with a security key. In such aspect, the UE_A 1202 may announce location information of the UE_A 1202 along with a separate location-carrying code. In such aspect, the ProSe Function 1212 may include the location-carrying code in the message 1218 sent to the authorized UE_B 1204. The UE_B 1204 may monitor for this code and once found, use it to retrieve the location information associated with the UE_A 1202.

Therefore, in the aspects described supra, a mobile device (e.g., mobile device UE_A 1002) may efficiently report its location information (e.g., announce its location information in a broadcast or update its metadata to include location information) only when needed (e.g., when requested by other devices duly authorized). Furthermore, it should be noted that the aspects described supra take into account any permissions for accurate location much like permissions for discovery. For example, some mobile devices may not care about the identities of other mobile devices requesting their location information and, therefore, no permission checking may be required. As another example, some mobile devices may wish to grant permission for accessing accurate current location to only certain other mobile devices (e.g., to mobile devices in a subset smaller than the subset of mobile devices permitted to discover in the first place). For example, the ProSe Function may be configured to enforce such permissions based on input from an application server (ultimately from the user him/herself).

Figure 13:
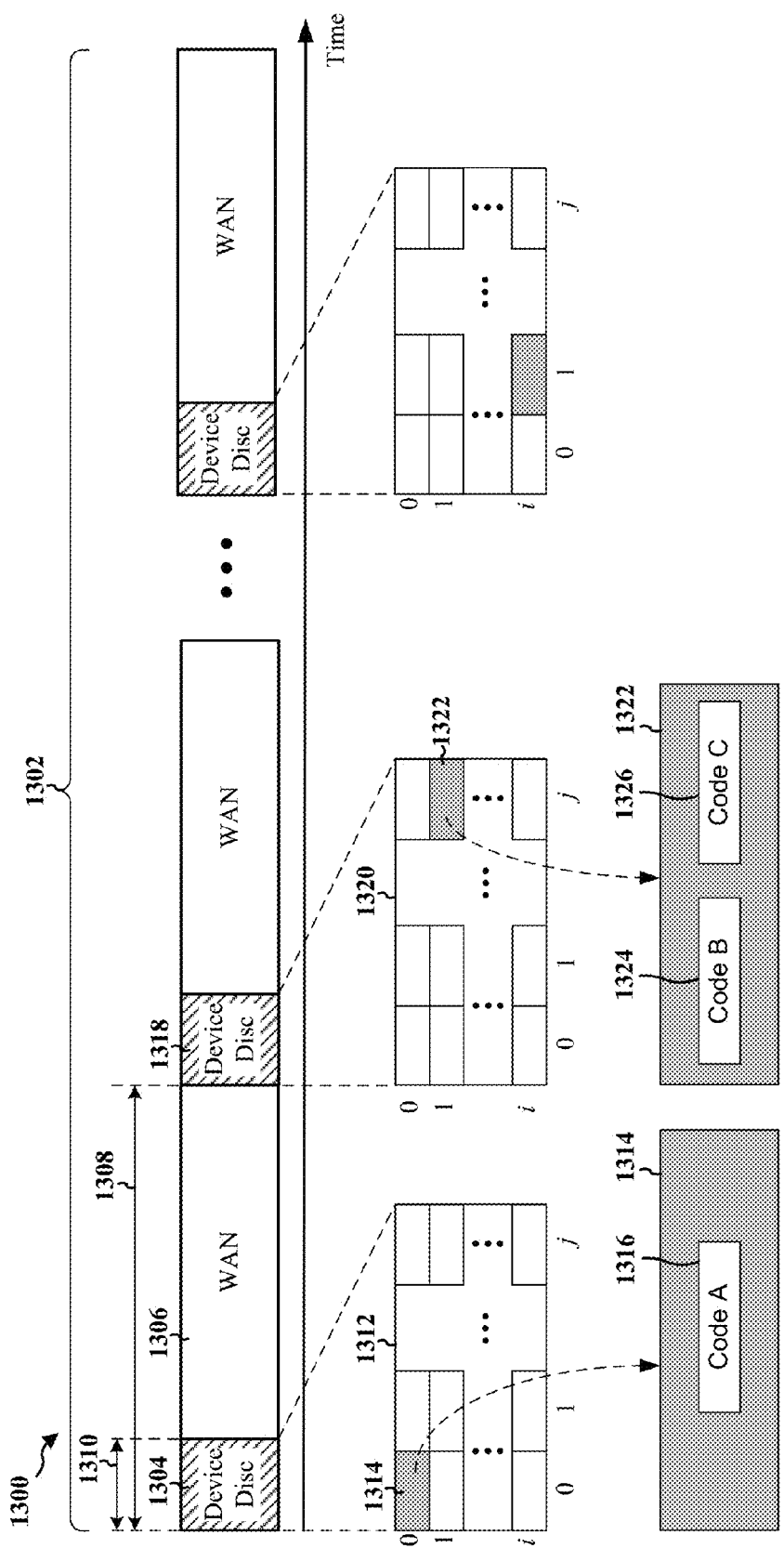
FIG. 13 is a diagram illustrating an exemplary over-the-air resource allocation scheme.

FIG. 13 is a diagram 1300 illustrating an exemplary over-the-air resource allocation scheme. FIG. 13 includes a set of resources 1302 which are periodically allocated for device discovery and for a WAN. For example, during period 1308, portion 1304 of the set of resources 1302 is allocated for device discovery and a portion 1306 of the set of resources 1302 is allocated for a WAN. For example, the duration of period 1308 may be 10 seconds and the duration 1310 of the portion 1304 allocated for device discovery may be 64 ms. As shown in FIG. 13, each portion of the set of resources 1302 allocated for device discovery may include a subset of resources. For example, portion 1304 allocated for device discovery may include subset of resources 1312. The subset of resources 1312 includes j subframes, where each of the j subframes includes i sets of subcarriers. In one example, subset of resources 1312 may include 64 subframes (e.g., j=63), where each subframe includes 88 sets of subcarriers (i=87). In such example, each set of subcarriers may include 12 contiguous subcarriers. In an aspect, a set of subcarriers in a subframe may be defined as a single discovery resource, such as discovery resource 1314.

In an aspect, a device may be allocated a single discovery resource (e.g., discovery resource 1314) for transmissions associated with device discovery. In one example, and as shown FIG. 13, a device may use the discovery resource 1314 in the subset of resources 1312 to transmit one ProSe application code (e.g., Code A 1316). In the present disclosure, the term ProSe application code may also be referred to as an expression code. As another example, and as shown FIG. 13, the device may use a single discovery resource 1322 in subset of resources 1320 of portion 1318 to transmit two ProSe application codes (e.g., Code B 1324 and Code C 1326). In an aspect, there may be no association between the single discovery resources (e.g., single discovery resources 1314 and 1322) in FIG. 13. In an aspect, multiple ProSe application codes transmitted by a device in a single discovery resource may be linked by virtue of the shared single discovery resource. For example, the ProSe application codes Code B 1324 and Code C 1326 transmitted in discovery resource 1322 may be linked.

Figure 14:
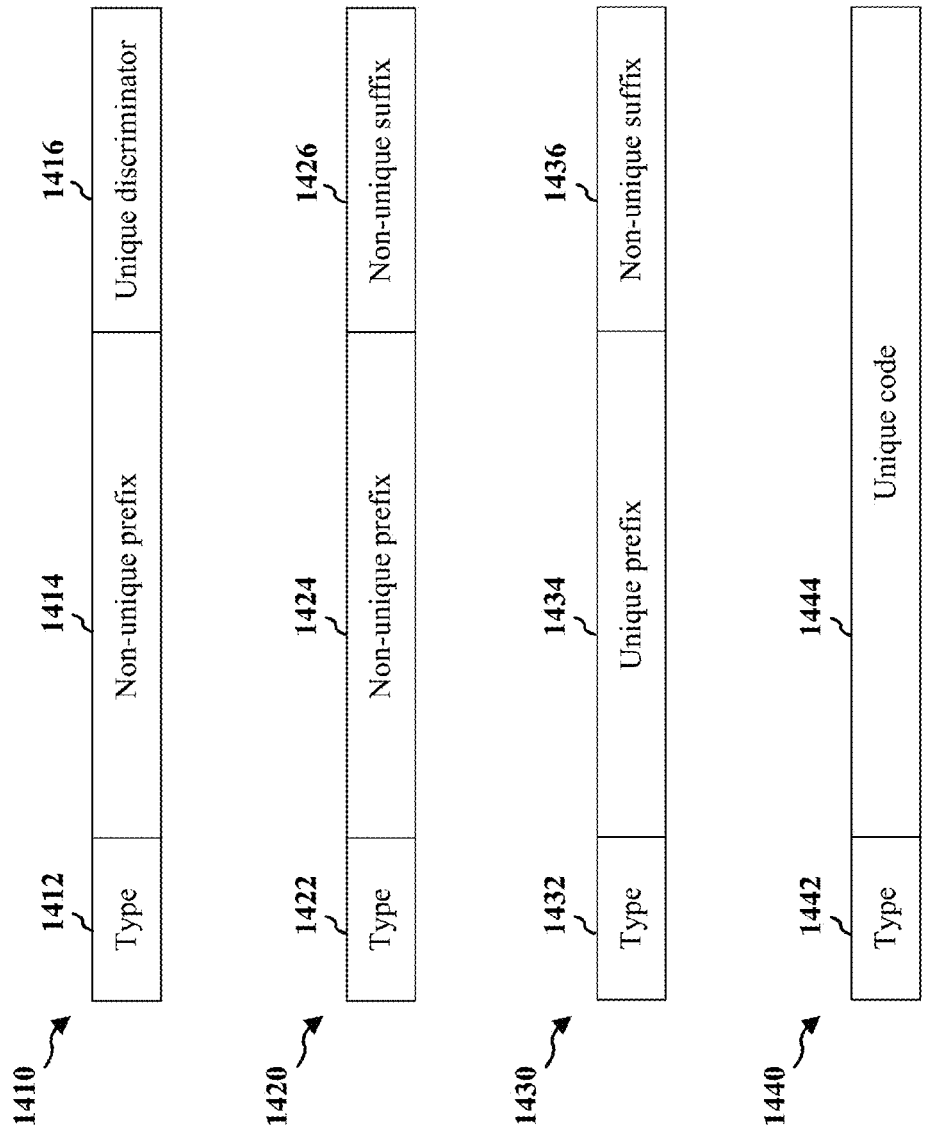
FIG. 14 is a diagram illustrating ProSe application code formats.

FIG. 14 is a diagram illustrating ProSe application code formats. As shown in FIG. 14, exemplary format 1410 includes a type 1412, a non-unique prefix 1414, and a unique discriminator 1416. In an aspect the type 1412 may be an open discovery type (also referred to as public discovery type), non-unique prefix 1414 may be a commercial branch category or subcategory, and unique discriminator 1416 may be a store identification (ID). For example, the non-unique prefix 1414 and the unique discriminator 1416 may be a total of 160 bits. Exemplary format 1420 includes a type 1422, a non-unique prefix 1424, and a non-unique suffix 1426. In an aspect the type 1422 may be a restricted discovery type (also referred to as private discovery type), non-unique prefix 1424 may be an obfuscated identifier of an application, and non-unique suffix 1426 may be application specific information. For example, the non-unique prefix 1424 and the non-unique suffix 1426 may be a total of 160 bits. Exemplary format 1430 includes a type 1432, a unique prefix 1434, and a non-unique suffix 1436. In an aspect, the type 1432 may be a restricted discovery type, unique prefix 1434 may be an obfuscated identifier of a user, and non-unique suffix 1436 may be application specific information. For example, the unique prefix 1434 and the non-unique suffix 1436 may be a total of 160 bits. Exemplary format 1440 includes a type 1442 and a unique code 1444. For example, the unique code 1444 may be 160 bits.

FIG. 15 is a diagram illustrating a format 1500 for transmission of multiple ProSe application codes by a device. As shown in FIG. 15, format 1500 includes type 1502, primary code 1504, and secondary code 1506. For example, with reference to FIG. 13, primary code 1504 may be code B 1324 and the secondary code 1506 may be code C 1326. In such example, the primary code 1504 and the secondary code 1506 may be transmitted in a single discovery resource, such as discovery resource 1322. Therefore, in the aspect of FIG. 15, primary code 1504 and the secondary code 1506 may be linked by virtue of the shared single discovery resource used for the transmission of the primary code 1504 and the secondary code 1506.

In one scenario, a single discovery resource may not be able to accommodate transmission of multiple codes (e.g., ProSe application codes) by a device (e.g., when the total size of the multiple codes is too large for transmission using a single discovery resource). In such scenario, the multiple codes may need to be transmitted using multiple discovery resources. In an aspect, the multiple codes transmitted using multiple discovery resources may be configured to be associated (e.g., linked) to one another. For example, and as described infra with respect to FIG. 16, a primary code may be transmitted by a device in one discovery resource and may be linked to a secondary code that is transmitted by the device in another discovery resource. For example, with reference to FIG. 13, primary code 1504 may be code A 1316 and the secondary code 1506 may be code C 1326.

FIG. 16 is a diagram illustrating code linking in accordance with various aspects of the disclosure. As shown in FIG. 16, format 1600 includes a type 1602 and primary code 1604. For example, the primary code 1604 may be a first ProSe application code and may be 160 bits in length. As another example, the primary code 1604 may be less than 160 bits in length (e.g., 80 bits). In FIG. 16, format 1600 may be used by a UE to transmit the type 1602 and primary code 1604 in a first discovery resource. As further shown in FIG. 16, format 1610 includes a type 1612, linking information 1614, and secondary code 1616. For example, the secondary code 1616 may be a second ProSe application code. For example, linking information 1614 and the secondary code 1616 may be a total of 160 bits. In such example, the secondary code 1616 linked to the primary code 1604 is less than 160 bits. In FIG. 16, format 1610 may be used by the UE to transmit the type 1612, the linking information 1614, and the secondary code 1616 in a second discovery resource, where the first discovery resource is different from the second discovery resource. In an aspect, the linking information 1614 indicates that the secondary code 1616 is linked to the primary code 1604 (meaning, for example, that both of these codes are being broadcasted by the same device). For example, the linking information 1614 may be a code and/or key information sufficient to match and decode a private expression. As another example, the linking information 1614 may be the ProSe application name that would be used to uniquely match the secondary expression code.

In an aspect, a first UE (also referred to as a monitoring device or discovering device) may receive a primary code that is transmitted by a second UE (also referred to as a transmitting device) using a first discovery resource. The first UE may then determine whether the primary code is associated with any secondary codes and/or secondary expressions.

Figure 17:
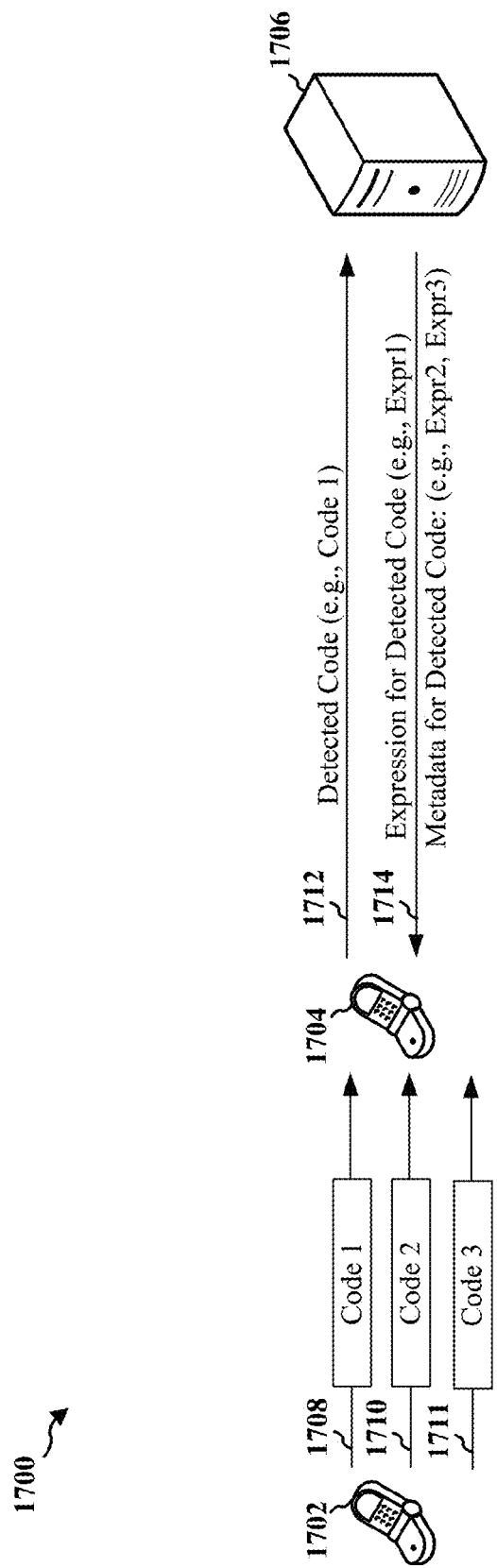
FIG. 17 is a diagram illustrating device discovery in a network in accordance with various aspects of the present disclosure.

In one aspect, and as described infra with respect to FIG. 17, the first UE may send a request for information associated with a discovered second UE to a network device. The network device may then send a message that includes metadata associated with the primary code and a list of secondary codes and/or secondary expressions that the second UE is authorized to publish.

FIG. 17 is a diagram illustrating device discovery and code resolution in a network 1700 in accordance with various aspects of the present disclosure. As shown in FIG. 17, network 1700 includes first UE 1704, second UE 1702, and a network device 1706. In an aspect, network device 1706 may be a ProSe Function. First UE 1702 may transmit code 1 1708, code 2 1710, and code 3 1711. In the present disclosure, the term code is also referred to as an expression code or ProSe Application code. In FIG. 17, code 1 1708 may be associated with a first expression (e.g., Expression 1), code 2 1710 may be associated with a second expression (e.g., Expression 2), and code 3 1711 may be associated with a third expression (e.g., Expression 3). For example, each expression may be a different ProSe application name. In the aspect of FIG. 17, the first UE 1704 may receive and decode the code 1 1708 (e.g., the primary code). The first UE 1704 may find code 1 1708 of interest (e.g., code 1 1708 may match some criteria of the first UE 1794). The first UE 1704 may successfully receive code 2 1710 and code 3 1711, but may not be able to immediately decode code 2 1710 and code 3 1711. Consequently, the first UE 1704 may not find code 2 1710 and code 3 1711 (e.g., the secondary codes) to be of interest. The first UE 1704 may send a message 1712 that includes a request for information associated with the code of interest (e.g., code 1 1708) to the network device 1706. In an aspect, the message 1712 may be a match report message that must be sent by a UE (e.g., first UE 1704) to a ProSe Function in order for the UE to obtain the application-layer meaning (e.g., a ProSe Application Name) of the discovered code (e.g., code 1 1708), unless already known from a previous match report. The network device 1706 may send a message 1714 that includes an expression associated with code 1 1708 (e.g., Expression 1) and metadata associated with code 1 1708. For example, the metadata may include one or more expressions associated with code 1 1714, such as expression 2 and expression 3. In an aspect, the message 1714 may be a match report acknowledgment message. Since expression 2 and expression 3 are received as metadata for code 1 1708, the first UE 1704 determines that expression 2 and expression 3 are also associated with the second UE 1702 that transmitted code 1 1708. Therefore, the first UE 1704 may receive one or more secondary expressions (e.g., expression 2 and expression 3) of the second UE 1702 using a primary expression code (e.g., code 1 1708). In other words, the first UE 1704 may determine one or more secondary expressions (e.g., expression 2 and expression 3) of the second UE 1702 without decoding the expression codes (e.g., code 2 1710 and code 3 1711) associated with the secondary expressions.

Figure 18A:
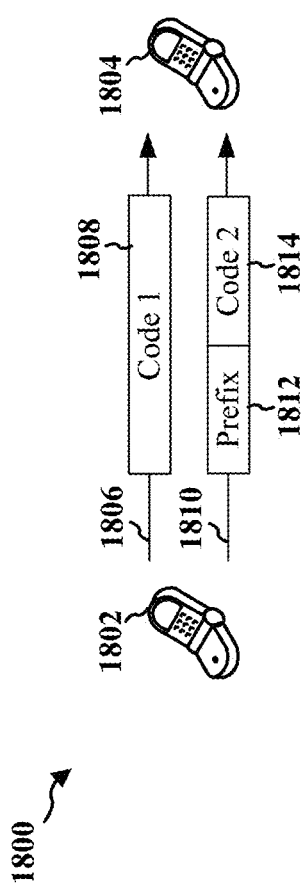
FIGS. 18A and 18B are diagrams illustrating device discovery in a network in accordance with various aspects of the present disclosure.
Figure 18B:
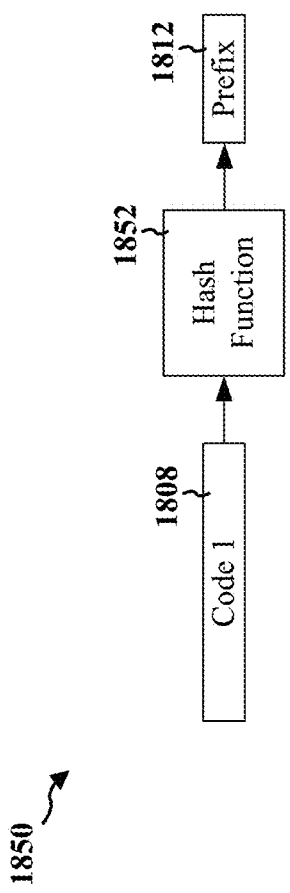

In another aspect, and as described infra with respect to FIGS. 18A and 18B, the first UE 1804 may receive a primary expression code from a second UE 1802 and may determine a protected secondary expression code transmitted from the second UE 1802 using the primary expression code.

FIGS. 18A and 18B are diagrams illustrating device discovery in a network 1800 in accordance with various aspects of the present disclosure. As shown in FIG. 18A, network 1800 includes first UE 1804 and second UE 1802. Second UE 1802 may transmit a signal 1806 that includes code 1 1808 (e.g., a primary expression code) and may transmit a signal 1810 that includes code 2 1814 (e.g., a secondary expression code) and a prefix 1812. In an aspect, the prefix 1812 may be an arbitrary subset of the expression code bits. For example, the prefix 1812 may be configured to precede or may be configured to follow code 2 1814. Therefore, it should be understood that the arrangement of the code 2 1814 and prefix 1812 in signal 1810 may be different than shown in FIG. 18A in other aspects. The first UE 1804 may receive signal 1806 and may successfully extract code 1 1808 from signal 1806. The first UE 1804 may further receive the signal 1810, however, the first UE 1804 may not be able to immediately extract code 2 1814 from signal 1810 without knowledge of the prefix 1812. In FIG. 18A, code 1 1808 may be associated with a first expression of the second UE 1802 and code 2 1814 may be associated with a second expression of the second UE 1802. For example, the first and second expressions may be different ProSe application names.

In an aspect, the first UE 1804 may determine the prefix 1812 by applying a function to the code 1 1808. For example, with reference to FIG. 18B, the first UE 1804 may apply a prescribed hash function 1852 to the code 1 1808 to generate the prefix 1812. The first UE 1804 may identify any received signals that include the prefix 1812. For example, the first UE 1804 may identify that the received signal 1810 includes the prefix 1812. The first UE 1804 may then extract code 2 1814 using the prefix 1812. Therefore, since the first UE 1804 generated the prefix 1812 using code 1 1808 from the second UE 1802, the first UE 1804 determines that the code 2 1814 extracted using prefix 1812 is also associated with the second UE 1802. Naturally, the exact same processing was used by the second UE 1802 to convey to any recipients that both code 1 and code 2 are linked or from the same device. In an aspect, the first UE 1804 may send a message that includes a request for information associated with the code 2 1814 to a network device. In an aspect, the message may be a match report message that must be sent by a UE (e.g., first UE 1804) to a ProSe Function in order for the UE to obtain the application-layer meaning (e.g., a ProSe Application Name) of the discovered code (e.g., code 2 1814). The network device may send a message that includes an expression associated with code 2 1814 and metadata associated with code 2 1814. For example, the metadata may include one or more expressions associated with code 2 1814.

Figure 19:
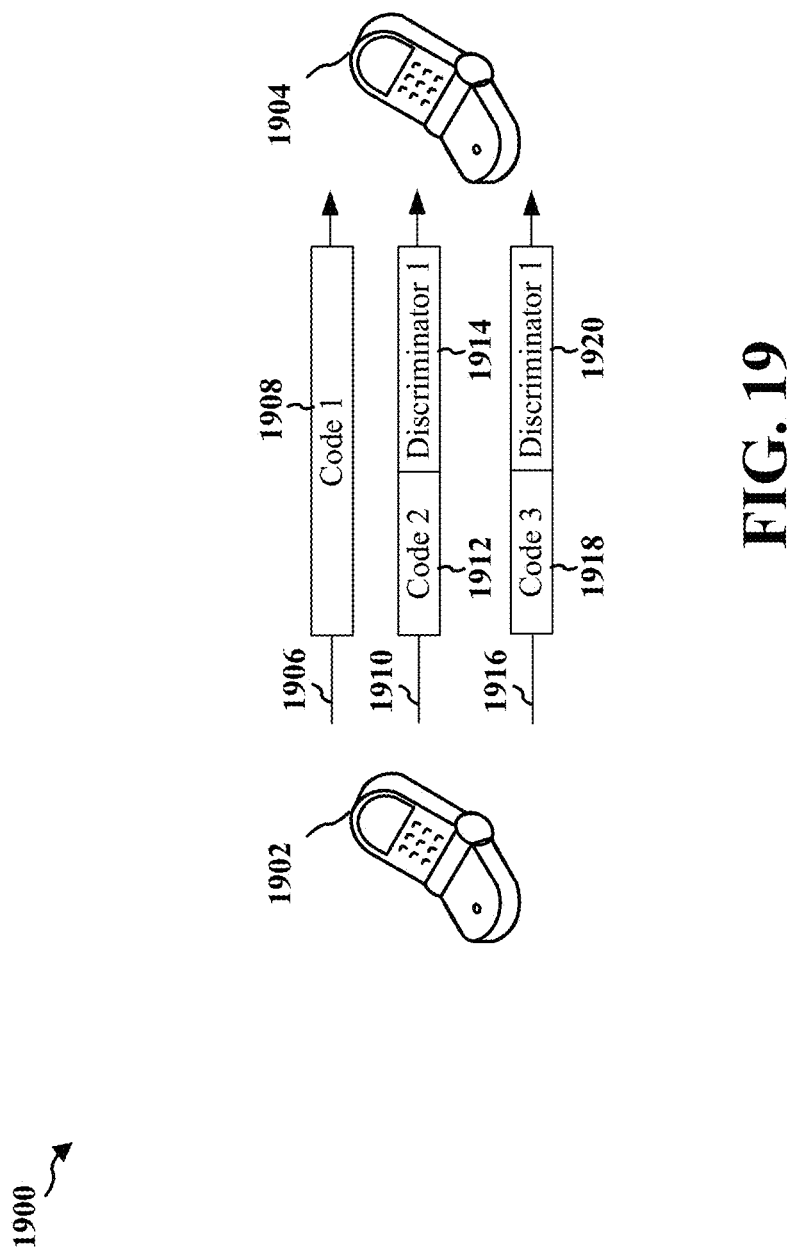
FIG. 19 is a diagram illustrating device discovery in a network in accordance with various aspects of the present disclosure.

In an aspect, and as described infra with respect to FIG. 19, a UE may derive a discriminator for a public expression (e.g., an expression discoverable by any UE without special permission) and may determine whether any of the expression codes detected by the UE contain the derived discriminator. In this way, the UE can determine all expression codes that are linked by virtue of the same discriminator.

FIG. 19 is a diagram illustrating device discovery in a network 1900 in accordance with various aspects of the present disclosure. As shown in FIG. 19, network 1900 includes first UE 1904 and second UE 1902. Second UE 1902 may transmit a signal 1906 that includes code 1 1908 (e.g., a primary expression code), a signal 1910 that includes code 2 1912 (e.g., a secondary expression code) and a discriminator 1 1914, and a signal 1916 that includes code 3 1918 (e.g., a secondary expression code) and a discriminator 1 1920. It should be understood that the arrangement of the code 2 1912 and discriminator 1 1914 in signal 1910 may be different than shown in FIG. 19 in other aspects (e.g., discriminator 1 1914 may precede the code 2 1912). It should also be understood that the arrangement of the code 3 1918 and discriminator 1 1920 in signal 1916 may be different than shown in FIG. 19 in other aspects (e.g., discriminator 1 1920 may precede the code 2 1912).

The first UE 1904 may decode code 1 1908. In an aspect, the first UE 1904 may derive a discriminator for a public expression that is discoverable by any UE without special permission. For example, the first UE 1904 may derive the discriminator (e.g., "discriminator 1") using code 1 1908. The first UE 1904 may then determine whether the signal 1910 and/or signal 1916 include the derived discriminator (e.g., "discriminator 1"). As shown in FIG. 19, since the signal 1910 includes the discriminator 1 1914 and since the signal 1916 includes the discriminator 1 1920, the first UE 1904 may determine that code 2 1912 and code 3 1918 are both linked to code 1 1908 by virtue of the same discriminator derived from code 1 1908. Therefore, in the aspect of FIG. 19, the first UE 1904 may determine secondary expression codes (e.g., code 2 1912 and code 3 1918) that are linked to a primary expression code (code 1 1908) by virtue of having the same discriminator (e.g., "discriminator 1").

Figure 20:
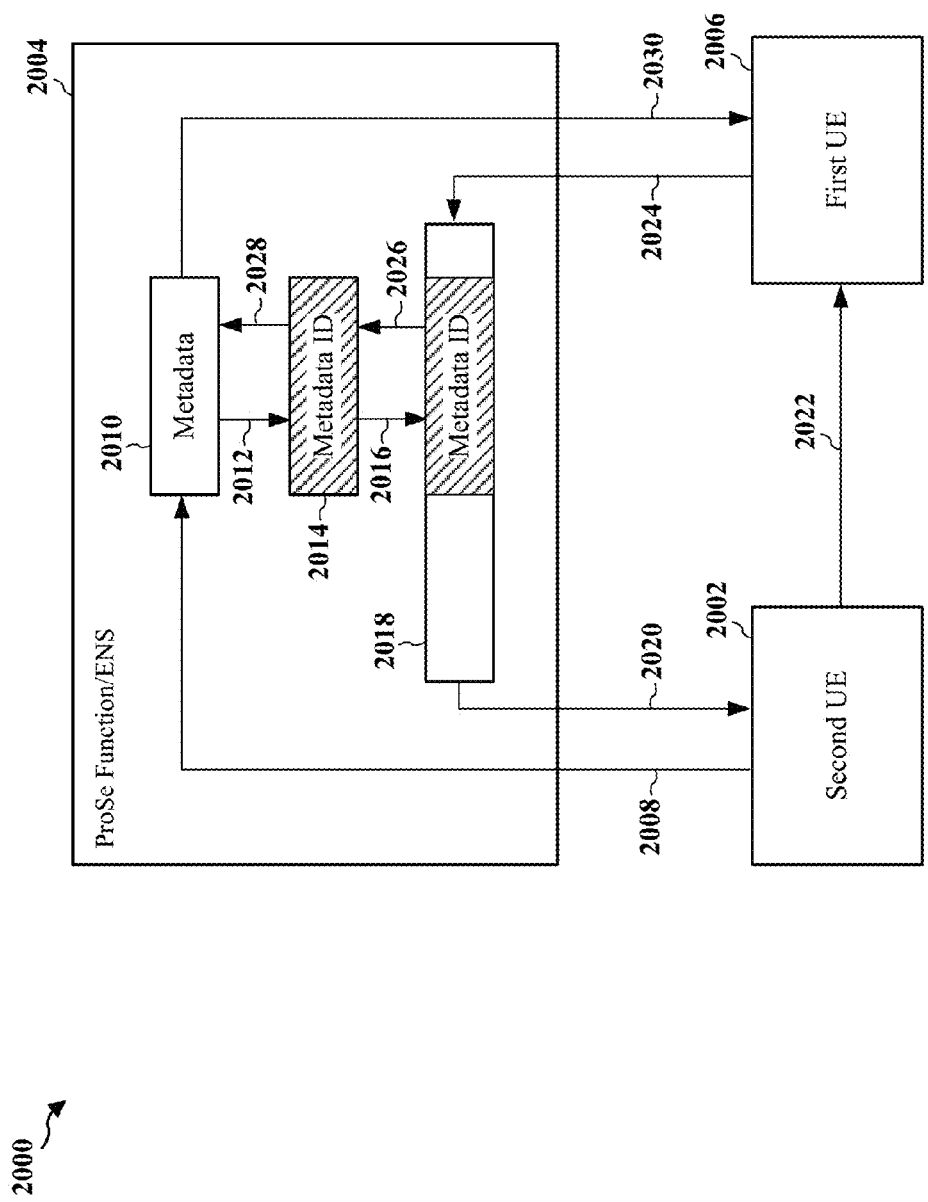
FIG. 20 is a diagram illustrating metadata management in accordance with various aspects of the disclosure.

FIG. 20 is a diagram 2000 illustrating metadata management in accordance with various aspects of the disclosure. FIG. 20 includes a first UE 2006, a ProSe Function/Expression Name Server (ENS) 2004, and a second UE 2002. In an aspect, the ProSe Function/ENS 2004 is a ProSe Function that is configured to support a metadata update operation initiated by an announcing UE (e.g., second UE 2002). As shown in FIG. 20, the second UE 2002 sends an announcement message 2008. In an aspect, the announcement message 2008 includes a ProSe Application Name and metadata associated with the ProSe Application Name. The ProSe Function/ENS 2104 receives the announcement message 2008 and converts the ProSe Application Name in the announcement message 2008 into a bit string (e.g., a sequence of bits) suitable for an over-the-air transmission. For example, the bit string may be configured to enable one or more monitoring UEs (e.g., first UE 2006) to determine whether an announcement from the second UE 2002 is of interest to the one or more monitoring UEs. The ProSe Function/ENS 2004 may store the metadata 2010 included in the announcement message 2008 in a memory and may perform a function 2012 to generate an ID associated with the metadata, such as metadata ID 2014. The ProSe Function/ENS 2104 may then perform a function 2016 to configure the bit string and the metadata ID 2014 in an expression code, such as expression code 2018. As further shown in FIG. 20, the ProSe Function/ENS 2004 sends a message 2020 that includes expression code 2018 to the second UE 2002. The second UE 2002 then broadcasts an announcement message 2022 that includes the expression code 2018. The first UE 2006 receives the announcement message 2022 and determines that the expression code 2018 in the announcement message 2022 is of interest to the first UE 2006. The first UE 2006 sends a message 2024 that includes the expression code 2018. In an aspect, the message 2024 may be a match report message. The ProSe Function/ENS 2004 receives the message 2024 and identifies the expression code 2018 in the message 2024. The ProSe Function/ENS 2004 performs a function 2026 to extract a metadata ID (e.g., metadata ID 2014) included in the expression code 2018. The ProSe Function/ENS 2004 performs a function 2028 to identify metadata (e.g., metadata 2010) corresponding to the extracted metadata ID (e.g., metadata ID 2014). The ProSe Function/ENS 2004 then sends a message 2030 that includes the metadata (e.g., metadata 2010) to the first UE 2006.

Therefore, in the aspect of FIG. 20, an announcing UE (e.g., second UE 2002) may include metadata (e.g., metadata 2010) in a message (e.g., message 2008) announced by the announcing UE, where the metadata is stored in a ProSe Function/ENS (e.g., ProSe Function/ENS 2004). A monitoring UE (e.g., first UE 2006) may then receive the metadata from the ProSe Function/ENS.

Figure 21:
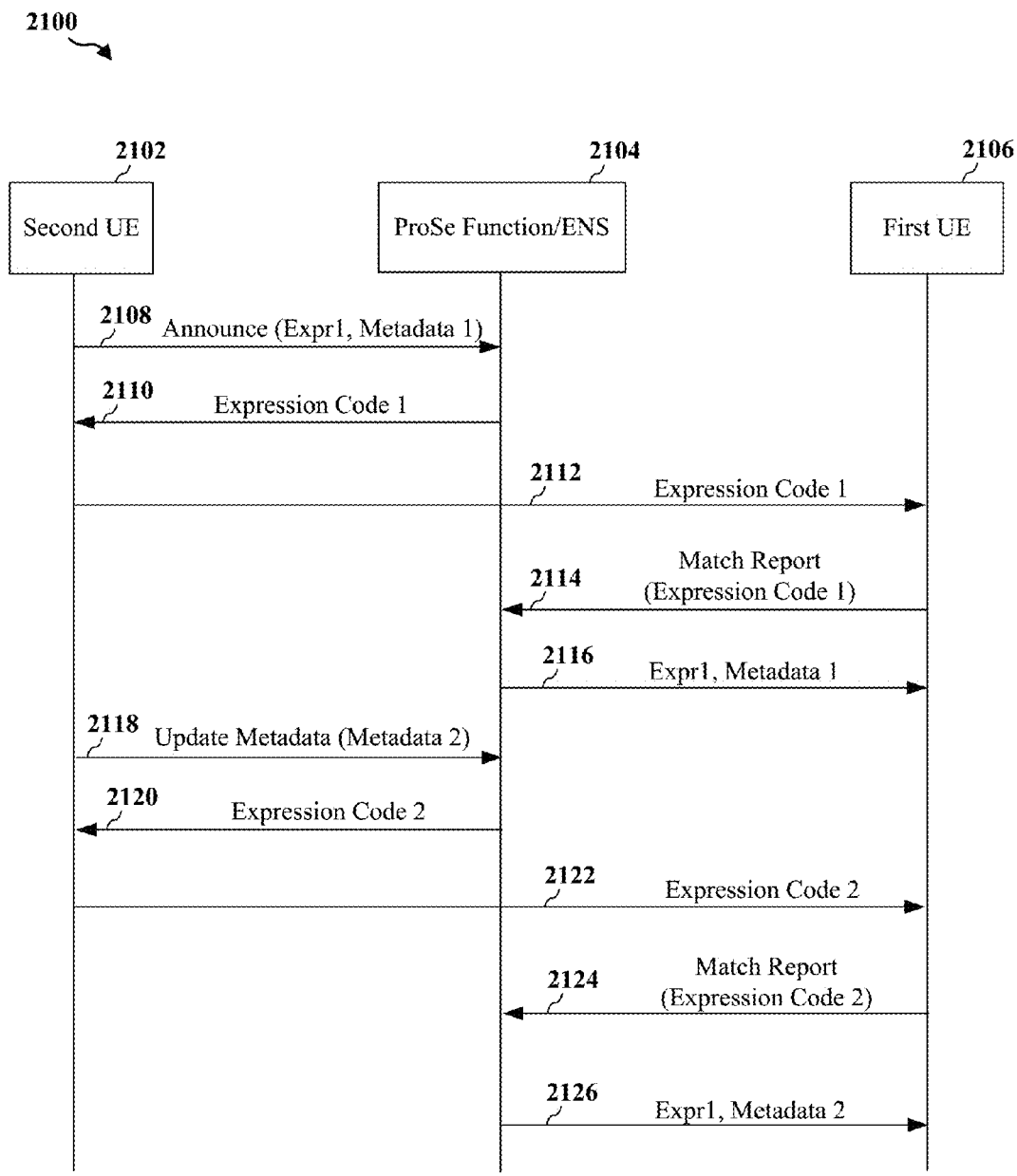
FIG. 21 is a diagram illustrating a communication flow in accordance with various aspects of the disclosure.

FIG. 21 is a diagram 2100 illustrating a communication flow in accordance with various aspects of the disclosure. FIG. 21 includes a first UE 2106, a ProSe Function/ENS 2104, and a second UE 2102. As shown in FIG. 21, the second UE 2102 sends an announcement message 2108 to the Prose Function/ENS 2104. In an aspect, the announcement message 2108 includes a ProSe Application Name (e.g., Expression 1 (Expr1)) and metadata (e.g., Metadata 1) associated with the ProSe Application Name. For example, the ProSe Application Name may be a description of an application that is to be announced by the second UE 2102, where the description is used by one or more monitoring UEs (e.g., first UE 2106) to determine whether the application of the second UE 2102 is of interest to the one or more monitoring UEs. The ProSe Function/ENS 2104 receives the announcement message 2108 and converts the ProSe Application Name in the announcement message 2108 into a bit string (e.g., a sequence of bits) suitable for an over-the-air transmission. For example, the bit string may be configured to enable one or more monitoring UEs (e.g., first UE 2106) to determine whether the announcement from the second UE 2102 is of interest to the one or more monitoring UEs. The ProSe Function/ENS 2104 may store the metadata included in the announcement message 2108 in a memory and may generate an ID associated with the metadata. The ProSe Function/ENS 2104 may then configure the bit string and the ID associated with the metadata in a first expression code (e.g., Expression Code 1). As shown in FIG. 21, the ProSe Function/ENS 2104 sends a message 2110 that includes the first expression code (e.g., Expression Code 1) to the second UE 2102.

As shown in FIG. 21, the second UE 2102 announces (e.g., broadcasts over-the-air) message 2112 that includes Expression Code 1. The first UE 2106 receives the message 2112 and determines that the Expression Code 1 in message 2112 is of interest to the first UE 2106. For example, the first UE 2106 may make the determination based on one or more criteria configured by a user of the first UE 2106. The first UE 2106 sends a Match Report message 2114 that includes the Expression Code 1 to the ProSe Function/ENS 2104. The ProSe Function/ENS 2104 extracts the bit string and the ID associated with the metadata (e.g., Metadata 1) from the Expression Code 1 included in the match report message 2114. The ProSe Function/ENS 2104 then identifies the ProSe Application Name (e.g., Expr1) associated with the bit string and the metadata associated with the ID. The ProSe Function/ENS 2104 then sends a message 2116 that includes the ProSe Application Name and the metadata (e.g., Metadata 1). The first UE 2106 receives the message 2116 and determines that Expression Code 1 corresponds to the ProSe Application Name (e.g., Expr1) and the metadata (e.g., Metadata 1) received via message 2116.

As shown in FIG. 21, the second UE 2102 may update the metadata (e.g., Metadata 1) stored by ProSe Function/ENS 2104 by sending message 2118 that includes updated metadata (e.g., Metadata 2). In an aspect, the message 2118 may include an instruction to update the metadata. The ProSe Function/ENS 2104 may generate an updated ID associated with the updated metadata. The ProSe Function/ENS 2104 may then configure the bit string associated with the ProSe Application Name and the updated ID associated with the updated metadata in a second expression code (e.g., Expression Code 2). As shown in FIG. 21, the ProSe Function/ENS 2104 sends a message 2120 that includes the second expression code (e.g., Expression Code 2) to the second UE 2102.

As shown in FIG. 21, the second UE 2102 announces (e.g., broadcasts over-the-air) message 2122 that includes Expression Code 2. The first UE 2106 receives the message 2122 and determines that Expression Code 2 in message 2122 is of interest to the first UE 2106. For example, the first UE 2106 may make the determination based on one or more criteria configured by the user of the first UE 2106. The first UE 2106 sends a Match Report message 2124 that includes the Expression Code 2 to the ProSe Function/ENS 2104. The ProSe Function/ENS 2104 extracts the bit string and the updated ID associated with the updated metadata (e.g., Metadata 2) from the Expression Code 2 included in the Match Report message 2124. The ProSe Function/ENS 2104 then identifies the ProSe Application Name (e.g., Expr1) associated with the bit string and the updated metadata associated with the updated ID. The ProSe Function/ENS 2104 then sends a message 2126 that includes the ProSe Application Name (e.g., Expr1) and the updated metadata (e.g., Metadata 2). The first UE 2106 receives the message 2126 and determines that Expression Code 2 corresponds to the ProSe Application Name (e.g., Expr1) and the updated metadata (e.g., Metadata 2) received via message 2126. Therefore, in the aspect of FIG. 21, the second UE 2102 may update the metadata associated with the ProSe Application Name and the first UE 2106 may retrieve the updated metadata from the ProSe Function/ENS 2104, without requiring the ProSe Function/ENS 2104 to execute a push function to notify one or more monitoring UEs of the updated metadata.

Figure 22:
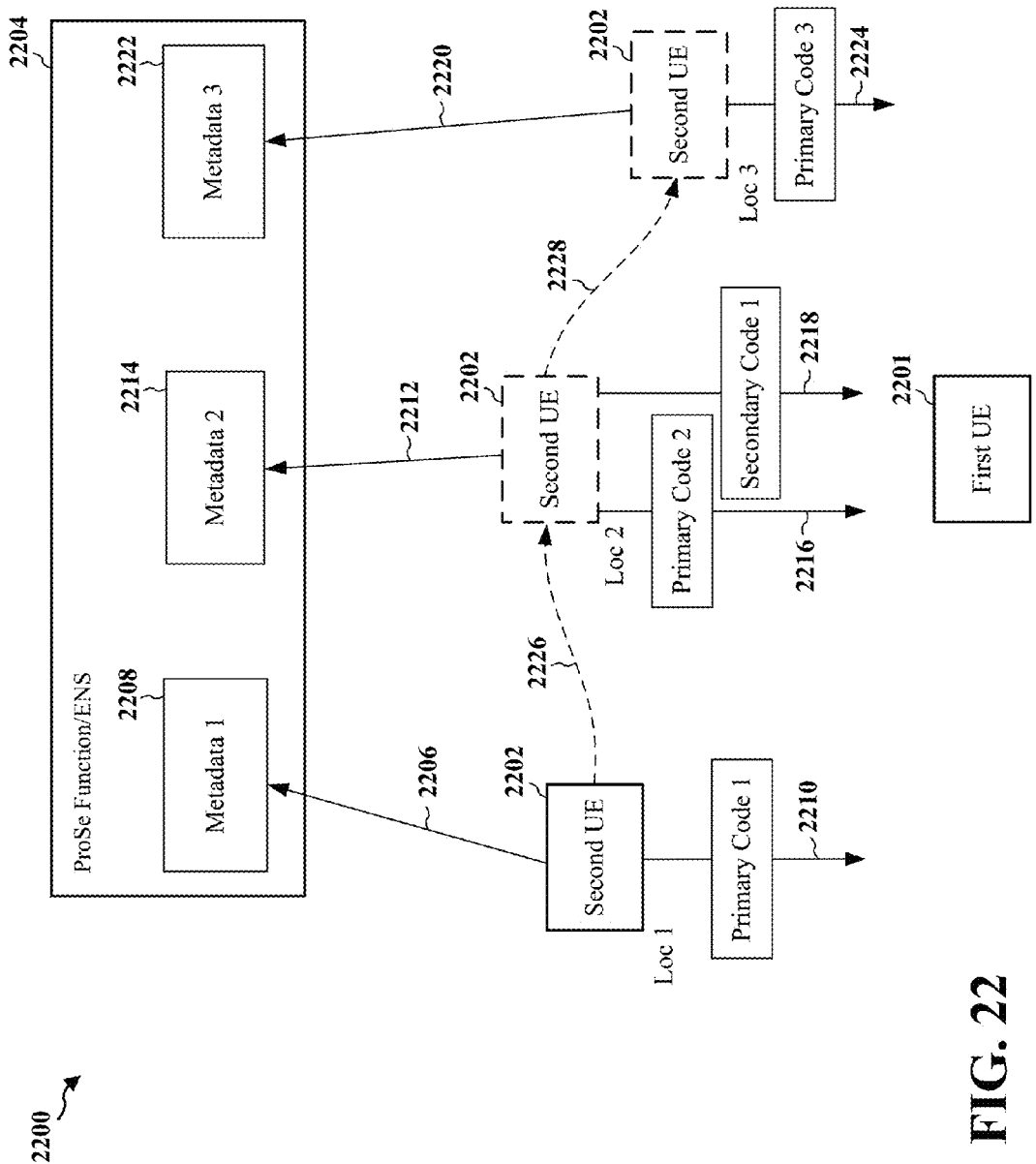
FIG. 22 is a diagram illustrating an exemplary network.

FIG. 22 is a diagram illustrating an exemplary network 2200. As shown in FIG. 22, network 2200 includes first UE 2201, second UE 2202, and ProSe Function/ENS 2204. As shown in FIG. 22, the first UE 2201 in network 2200 may be monitoring expression codes transmitted (e.g., broadcasted) by one or more announcing UEs, such as second UE 2202. In an aspect, second UE 2202 may be located at a first location (indicated as "Loc 1" in FIG. 22) and may remain stationary at location 1. The second UE 2202 may determine the location of second UE 2202 and may send an announcement 2206 that includes a ProSe Application Name and/or metadata (e.g., Metadata 1 2208). In an aspect, the metadata may include the stationary location information (e.g., "Loc 1") of the second UE 2202. For example, the stationary location information may be geographic coordinates (e.g., GPS coordinates or GPS data) indicating the location of the second UE 2202 remaining stationary at the first location. The ProSe Function/ENS 2204 may store the metadata (e.g., e.g., Metadata 1 2208) in a memory and may provide the second UE 2202 a primary expression code (e.g., Primary Code 1) associated with the ProSe Application Name and/or the metadata (e.g., Metadata 1 2208). The second UE 2202 may transmit a message 2210 that includes the primary expression code (e.g., Primary Code 1).

As shown in FIG. 22, the second UE 2202 may no longer remain stationary and may move along exemplary path 2226 to a second location (indicated as "Loc 2"). The second UE 2202 may determine the location of second UE 2202 and may send an update message 2212 that includes the ProSe Application Name and/or updated metadata (e.g., Metadata 2 2214). In an aspect, the updated metadata may include information for identifying a secondary expression code (e.g., Secondary Code 1) that includes the current location (e.g., "Loc 2") of the moving second UE 2202. The ProSe Function/ENS 2204 may store the updated metadata (e.g., e.g., Metadata 2 2214) in a memory and may provide the second UE 2202 a second primary expression code (e.g., Primary Code 2) associated with the ProSe Application Name and/or the updated metadata (e.g., Metadata 2 2214). The second UE 2202 may transmit a message 2216 that includes the second primary expression code (e.g., Primary Code 2) and a message 2218 that includes the secondary expression code (e.g., Secondary Code 1).

As shown in FIG. 22, the second UE 2202 may continue moving along exemplary path 2228 and may arrive at a third location (indicated as "Loc 3" in FIG. 22) and may remain stationary at the third location. The second UE 2202 may determine the location of second UE 2202 and may send an update message 2220 that includes a ProSe Application Name and/or updated metadata (e.g., Metadata 3 2222). In an aspect, the updated metadata (e.g., Metadata 3 2222) may include the stationary location information (e.g., "Loc 3") of the second UE 2202. For example, the stationary location information may be geographic coordinates (e.g., GPS coordinates or GPS data) indicating the location of the second UE 2202 remaining stationary at the third location. The ProSe Function/ENS 2204 may store the updated metadata (e.g., e.g., Metadata 3 2222) in a memory and may provide the second UE 2202 a third primary expression code (e.g., Primary Code 3) associated with the ProSe Application Name and/or the updated metadata (e.g., Metadata 3 2222). The second UE 2202 may transmit a message 2224 that includes the third primary expression code (e.g., Primary Code 3).

Figure 23:
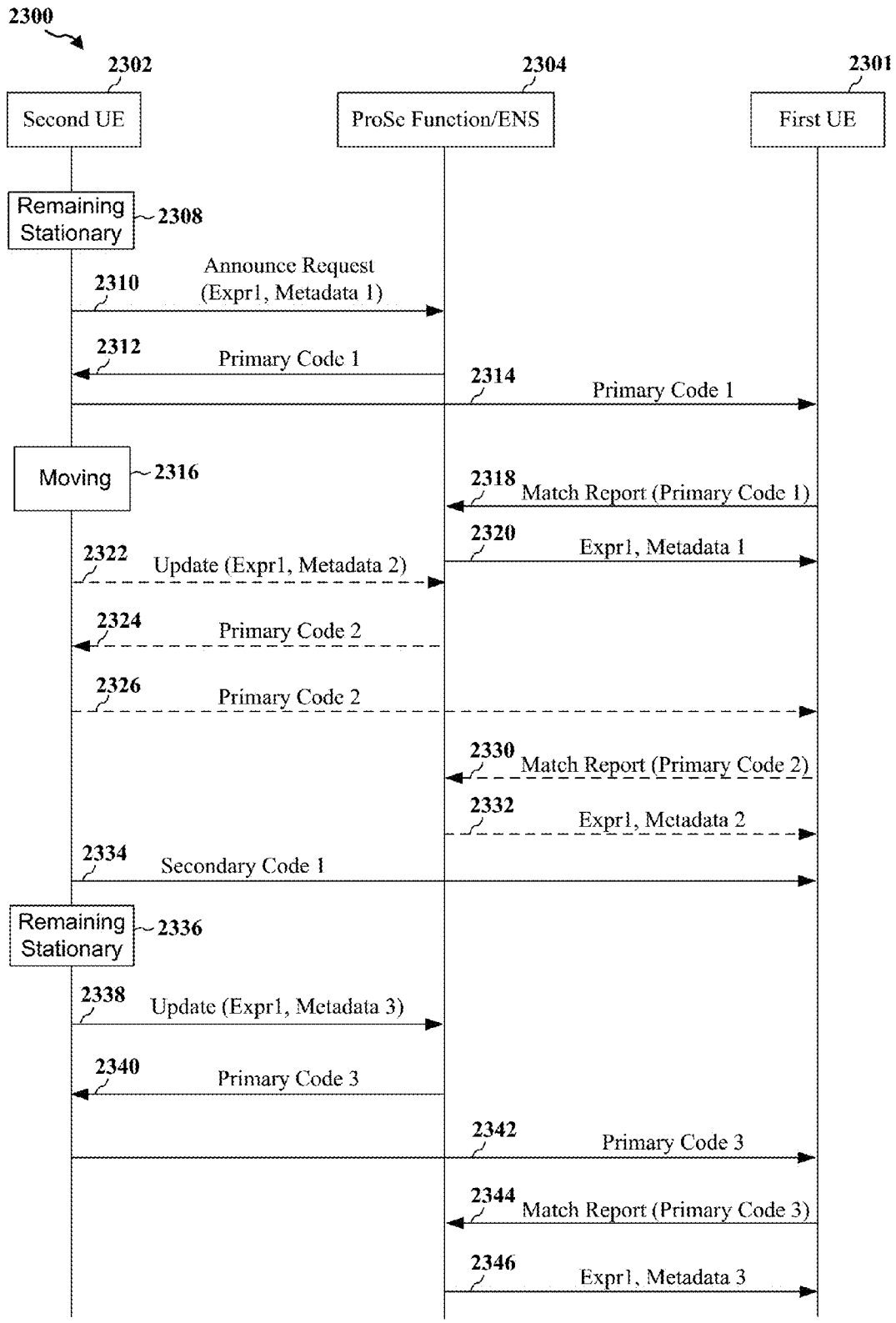
FIG. 23 is a diagram illustrating a communication flow in accordance with various aspects of the disclosure.

FIG. 23 is a diagram 2300 illustrating a communication flow in accordance with various aspects of the disclosure. It should be understood that the transmissions indicated with dotted lines in FIG. 23 represent optional transmissions for illustrating various aspects of the disclosure. In an aspect, the first UE 2301, second UE 2302, and the ProSe Function/ENS 2304 in FIG. 23 may respectively correspond to the first UE 2201, second UE 2202, and the ProSe Function/ENS 2204 in FIG. 22.

As shown in FIG. 23, a second UE 2302 remains stationary 2308 at a first location (e.g., "Loc 1"). The second UE 2302 may determine the location of the second UE 2302 and may send an Announce Request message 2310 that includes a ProSe Application Name (e.g., Expr1) and metadata (e.g., Metadata 1) associated with the ProSe Application Name. For example, the second UE 2302 may determine the location of second UE 2302 by receiving GPS data from a satellite or by receiving location information from a network (e.g., via WiFi™ network scanning) In an aspect, the Metadata 1 may include the stationary location information (e.g., "Loc 1") of the second UE 2202. For example, the stationary location information may be geographic coordinates (e.g., GPS coordinates or GPS data) indicating the location of the stationary second UE 2302. For example, the ProSe Application Name may be a description of an application that is to be announced by the second UE 2302, where the description is used by one or more monitoring UEs (e.g., first UE 2301) to determine whether the application of the second UE 2302 is of interest to the one or more monitoring UEs. The ProSe Function/ENS 2304 receives the Announce Request message 2310 and may configure the ProSe Application Name (e.g., Expr1) and the Metadata 1 (or information associated with the Metadata 1, such as a metadata ID) into a first expression code (e.g., Primary Code 1). For example, and as described supra, an expression code may be a sequence of bits suitable for an over-the-air transmission and may be configured to enable one or more monitoring UEs (e.g., first UE 2301) to determine whether the announcement from the second UE 2302 is of interest to the one or more monitoring UEs. As shown in FIG. 23, the ProSe Function/ENS 2304 sends a message 2312 that includes the first primary expression code (e.g., Primary Code 1) to the second UE 2302.

As shown in FIG. 23, the second UE 2302 announces (e.g., broadcasts over-the-air) message 2314 that includes Primary Code 1. The first UE 2301 receives the message 2314 and determines that the Primary Code 1 in message 2314 is of interest to the first UE 2301. For example, the first UE 2301 may make the determination based on one or more criteria configured by a user of the first UE 2301. The first UE 2301 sends a Match Report message 2318 that includes the Primary Code 1 to the ProSe Function/ENS 2304. The ProSe Function/ENS 2304 matches the Primary Code 1 to the ProSe Application Name and the Metadata 1. The ProSe Function/ENS 2104 then sends a message 2320 that includes the ProSe Application Name and Metadata 1. The first UE 2301 receives the message 2320 and determines the stationary location (e.g., "Loc 1") of the second UE 2302 based on Metadata 1. As shown in FIG. 23, the second UE 2302 may no longer remain stationary and may begin moving 2316 to a second location (e.g., "Loc 2"). The second UE 2302 may determine the location (e.g., "Loc 2") of the second UE 2302 when the second UE 2302 has moved from the stationary location (e.g., "Loc 1"). For example, the second UE 2302 may determine the location of second UE 2302 by receiving GPS data from a satellite or by receiving location information from a network.

In an aspect, when the second UE 2302 has started moving 2316, the second UE 2302 may transmit a message 2334 that includes a secondary expression code (e.g., Secondary Code 1). For example, the secondary expression code may be a sequence of bits suitable for an over-the-air transmission (e.g., broadcast) to one or more monitoring UEs. The secondary expression code may further enable a monitoring UE (e.g., the first UE 2301) to determine the current location of the second UE 2302 when the second UE 2302 has started moving 2316. In an aspect, the secondary expression code may have two components. For example, the first component may be information (also referred to as a "dependent code") that links the secondary expression code to a primary expression code (e.g., Primary Code 1 or Primary Code 2 in FIG. 23), and the second component may include information representing the current location (e.g., "Loc 2") of the moving second UE 2302. In an aspect, the second UE 2302 may acquire the dependent code by sending a PAI to the ProSe Function/ENS 2304. In such aspect, the ProSe Function/ENS 2034 may generate and assign the dependent code using the PAI, and may send the dependent code to the second UE 2302. In another aspect, the dependent code may be the output of a private expression code passed through a hash function. In another aspect, the second UE 2302 may acquire the dependent code by sending a private expression name (e.g., Restricted ProSe Application User ID) to the ProSe Function/ENS 2304. In such aspect, the ProSe Function/ENS 2304 may generate and assign the dependent code using the private expression name, and may send the dependent code to the second UE 2302. In another aspect, the second UE 2302 may request the dependent code from the ProSe Function/ENS 2034 and may receive the dependent code from the ProSe Function/ENS 2034 in response to the request. Therefore, it should be understood that the dependent code may be generated independently by the second UE 2302 or acquired via communication with a network device, such as a ProSe Function (e.g., ProSe Function/ENS 2304) or other application server (e.g., third-party social network).

The second UE 2302 may communicate the dependent code to a monitoring UE (e.g., the first UE 2301) in different ways. In one aspect, with reference to FIG. 23, the second UE 2302 may include the dependent code in Metadata 1 that is sent in Announce Request message 2310. In such aspect, the first UE 2301 receives Metadata 1 in the message 2320 and determines the dependent code using Metadata 1. The first UE 2301 then uses the dependent code to identify and/or decode the Secondary Code 1 in message 2334. In an aspect, the second UE 2302 may transmit a primary expression code (e.g., Primary Code 1 or Primary Code 2) when the second UE 2302 has started moving and may set a flag in the primary expression code that indicates to a monitoring UE (e.g., first UE 2301) that the second UE 2302 has started moving. Upon detecting Primary Code 2 or the flag in the Primary Code 1 or Primary Code 2, the first UE 2301 may monitor for a secondary expression code (e.g., Secondary Code 1) using the dependent code acquired previously in order to determine the current location of the moving second UE 2302.

In another aspect, the second UE 2302 may communicate the dependent code to a monitoring UE (e.g., the first UE 2301) by including the dependent code in the bits of a primary expression code (e.g., Primary Code 1, 2, and/or 3 in FIG. 23). In such aspect, the first UE 2301 may use the dependent code to identify and/or decode any secondary expression codes that include the current location of the moving second UE 2302.

In another aspect, the second UE 2302 may generate the dependent code based on the bits of a primary expression code. For example, the second UE 2302 may apply a hash function to the bits of a primary expression code (e.g., Primary Code 1), where the output of the hash function represents the dependent code. In such example, a monitoring UE (e.g., the first UE 2301) may receive the bits of the primary expression code and may apply the same hash function on the bits of the primary expression code to determine the dependent code.

In another aspect, with reference to FIG. 23, the second UE 2302 may send an update message 2322 that includes the ProSe Application Name (e.g., Expr1) and updated metadata (e.g., Metadata 2), where the updated metadata includes the dependent code. In such aspect, the ProSe Function/ENS 2304 may store Metadata 2 in a memory and may configure the ProSe Application Name (e.g., Expr1) and the Metadata 2 (or information associated with the Metadata 2, such as a metadata ID) into a second primary expression code (e.g., Primary Code 2). As shown in FIG. 23, the ProSe Function/ENS 2304 may send a message 2324 that includes the second primary expression code (e.g., Primary Code 2) to the second UE 2302. As further shown in FIG. 23, the second UE 2302 announces (e.g., broadcasts over-the-air) message 2326 that includes a Primary Code 2.

As shown in FIG. 23, the first UE 2301 receives the message 2326 and determines that the Primary Code 2 in message 2326 is of interest to the first UE 2301. For example, the first UE 2301 may make the determination based on one or more criteria configured by a user of the first UE 2301. As shown in FIG. 23, in one aspect, the first UE 2301 may send a Match Report message 2330 that includes the Primary Code 2 to the ProSe Function/ENS 2304. The ProSe Function/ENS 2304 may match the Primary Code 2 to the ProSe Application Name (e.g., Expr1) and the updated metadata (e.g., Metadata 2). The ProSe Function/ENS 2104 may send a message 2332 that includes the ProSe Application Name and Metadata 2. The first UE 2301 may receive Metadata 2 via message 2332 and may determine the dependent code included in Metadata 2. The first UE 2301 may use the dependent code to identify and/or decode Secondary Code 1 in message 2334 in order to determine the current location (e.g., "Loc 2") of the moving second UE 2302 included in the Secondary Code 1.

With respect to the aspects described supra, after the second UE 2302 acquires location information indicating the current location (e.g., "Loc 2") of the second UE 2302 and further acquires the dependent code, the second UE 2302 may compress the location information to generate the second component of the secondary expression code (e.g., Secondary Code 1). Therefore, after acquiring the first and second components of the secondary expression code, the second UE 2302 may generate the secondary expression code without additional communication with a network device (e.g., ProSe Function/ENS 2304). In an aspect, the second UE 2302 may compress the location information using a modem or other hardware of the second UE 2302 in order to reduce power consumption in the second UE 2302. In other aspects, if the second UE 2302 is not power constrained, the second UE 2302 may communicate with a network device (e.g., ProSe Function/ENS 2304 or a location server) to obtain new location information from the network device.

With further respect to the aspects described supra, after the first UE 2301 receives the secondary expression code (e.g., Secondary Code 1), the first UE 2301 may determine the location information from the secondary expression code. For example, the first UE 2301 may extract location information (e.g., compressed data bits) representing the current location of the second UE 2302 from the second component of the secondary expression code. The first UE 2301 may then decode the location information to determine the current location of the second UE 2302. Such extraction and decoding of the location information may be performed by the first UE 2301 using a modem or other hardware of the first UE 2301. Therefore, the first UE 2301 may extract and decode the location information to determine the current location of the second UE 2302 without additional communication with a network device (e.g., ProSe Function/ENS 2304). In other aspects, if the first UE 2301 is not power constrained, the first UE 2301 may provide the location information extracted from the secondary expression code to a network device (e.g., ProSe Function/ENS 2304 or location server), which may decode the location information and provide the decoded location information to the first UE 2301.

As shown in FIG. 23, the second UE 2302 remains stationary 2336 at a third location (e.g., "Loc 3"). The second UE 2302 may determine the location of second UE 2302 and may send an update message 2338 that includes a ProSe Application Name (e.g., Expr1) and updated metadata (e.g., Metadata 3) associated with the ProSe Application Name. In an aspect, Metadata 3 may include the stationary location information (e.g., "Loc 3") of the second UE 2302. For example, the stationary location information may be geographic coordinates (e.g., GPS coordinates or GPS data) indicating the location of the stationary second UE 2302. The ProSe Function/ENS 2304 receives the update message 2338 and may configure the ProSe Application Name (e.g., Expr1) and Metadata 3 (or information associated with the Metadata 3, such as a metadata ID) into a third primary expression code (e.g., Primary Code 3). For example, the third primary expression code may be a sequence of bits suitable for an over-the-air transmission and may be configured to enable one or more monitoring UEs (e.g., first UE 2301) to determine whether the announcement from the second UE 2302 is of interest to the one or more monitoring UEs. As shown in FIG. 23, the ProSe Function/ENS 2304 sends a message 2340 that includes the third primary expression code (e.g., Primary Code 3) to the second UE 2302.

As shown in FIG. 23, the second UE 2302 announces (e.g., broadcasts over-the-air) message 2342 that includes Primary Code 3. The first UE 2301 receives the message 2342 and determines that the Primary Code 3 in message 2342 is of interest to the first UE 2301. For example, the first UE 2301 may make the determination based on one or more criteria configured by a user of the first UE 2301. The first UE 2301 sends a Match Report message 2344 that includes the Primary Code 3 to the ProSe Function/ENS 2304. The ProSe Function/ENS 2304 matches the Primary Code 3 to the ProSe Application Name and the Metadata 3. The ProSe Function/ENS 2104 then sends a message 2346 that includes the ProSe Application Name and Metadata 3. The first UE 2301 receives the message 2346 and determines the stationary location (e.g., "Loc 3") of the second UE 2302 based on Metadata 3.

Figure 24:
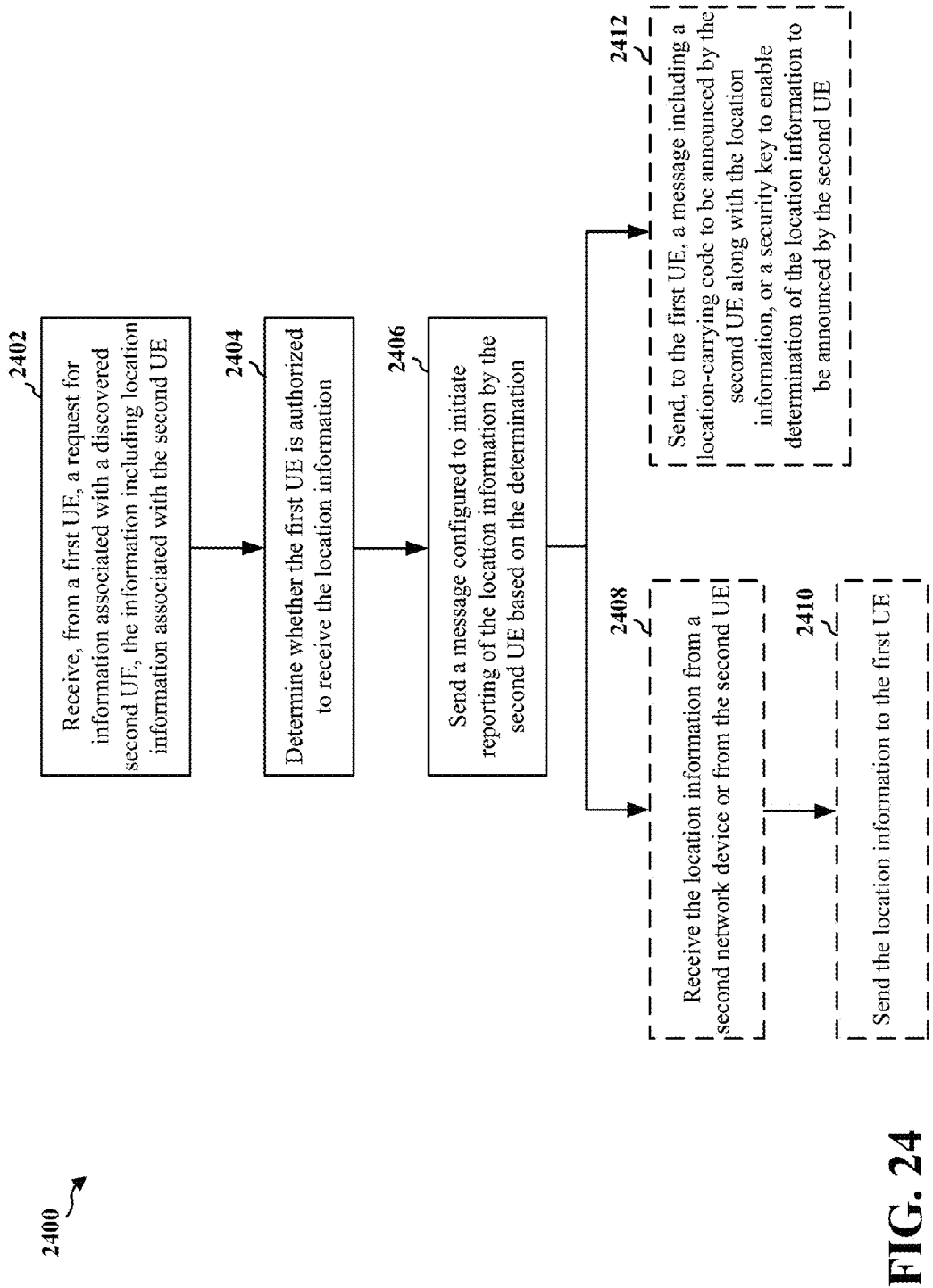
FIG. 24 is a flow chart of a method of communication.

FIG. 24 is a flow chart 2400 of a method of communication. The method may be performed by a network device (e.g., the ProSe Function 1012, 1112, 1212, the apparatus 3002/3002'). It should be understood that the steps represented with dotted lines in FIG. 24 represent optional steps.

At step 2402, the network device receives, from a first UE, a request for information associated with a discovered second UE, the information including location information associated with the second UE. For example, with reference to FIG. 10, the ProSe Function 1012 receives message 1016 from UE_B 1004 including a request for location information associated with UE_A 1002. In an aspect, the request for the location information is received in a match report message from the first UE.

At step 2404, the network device determines whether the first UE is authorized to receive the location information.

At step 2406, the network device sends a message configured to initiate reporting of the location information by the second UE based on the determination. For example, with reference to FIG. 10, the ProSe Function 1012 initiates the reporting by sending a request 1018 to the location server 1014 for the requested location information. In an aspect, the location server 1014 may send a message 1020 to the UE_A 1002 using LTE protocols requesting the location information. As another example, with reference to FIG. 11, the ProSe Function 1112 initiates the reporting by sending a message 1116 to the UE_A 1102 using LTE protocols requesting the UE_A 1102 to update its metadata with current location information.

At step 2408, the network device receives the location information from a second network device or from the second UE. In an aspect, the location information received from the second UE is included in metadata associated with the second UE.

At step 2410, the network device sends the location information to the first UE. In an aspect, the location information is sent to the first UE in a match report acknowledgment message.

Finally, at step 2412, the network device sends, to the first UE, a message including a location-carrying code to be announced by the second UE along with the location information, or a security key to enable determination of the location information to be announced by the second UE. For example, if the location information announced by the second UE is encrypted using the security key, the security key may be used to decrypt the encrypted location information announced by the second UE. As another example, the security key may be used to perform the inverse of the cryptographic function applied to the location information announced by the second UE to enable determination of the location information.

Figure 25:
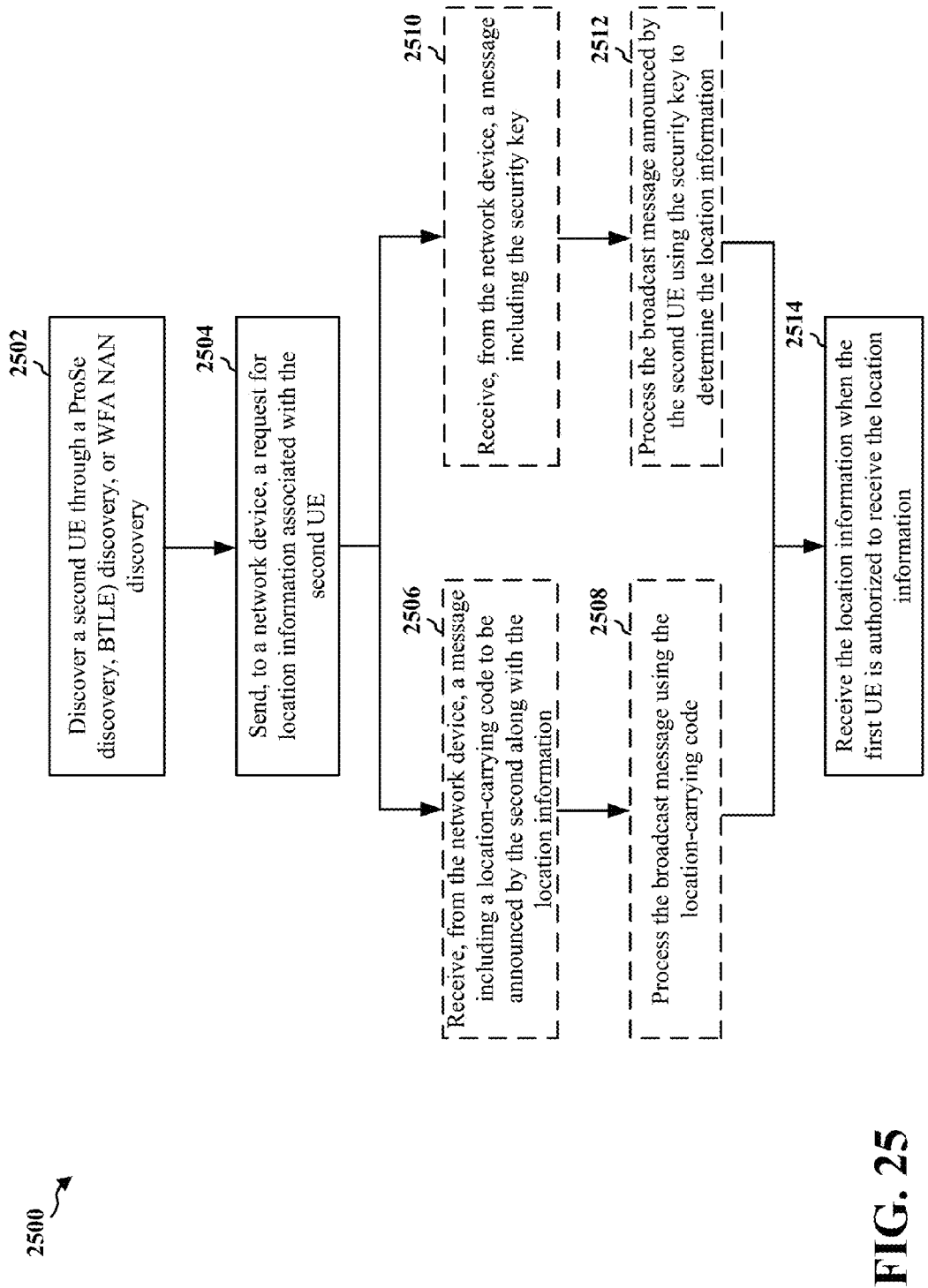
FIG. 25 is a flow chart of a method of wireless communication.

FIG. 25 is a flow chart 2500 of a method of wireless communication. The method may be performed by a first UE (e.g., UE_B 1004, 1104, 1204, the apparatus 3202/3202'). It should be understood that the steps represented with dotted lines in FIG. 25 represent optional steps.

At step 2502, the UE discovers a second UE through a ProSe discovery, BTLE discovery, or WFA NAN discovery.

At step 2504, the UE sends, to a network device, a request for location information associated with the second UE. In an aspect, the request for the location information is sent to the network device in a match report message. In an aspect, the network device is a ProSe server configured to support ProSe Functions.

At step 2506, the UE receives, from the network device, a message including a location-carrying code to be announced by the second UE along with the location information. In an aspect, the location information is received from the second UE in a broadcast message.

At step 2508, the UE processes the broadcast message using the location-carrying code to obtain the location information.

At step 2510, the UE receives, from the network device, a message including the security key to enable determination of the location information to be announced by the second UE.

At step 2512, the UE processes the broadcast message using the security key. For example, if the location information announced by the second UE is encrypted using the security key, the UE may use the security key to decrypt the encrypted location information announced by the second UE. As another example, the UE may use the security key to perform the inverse of the cryptographic function applied to the location information announced by the second UE to determine the location information.

At step 2514, the UE receives the location information when the UE is authorized to receive the location information. In an aspect, the location information is received from the network device in a match report acknowledgment message.

Figure 26:
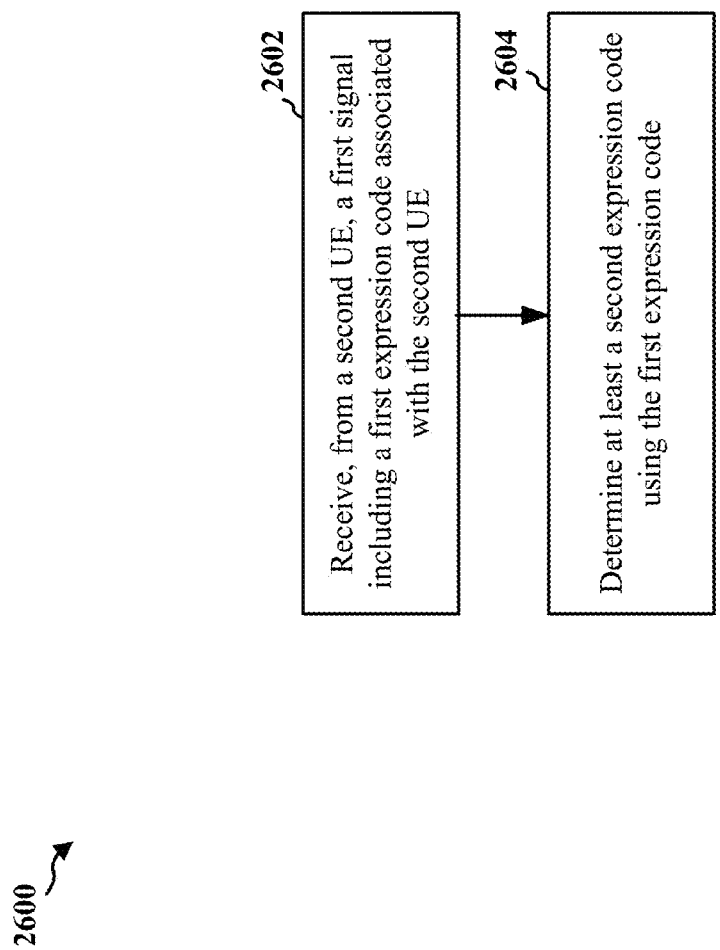
FIG. 26 is a flow chart of a method of wireless communication.

FIG. 26 is a flow chart 2602 of a method of wireless communication. The method may be performed by a first UE (e.g., UE_B 1004, 1104, 1204, the apparatus 3202/3202').

At step 2602, the first UE receives, from a second UE, a first signal including a first expression code associated with the second UE.

At step 2604, the first UE determines at least a second expression code using the first expression code, the at least a second expression code associated with the second UE. In an aspect, the first UE determines the at least a second expression code by receiving, from the second UE, a second signal including a first prefix and the at least a second expression code, applying a function to the first expression code to generate a second prefix, comparing the second prefix to the first prefix, determining the at least a second expression code in the second signal when the second prefix matches the first prefix. In an aspect, the first UE determines the at least a second expression code by sending the first expression code to a network device, and receiving the at least a second expression code associated with the second UE from the network device. For example, with reference to FIG. 18A, the first expression code may be code 1 1808, the first prefix may be prefix 1812, and the second expression code may be code 2 1814. In an aspect, the first signal including the first expression code is received in a first discovery resource and the second signal comprising the at least a second expression code is received in a second discovery resource, wherein the first discovery resource is independent of the second discovery resource. In an aspect, the function is a hash function. In an aspect, the first expression code is sent to the network device in a match report message. In an aspect, the network device is a ProSe Function. In an aspect, the first expression code or the at least a second expression code corresponds to a service of the second UE or an application of the second UE.

Figure 27:
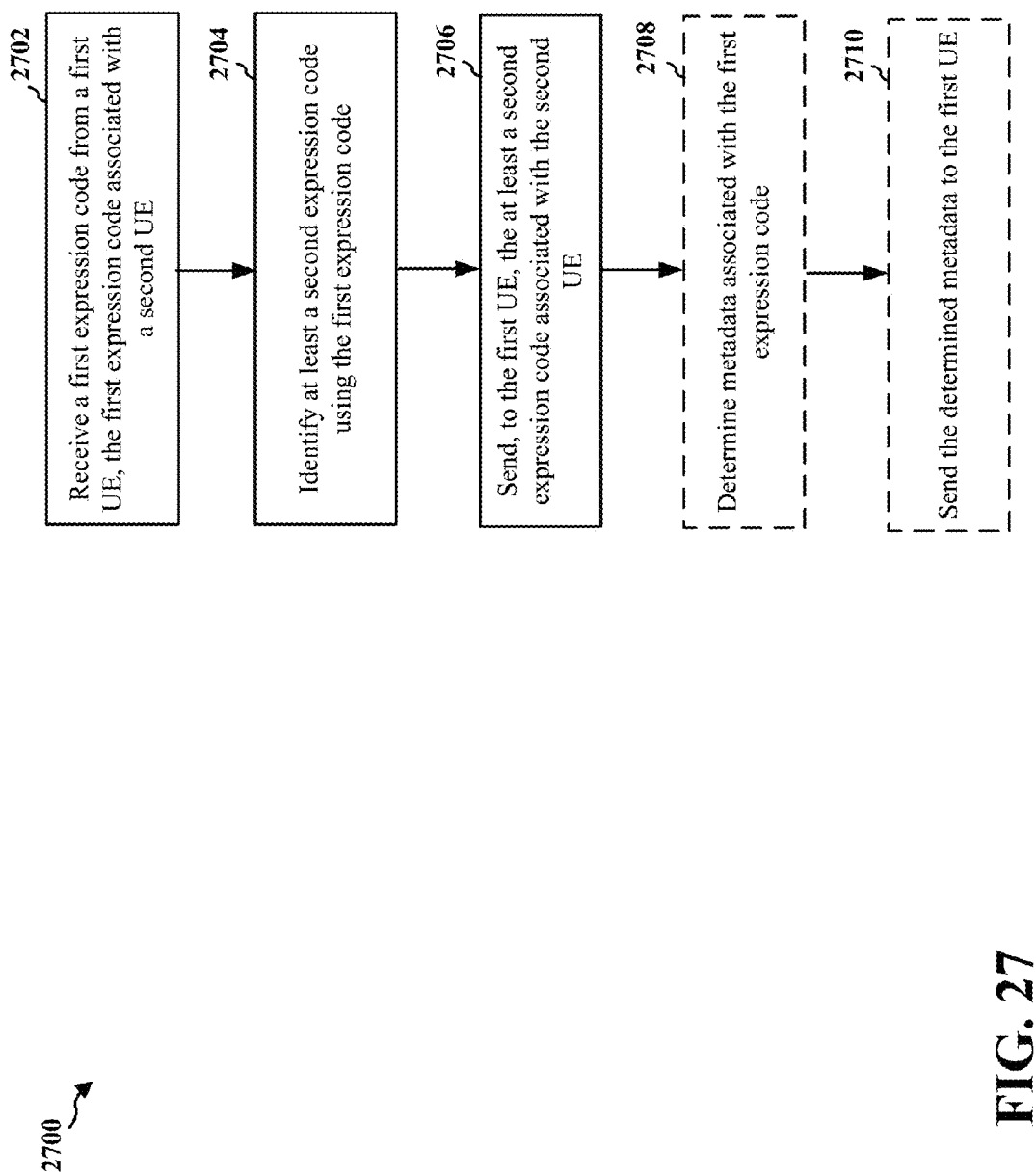
FIG. 27 is a flow chart of a method of wireless communication.

FIG. 27 is a flow chart 2700 of a method of wireless communication. The method may be performed by a network device (e.g., the ProSe Functions 1012, 1112, 1212, the apparatus 3002/3002'). It should be understood that the steps represented with dotted lines in FIG. 27 represent optional steps.

At step 2702, the network device receives a first expression code from a first UE, the first expression code associated with a second UE. In an aspect, the network device is a ProSe Function. In an aspect, the first expression code is received in a match report message from the first UE.

At step 2704, the network device identifies at least a second expression code using the first expression code, the at least a second expression code associated with the second UE.

At step 2706, the network device sends, to the first UE, the at least a second expression code associated with the second UE.

At step 2708, the network device determines metadata associated with the first expression code.

At step 2710, the network device sends the determined metadata to the first UE.

Figure 28:
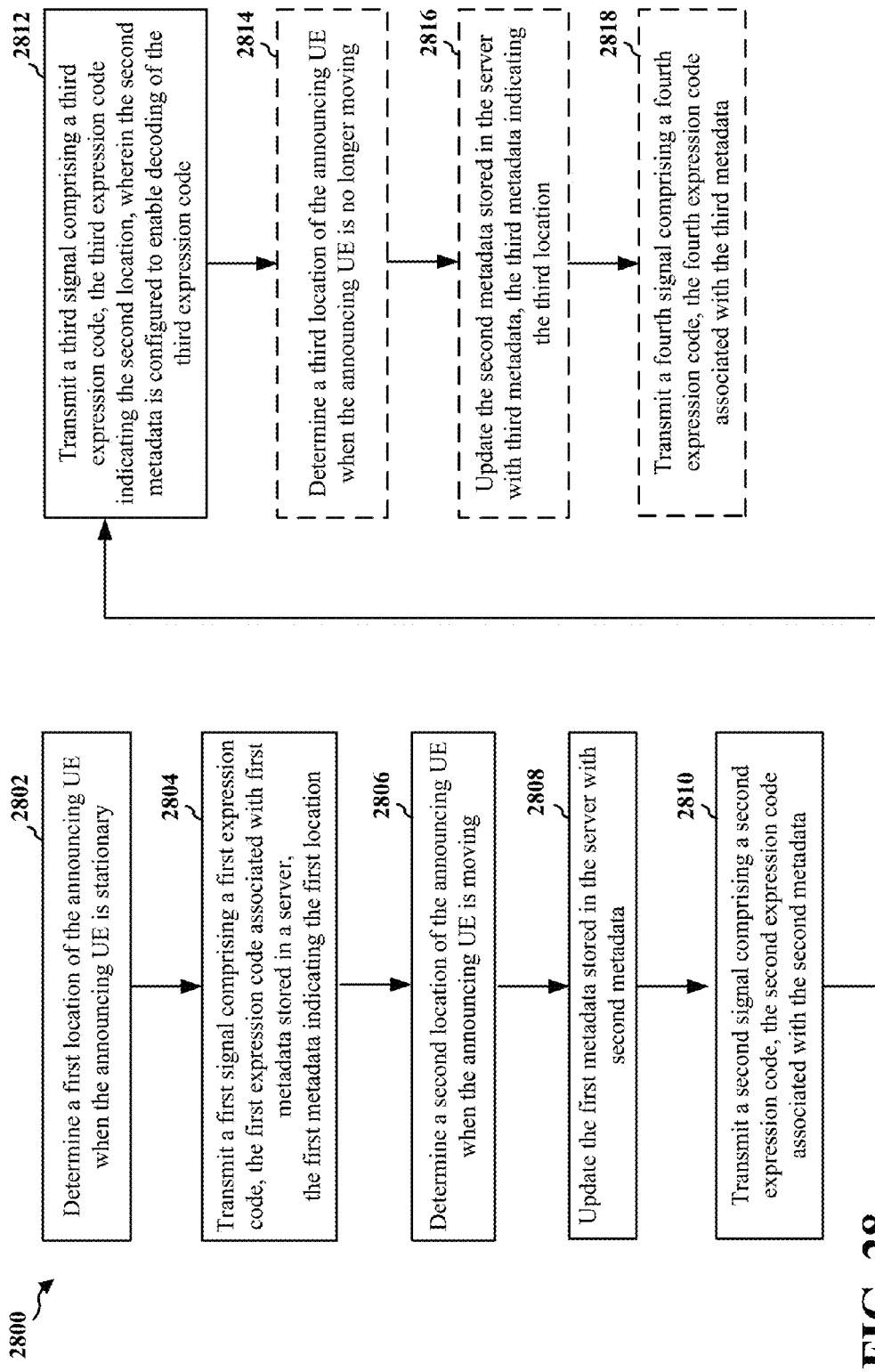
FIG. 28 is a flow chart of a method of wireless communication.

FIG. 28 is a flow chart 2800 of a method of wireless communication. The method may be performed by an announcing UE (e.g., second UE 1702, second UE 1802, second UE 1902, second UE 2202, second UE 2302, the apparatus 3402/3402'). It should be understood that the steps represented with dotted lines in FIG. 28 represent optional steps.

At step 2802, the announcing UE determines a first location of the announcing UE when the announcing UE is stationary.

At step 2804, the announcing UE transmits a first signal comprising a first expression code, the first expression code associated with first metadata stored in a server, the first metadata indicating the first location. For example, with reference to FIG. 23, the second UE 2302 may transmit message 2314 that includes Primary Code 1.

At step 2806, the announcing UE determines a second location of the announcing UE when the announcing UE is moving.

At step 2808, the announcing UE updates the first metadata stored in the server with second metadata. For example, with reference to FIG. 23, the second UE 2302 may send update message 2322 that includes updated metadata (e.g., Metadata 2).

At step 2810, the announcing UE transmits a second signal comprising a second expression code, the second expression code associated with the second metadata. For example, with reference to FIG. 23, the second UE 2302 may transmit message 2326 that includes Primary Code 2.

At step 2812, the announcing UE transmits a third signal comprising a third expression code, the third expression code indicating the second location, wherein the second metadata is configured to enable decoding of the third expression code. For example, with reference to FIG. 23, the second UE 2302 may transmit a message (e.g., message 2334) that includes Secondary Code 1.

At step 2814, the announcing UE determines a third location of the announcing UE when the announcing UE is no longer moving.

At step 2816, the announcing UE updates the second metadata stored in the server with third metadata, the third metadata indicating the third location. For example, with reference to FIG. 23, the second UE 2302 may transmit update message 2338 that includes updated metadata (e.g., Metadata 3).

At step 2818, the announcing UE transmits a fourth signal comprising a fourth expression code, the fourth expression code associated with the third metadata. For example, with reference to FIG. 23, the second UE 2302 may transmit message 2342 that includes Primary Code 3.

Figure 29:
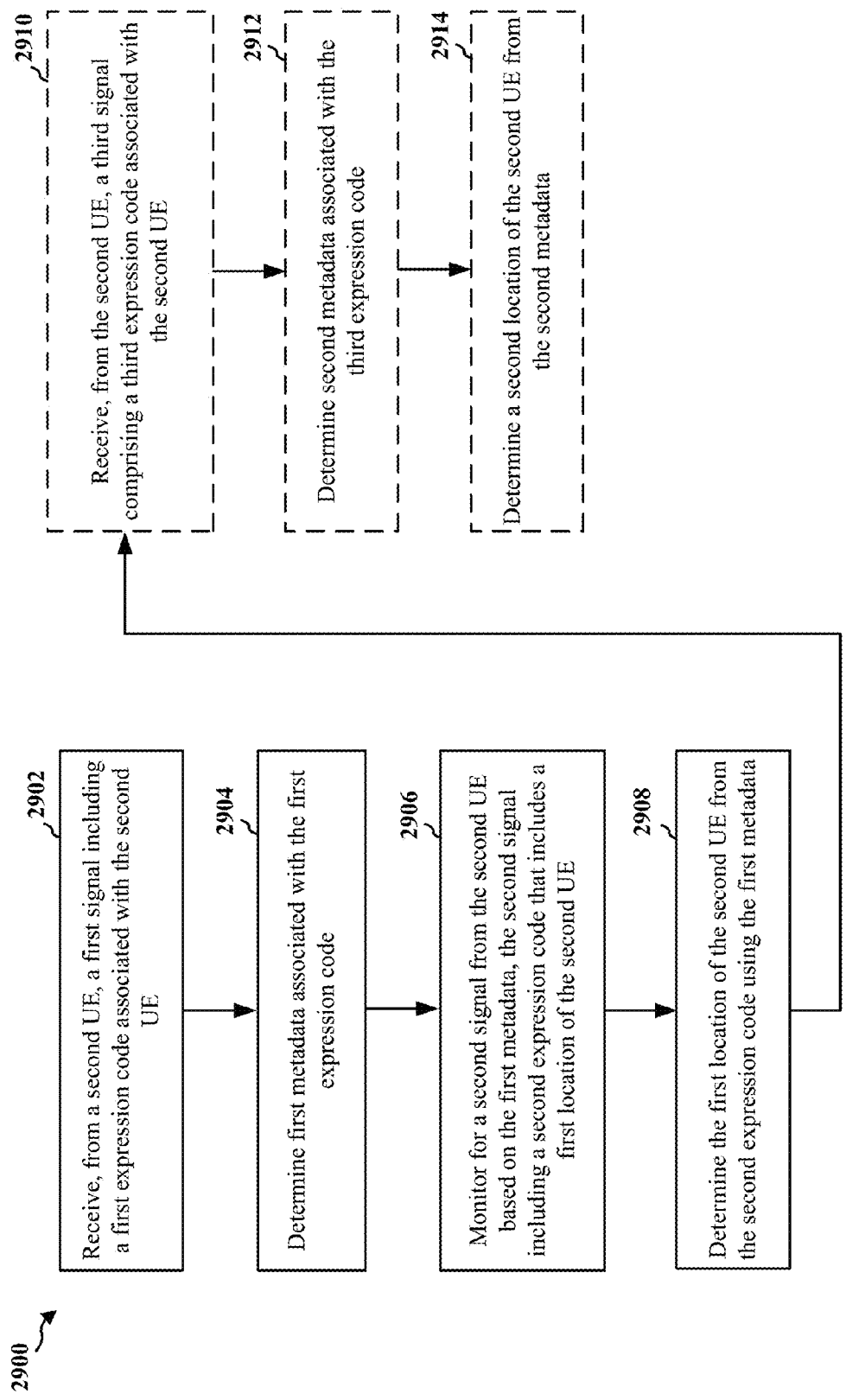
FIG. 29 is a flow chart of a method of wireless communication.

FIG. 29 is a flow chart 2900 of a method of wireless communication. The method may be performed by a first UE (e.g., first UE 1704, first UE 1804, first UE 1904, first UE 2201, first UE 2301, the apparatus 3202/3202'). It should be understood that the steps represented with dotted lines in FIG. 29 represent optional steps.

At step 2902, the first UE receives, from a second UE, a first signal including a first expression code associated with the second UE. For example, with reference to FIG. 23, the first UE 2301 may receive a message 2326 that includes Primary Code 2.

At step 2904, the first UE determines first metadata associated with the first expression code. For example, with reference to FIG. 23, the first UE 2301 may determine Metadata 2 by performing a match report operation based on Primary Code 2.

At step 2906, the first UE monitors for a second signal from the second UE based on the first metadata, the second signal comprising a second expression code that includes a first location of the second UE. For example, with reference to FIG. 23, the first UE 2301 may monitor for the Secondary Code 1 in message 2334 based on information included in Metadata 2.

At step 2908, the first UE determines the first location of the second UE from the second expression code using the first metadata. For example, with reference to FIG. 23, the first UE 2301 may decode Secondary Code 1 using Metadata 2 to determine geographic coordinates included in Secondary Code 1.

At step 2910, the first UE receives, from the second UE, a third signal comprising a third expression code associated with the second UE. For example, with reference to FIG. 23, the first UE 2301 may receive a message that includes Primary Code 3.

At step 2912, the first UE determines second metadata associated with the third expression code. For example, with reference to FIG. 23, the first UE 2301 determine Metadata 3 by performing a match report operation based on Primary Code 3.

At step 2914, the first UE determines a second location of the second UE from the third expression code. For example, with reference to FIG. 23, the first UE 2301 may determine geographic coordinates included in Metadata 3.

Figure 30:
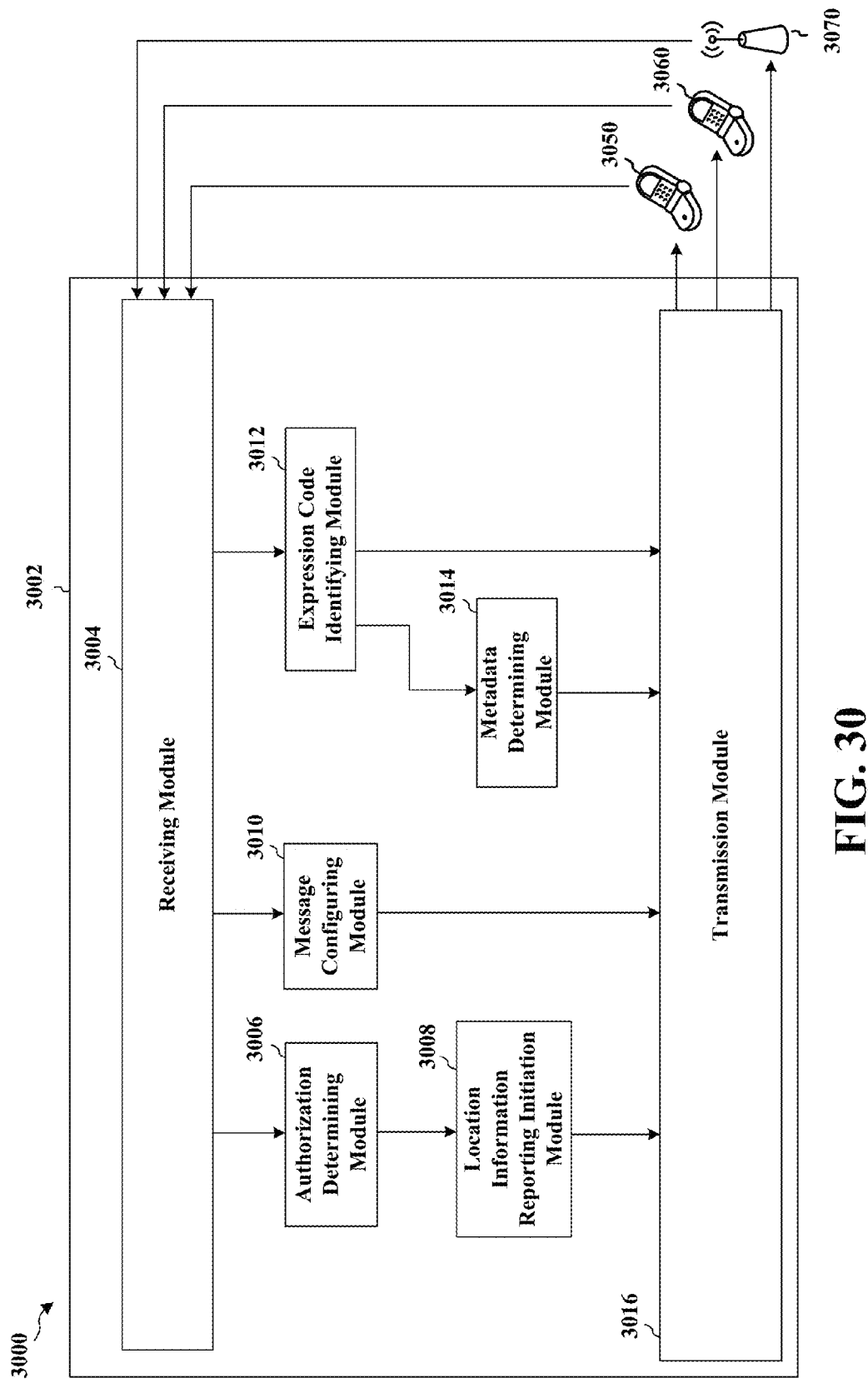
FIG. 30 is a conceptual data flow diagram illustrating the data flow between different modules/means/components in an exemplary apparatus.

FIG. 30 is a conceptual data flow diagram 3000 illustrating the data flow between different modules/means/components in an exemplary apparatus 3002. The apparatus may be a network device (e.g., ProSe Function 1012, 1112, 1212, ProSe Function/ENS 2004, 2104). The apparatus includes a receiving module 3004 that receives, from a second UE (e.g., second UE 3060), a message including metadata. The receiving module 3004 further receives a metadata update message from the second UE, the metadata update message including updated metadata. The receiving module 3004 further receives, from a first UE (e.g., first UE 3050), a request for information associated with a discovered second UE (e.g., second UE 3060), the information including location information associated with the second UE. The receiving module 3004 further receives the location information from a second network device (e.g., location server 3070) or from the second UE. The receiving module 3004 further receives a first expression code from a first UE, the first expression code associated with a second UE. The apparatus includes authorization determining module 3006 that determines whether the first UE is authorized to receive the location information. The apparatus includes a location information reporting initiation module 3008 that sends (via transmission module 3016) a message configured to initiate reporting of the location information by the second UE based on the determination and sends the location information to the first UE. The apparatus further includes a message configuring module 3010 that sends (via transmission module 3016), to the first UE, a message including a location-carrying code to be announced by the second UE along with the location information, or a security key to enable determination of the location information to be announced by the second UE. The apparatus further includes an expression code identifying module 3012 that identifies at least a second expression code using the first expression code, the at least a second expression code associated with the second UE. The apparatus further includes metadata determining module 3014 that determines metadata associated with the first expression code. The apparatus further includes transmission module 3016 that sends, to the first UE, the at least a second expression code associated with the second UE. The transmission module 3016 further sends the determined metadata to the first UE.

The apparatus may include additional modules that perform each of the steps of the algorithm in the aforementioned flow charts of FIGS. 24 and 27. As such, each step in the aforementioned flow charts of FIGS. 24 and 27 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 31:
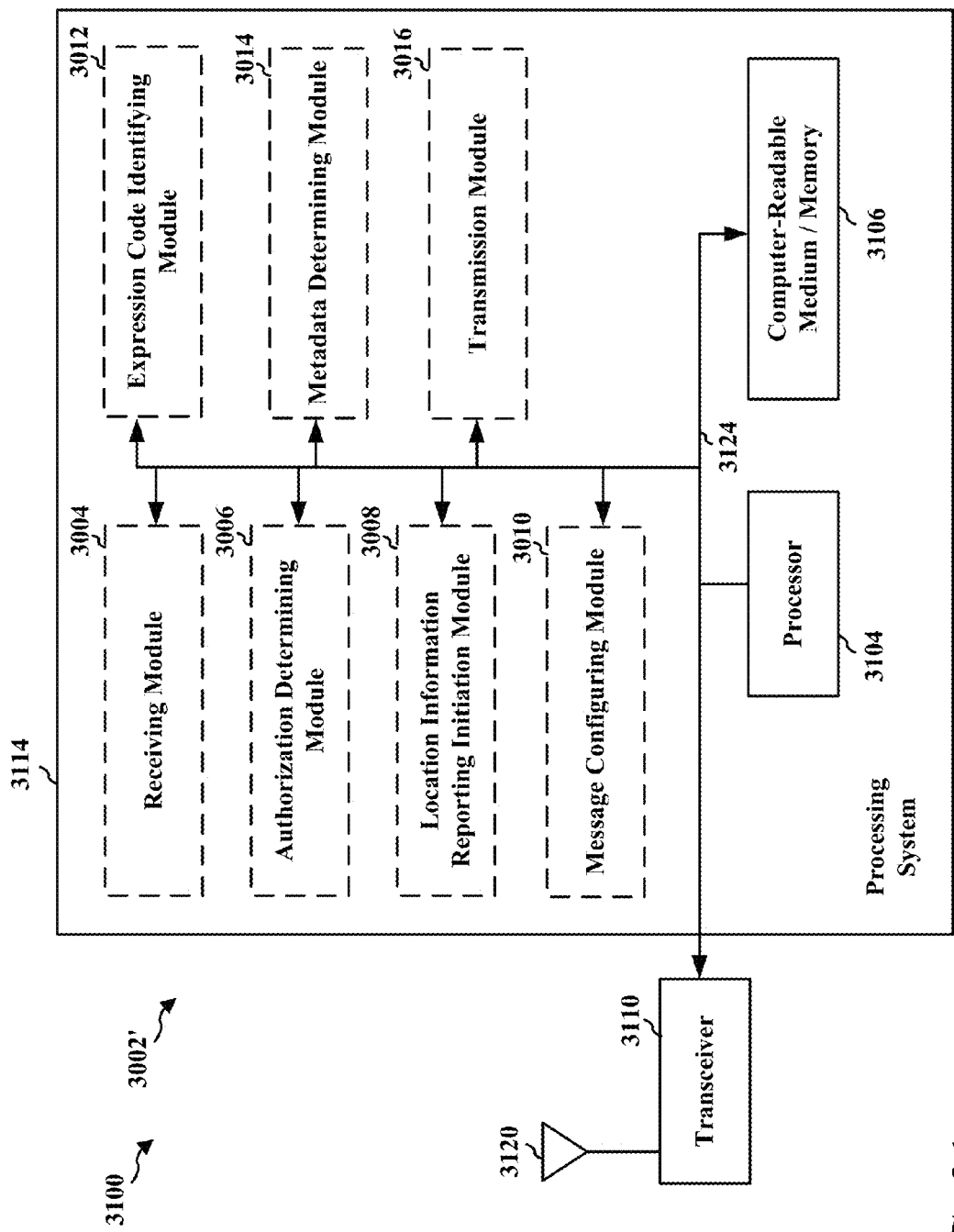
FIG. 31 is a diagram illustrating an example of a hardware implementation for an apparatus employing a processing system.

FIG. 31 is a diagram 3100 illustrating an example of a hardware implementation for an apparatus 3002' employing a processing system 3114. The processing system 3114 may be implemented with a bus architecture, represented generally by the bus 3124. The bus 3124 may include any number of interconnecting buses and bridges depending on the specific application of the processing system 3114 and the overall design constraints. The bus 3124 links together various circuits including one or more processors and/or hardware modules, represented by the processor 3104, the modules 3004, 3006, 3008, 3010, 3012, 3014, and 3016, and the computer-readable medium/memory 3106. The bus 3124 may also link various other circuits such as timing sources, peripherals, voltage regulators, and power management circuits, which are well known in the art, and therefore, will not be described any further.

The processing system 3114 may be coupled to a transceiver 3110. The transceiver 3110 is coupled to one or more antennas 3120. The transceiver 3110 provides a means for communicating with various other apparatus over a transmission medium. The transceiver 3110 receives a signal from the one or more antennas 3120, extracts information from the received signal, and provides the extracted information to the processing system 3114, specifically the reception module 2604. In addition, the transceiver 3110 receives information from the processing system 3114, specifically the transmission module 1512, and based on the received information, generates a signal to be applied to the one or more antennas 3120. The processing system 3114 includes a processor 3104 coupled to a computer-readable medium/memory 3106. The processor 3104 is responsible for general processing, including the execution of software stored on the computer-readable medium/memory 3106. The software, when executed by the processor 3104, causes the processing system 3114 to perform the various functions described supra for any particular apparatus. The computer-readable medium/memory 3106 may also be used for storing data that is manipulated by the processor 3104 when executing software. The processing system further includes at least one of the modules 3004, 3006, 3008, 3010, 3012, 3014, and 3016. The modules may be software modules running in the processor 3104, resident/stored in the computer readable medium/memory 3106, one or more hardware modules coupled to the processor 3104, or some combination thereof. The processing system 3114 may be a component of the eNB 610 and may include the memory 676 and/or at least one of the TX processor 616, the RX processor 670, and the controller/processor 675.

In one configuration, the apparatus 3002/3002' for wireless communication includes means for receiving a first expression code from a first UE, the first expression code associated with a second UE, means for identifying at least a second expression code using the first expression code, the at least a second expression code associated with the second UE, means for sending, to the first UE, the at least a second expression code associated with the second UE, means for receiving, from a first UE, a request for location information associated with a second UE, means for determining whether the first UE is authorized to receive the location information, means for sending a message configured to initiate reporting of the location information by the second UE based on the determination, means for receiving the location information from a second network device or from the second UE, means for sending the location information to the first UE, means for sending, to the first UE, a message comprising a location-carrying code to be announced by the second UE along with the location information, or a security key to enable deciphering of the location information to be announced by the second UE, means for determining metadata associated with the first expression code, and means for sending the determined metadata to the first UE. The aforementioned means may be one or more of the aforementioned modules of the apparatus 3002 and/or the processing system 3114 of the apparatus 3002' configured to perform the functions recited by the aforementioned means. As described supra, the processing system 3114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 32:
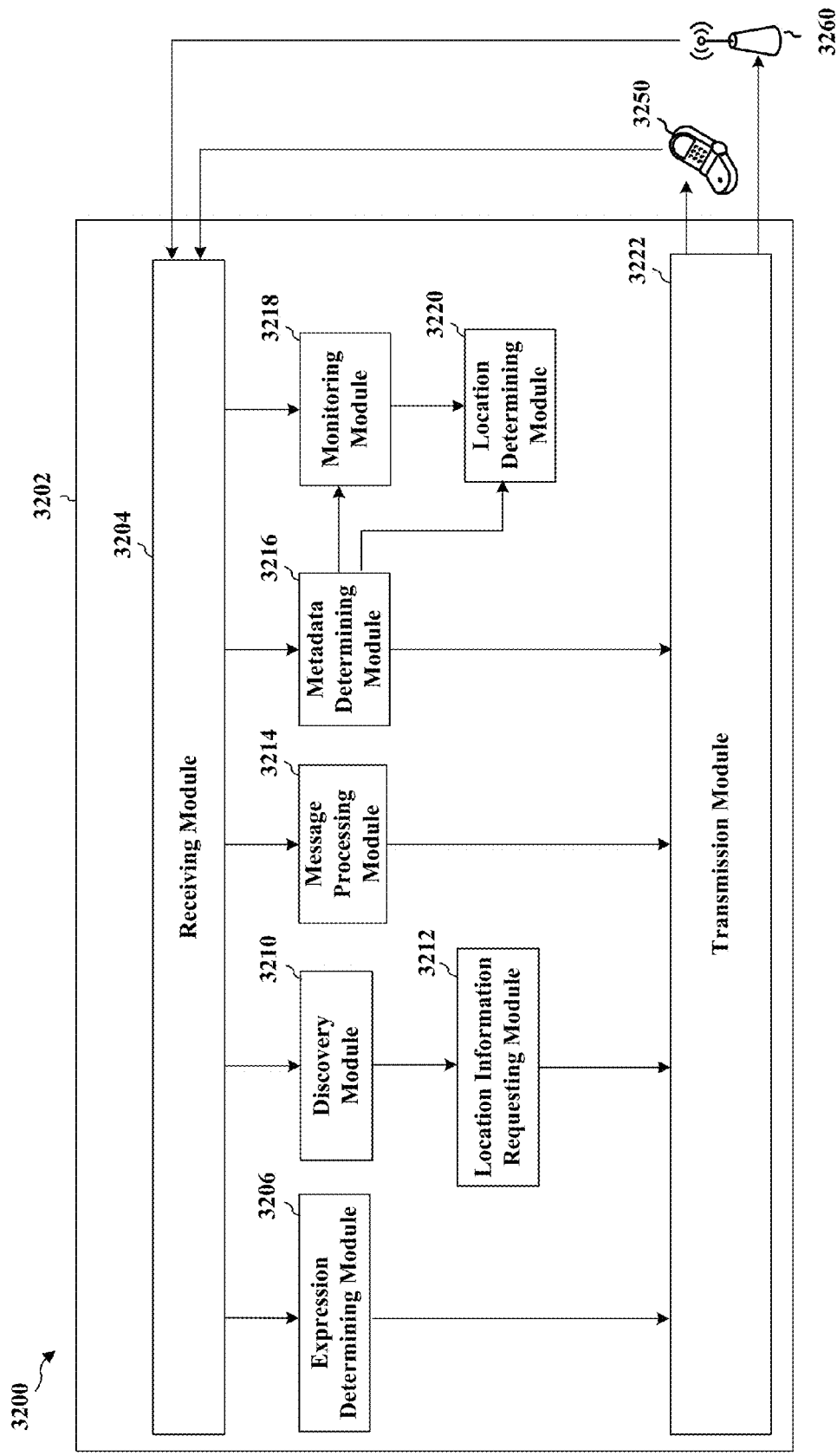
FIG. 32 is a conceptual data flow diagram illustrating the data flow between different modules/means/components in an exemplary apparatus.

FIG. 32 is a conceptual data flow diagram 3200 illustrating the data flow between different modules/means/components in an exemplary apparatus 3202. The apparatus may be a first UE (e.g., UE_B 1004, 1104, 1204, 2106, 2301). The apparatus includes receiving module 3204 that receives, from a network device (e.g., ProSe Function 3260), a message including a location-carrying code to be announced by a second UE (e.g., second UE 3250) along with the location information. The receiving module 3204 further receives, from the network device, a message including a security key to enable determination of the location information to be announced by the second UE. The receiving module 3204 further receives the location information when authorized to receive the location information. The receiving module 3204 further receives, from a second UE, a first signal including a first expression code associated with the second UE. The receiving module 3204 further receives, from a second UE, a first signal comprising a first expression code associated with the second UE. The receiving module 3204 further receives, from the second UE, a third signal comprising a third expression code associated with the second UE. The apparatus further includes an expression determining module 3206 that determines at least a second expression code using the first expression code, the at least a second expression code associated with the second UE. The apparatus further includes a discovery module 3210 that discovers the second UE through a ProSe discovery, BTLE discovery, or WFA NAN discovery. The apparatus further includes a location information requesting module 3212 that sends (via transmission module 3222), to the network device, a request for location information associated with the second UE. The apparatus includes a message processing module 3214 that processes the broadcast message using the location-carrying code or using the security key. The apparatus further includes a metadata determining module 3216 that determines first metadata associated with the first expression code and determines second metadata associated with the third expression code. The apparatus further includes a monitoring module 3218 that monitors for a second signal from the second UE based on the first metadata, the second signal containing a second expression code that includes a first location of the second UE. The apparatus further includes a location determining module 3220 that determines the first location of the second UE from the second expression code using the first metadata and that determines a second location of the second UE from the second metadata.

The apparatus may include additional modules that perform each of the steps of the algorithm in the aforementioned flow charts of FIGS. 25, 26, and 29. As such, each step in the aforementioned flow charts of FIGS. 25, 26, and 29 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 33:
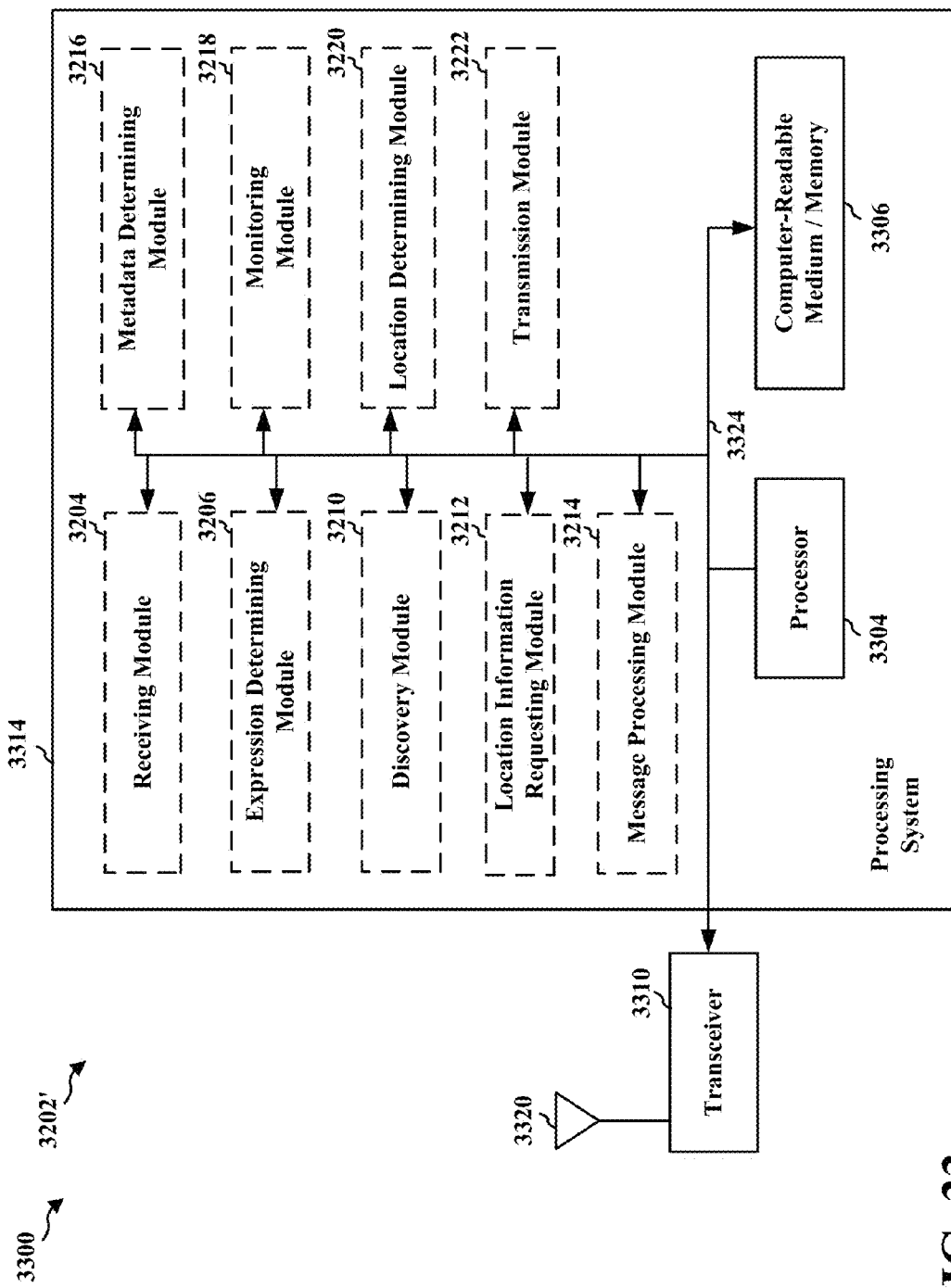
FIG. 33 is a diagram illustrating an example of a hardware implementation for an apparatus employing a processing system.

FIG. 33 is a diagram 3300 illustrating an example of a hardware implementation for an apparatus 3202' employing a processing system 3314. The processing system 3314 may be implemented with a bus architecture, represented generally by the bus 3324. The bus 3324 may include any number of interconnecting buses and bridges depending on the specific application of the processing system 3314 and the overall design constraints. The bus 3324 links together various circuits including one or more processors and/or hardware modules, represented by the processor 3304, the modules 3204, 3206, 3210, 3212, 3214, 3216, 3218, 3220, 3222, and the computer-readable medium/memory 3306. The bus 3324 may also link various other circuits such as timing sources, peripherals, voltage regulators, and power management circuits, which are well known in the art, and therefore, will not be described any further.

The processing system 3314 may be coupled to a transceiver 3310. The transceiver 3310 is coupled to one or more antennas 3320. The transceiver 3310 provides a means for communicating with various other apparatus over a transmission medium. The transceiver 3310 receives a signal from the one or more antennas 3320, extracts information from the received signal, and provides the extracted information to the processing system 3314, specifically the reception module 3204. In addition, the transceiver 3310 receives information from the processing system 3314, specifically the transmission module 3222, and based on the received information, generates a signal to be applied to the one or more antennas 3320. The processing system 3314 includes a processor 3304 coupled to a computer-readable medium/memory 3306. The processor 3304 is responsible for general processing, including the execution of software stored on the computer-readable medium/memory 3306. The software, when executed by the processor 3304, causes the processing system 3314 to perform the various functions described supra for any particular apparatus. The computer-readable medium/memory 3306 may also be used for storing data that is manipulated by the processor 3304 when executing software. The processing system further includes at least one of the modules 3204, 3206, 3210, 3212, 3214, 3216, 3218, 3220, 3222. The modules may be software modules running in the processor 3304, resident/stored in the computer readable medium/memory 3306, one or more hardware modules coupled to the processor 3304, or some combination thereof. The processing system 3314 may be a component of the UE 650 and may include the memory 660 and/or at least one of the TX processor 668, the RX processor 656, and the controller/processor 659.

In one configuration, the apparatus 3202/3202' for wireless communication includes means for receiving, from a second UE, a first signal comprising a first expression code associated with the second UE, means for determining at least a second expression code using the first expression code, the at least a second expression code associated with the second UE, means for discovering a second UE through a ProSe discovery, BTLE discovery, or WFA NAN discovery, means for sending, to a network device, a request for location information associated with the second UE, means for receiving the location information when the first UE is authorized to receive the location information, means for receiving, from the network device, a message comprising a location-carrying code to be announced by the second UE along with the location information, means for processing the broadcast message using the location-carrying code, means for receiving, from the network device, a message comprising the security key to enable deciphering of the location information to be announced by the second UE, means for processing the broadcast message using the security key, means for receiving, from a second UE, a first signal comprising a first expression code associated with the second UE, means for determining first metadata associated with the first expression code, means for monitoring for a second signal from the second UE based on the first metadata, the second signal comprising a second expression code that includes a first location of the second UE, means for determining the first location of the second UE from the second expression code using the first metadata, means for receiving, from the second UE, a third signal comprising a third expression code associated with the second UE, means for determining second metadata associated with the third expression code, means for determining a second location of the second UE from the second metadata.

The aforementioned means may be one or more of the aforementioned modules of the apparatus 3202 and/or the processing system 3314 of the apparatus 3202' configured to perform the functions recited by the aforementioned means. As described supra, the processing system 3314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 34:
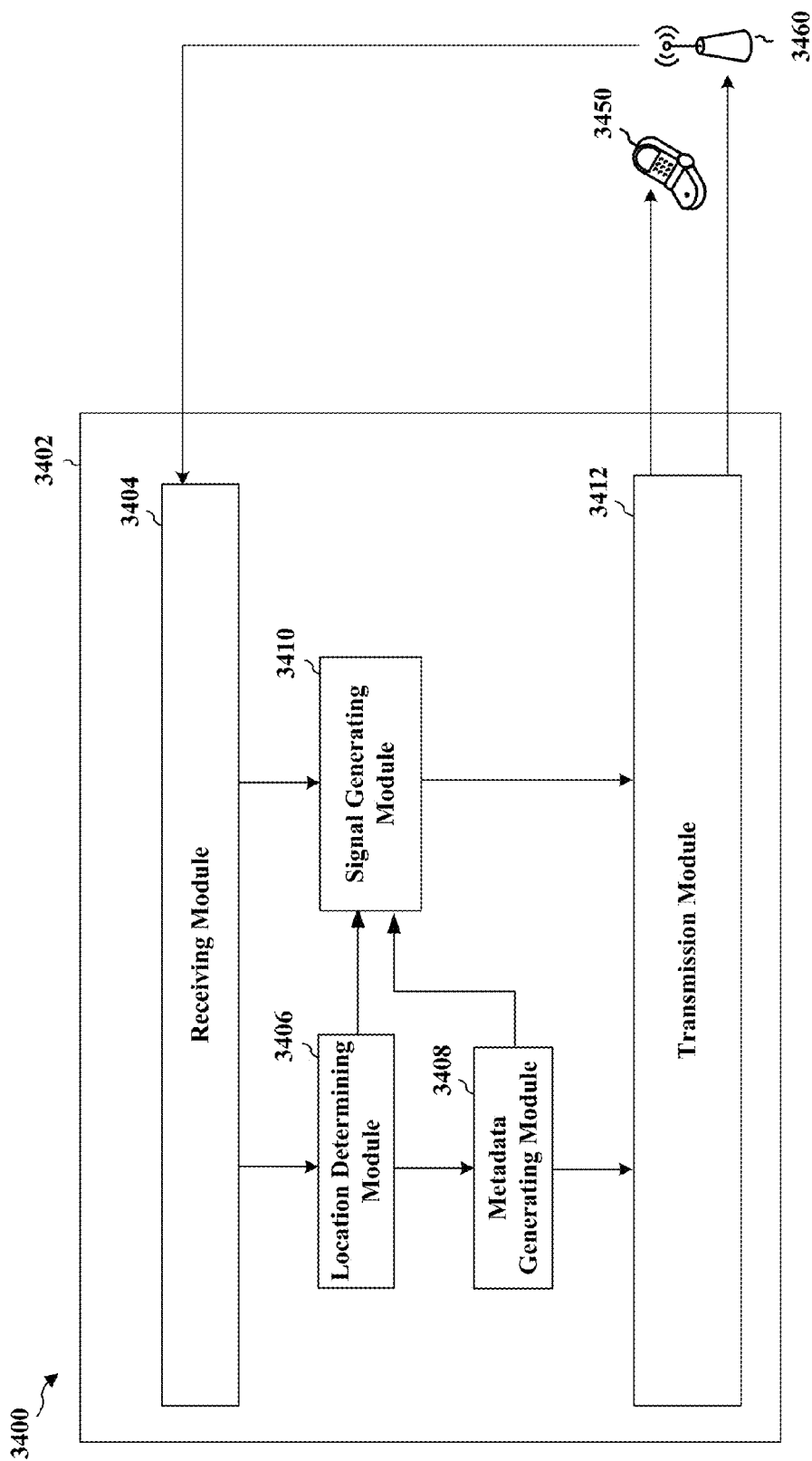
FIG. 34 is a conceptual data flow diagram illustrating the data flow between different modules/means/components in an exemplary apparatus.

FIG. 34 is a conceptual data flow diagram 3400 illustrating the data flow between different modules/means/components in an exemplary apparatus 3402. The apparatus may be an announcing UE (e.g., second UE 1702, 1802, 1902, 2102, 2202, 2302). The apparatus includes a module 3404 that receives transmissions from a network device (e.g., network device 3460), a module 3406 that determines a first location of the announcing UE when the announcing UE is stationary, determines a second location of the announcing UE when the announcing UE is moving, and determines a third location of the announcing UE when the announcing UE is no longer moving. A module 3408 that updates the first metadata stored in the server with second metadata, and that updates the second metadata stored in the server with third metadata, the third metadata indicating the third location. A module 3410 that transmits a first signal comprising a first expression code, the first expression code associated with first metadata stored in a server, the first metadata indicating the first location, transmits a second signal comprising a second expression code, the second expression code associated with the second metadata, transmits a third signal comprising a third expression code, the third expression code indicating the second location, where the second metadata is configured to enable decoding of the third expression code, transmits a fourth signal comprising a fourth expression code, the fourth expression code associated with the third metadata.

The apparatus may include additional modules that perform each of the blocks of the algorithm in the aforementioned flow chart of FIG. 28. As such, each block in the aforementioned flow chart of FIG. 28 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 35:
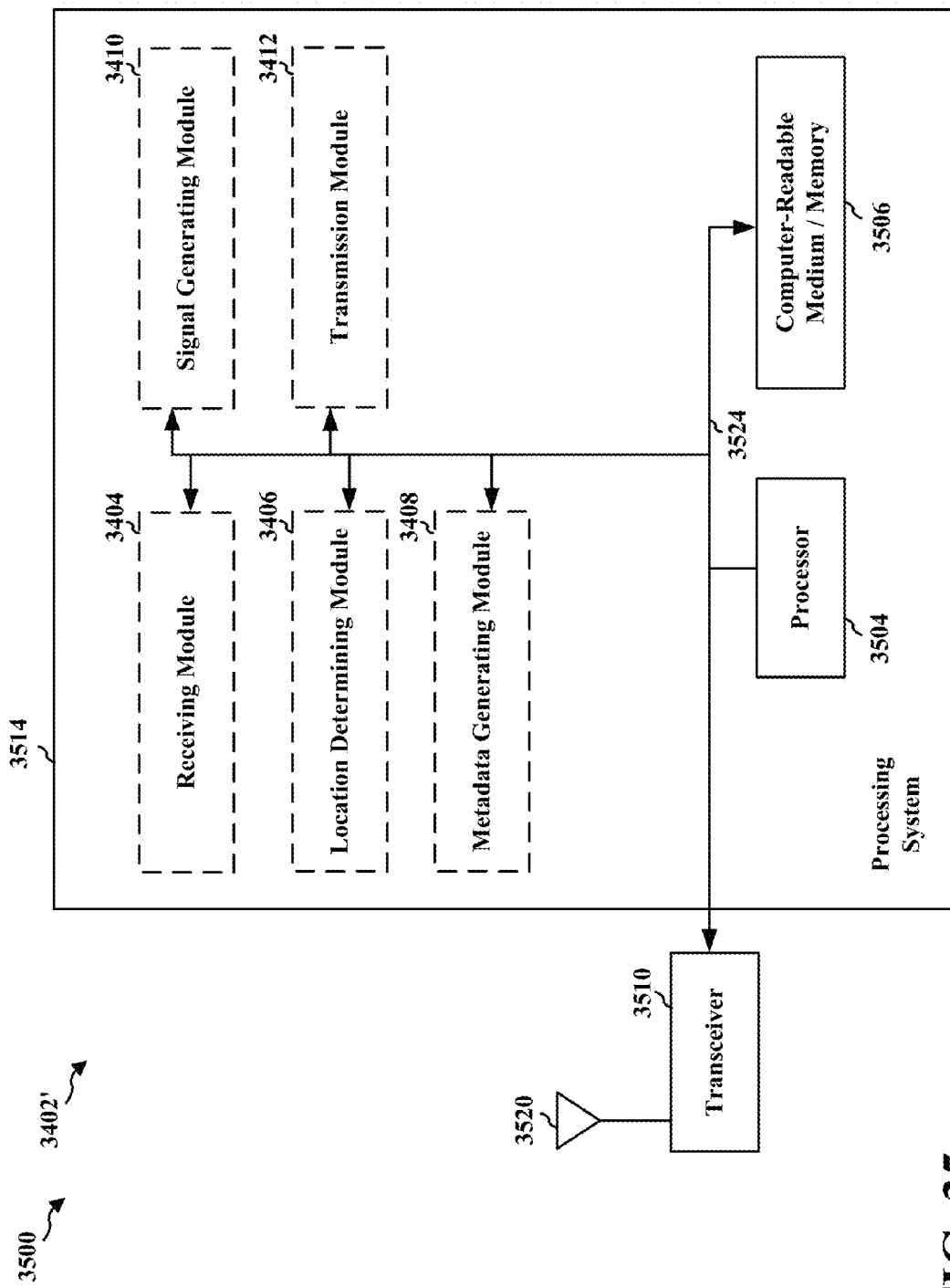
FIG. 35 is a diagram illustrating an example of a hardware implementation for an apparatus employing a processing system.

FIG. 35 is a diagram 3500 illustrating an example of a hardware implementation for an apparatus 3402' employing a processing system 3514. The processing system 3514 may be implemented with a bus architecture, represented generally by the bus 3524. The bus 3524 may include any number of interconnecting buses and bridges depending on the specific application of the processing system 3514 and the overall design constraints. The bus 3524 links together various circuits including one or more processors and/or hardware modules, represented by the processor 3504, the modules 3404, 3406, 3408, 3410, and 3412, and the computer-readable medium/memory 3506. The bus 3524 may also link various other circuits such as timing sources, peripherals, voltage regulators, and power management circuits, which are well known in the art, and therefore, will not be described any further.

The processing system 3514 may be coupled to a transceiver 3510. The transceiver 3510 is coupled to one or more antennas 3520. The transceiver 3510 provides a means for communicating with various other apparatus over a transmission medium. The transceiver 3510 receives a signal from the one or more antennas 3520, extracts information from the received signal, and provides the extracted information to the processing system 3514, specifically the reception module 3404. In addition, the transceiver 3510 receives information from the processing system 3514, specifically the transmission module 3412, and based on the received information, generates a signal to be applied to the one or more antennas 3520. The processing system 3514 includes a processor 3504 coupled to a computer-readable medium/memory 3506. The processor 3504 is responsible for general processing, including the execution of software stored on the computer-readable medium/memory 3506. The software, when executed by the processor 3504, causes the processing system 3514 to perform the various functions described supra for any particular apparatus. The computer-readable medium/memory 3506 may also be used for storing data that is manipulated by the processor 3504 when executing software. The processing system further includes at least one of the modules 3404, 3406, 3408, 3410, and 3412. The modules may be software modules running in the processor 3504, resident/stored in the computer readable medium/memory 3506, one or more hardware modules coupled to the processor 3504, or some combination thereof. The processing system 3514 may be a component of the UE 650 and may include the memory 660 and/or at least one of the TX processor 668, the RX processor 656, and the controller/processor 659.

In one configuration, the apparatus 3402/3402' for wireless communication includes means for means for transmitting a first location of the announcing UE when the announcing UE is stationary, means for transmitting a first signal comprising a first expression code, the first expression code associated with first metadata stored in a server, the first metadata indicating the first location, means for determining a second location of the announcing UE when the announcing UE is moving, means for updating the first metadata stored in the server with second metadata, means for transmitting a second signal comprising a second expression code, the second expression code associated with the second metadata, means for broadcasting a third signal comprising a third expression code, the third expression code indicating the second location, wherein the second metadata is configured to enable decoding of the third expression code, means for determining a third location of the announcing UE when the announcing UE is no longer moving, means for updating the second metadata stored in the server with third metadata, the third metadata indicating the third location, and means for transmitting a fourth signal comprising a fourth expression code, the fourth expression code associated with the third metadata. The aforementioned means may be one or more of the aforementioned modules of the apparatus 3402 and/or the processing system 3514 of the apparatus 3402' configured to perform the functions recited by the aforementioned means. As described supra, the processing system 3514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communication for a network device comprising:
    receiving, from a first user equipment (UE), a request for location information associated with a discovered second UE, the request for location information being a request for a current location of the second UE, the location information comprising the current location of the second UE including GPS coordinates of the second UE;
    determining whether the first UE is authorized to receive the location information;
    sending a message configured to initiate reporting of the location information by the second UE based on the determination; and
    sending a message to the first UE comprising a location-carrying code to be announced by the second UE along with the location information associated with the second UE, or a security key to enable determination of the location information to be announced by the second UE, the second UE being different than the first UE.

2. The method of claim 1, wherein the request for the location information is received in a match report message from the first UE.

3. The method of claim 1, wherein said message to the first UE includes the location-carrying code to be announced by the second UE along with the location information associated with the second UE.

4. The method of claim 1, wherein the message to the first UE includes the security key to enable determination of the location information to be announced by the second UE.

5. The method of claim 1, wherein the network device is a proximity services (ProSe) function server.

6. A method of wireless communication for a first user equipment (UE), comprising:
    discovering a second UE through a proximity service (ProSe) discovery, Bluetooth Low-Energy (BTLE) discovery, or Wi-Fi Alliance Neighbor-aware Networking (WFA NAN) discovery;
    sending, to a network device, a request for location information associated with the second UE, the request for location information being a request for a current location of the second UE, the location information including the current location of the second UE including GPS coordinates of the second UE; and
    receiving a message from the network device comprising a location-carrying code to be announced by the second UE along with the location information associated with the second UE, or a security key to enable determination of the location information to be announced by the second UE, the second UE being different than the first UE.

7. The method of claim 6, wherein the request for the location information is sent to the network device in a match report message.

8. The method of claim 6, further comprising:
    receiving the location information when the first UE is authorized to receive the location information associated with the second UE.

9. The method of claim 8, wherein the location information is received from the second UE in a broadcast message,
    wherein said message from the network device includes the location-carrying code to be announced by the second UE along with the location information; and
    wherein the method further comprises processing the broadcast message using the location-carrying code, said processing the broadcast message including using the location-carrying code to retrieve the location information associated with the second UE.

10. The method of claim 8, wherein the location information is received from the second UE in a broadcast message, the location information being protected with the security key,
    wherein said message from the network device includes the security key; and
    wherein the method further comprises processing the broadcast message announced by the second UE using the security key to determine the location information.

11. The method of claim 6, wherein the network device is a proximity services (ProSe) function server.

12. A network device, comprising:
    a memory; and
    at least one processor coupled to the memory and configured to:
        receive, from a first user equipment (UE), a request for location information associated with a discovered second UE, the request for location information being a request for a current location of the second UE, the location information comprising the current location of the second UE including GPS coordinates of the second UE;
        determine whether the first UE is authorized to receive the location information;
        send a message configured to initiate reporting of the location information by the second UE based on the determination; and
        send a message to the first UE comprising a location-carrying code to be announced by the second UE along with the location information associated with the second UE, or a security key to enable determination of the location information to be announced by the second UE, the second UE being different than the first UE.

13. The network device of claim 12, wherein the request for the location information is received in a match report message from the first UE.

14. The network device of claim 12, wherein said message to the first UE includes the location-carrying code to be announced by the second UE along with the location information.

15. The network device of claim 12, wherein the message to the first UE includes the security key to enable determination of the location information to be announced by the second UE.

16. The network device of claim 14, wherein the network device is a proximity services (ProSe) function server.

17. A first user equipment (UE), comprising:
    a memory; and
    at least one processor coupled to the memory and configured to:
        discover a second UE through a proximity service (ProSe) discovery, Bluetooth Low-Energy (BTLE) discovery, or Wi-Fi Alliance Neighbor-aware Networking (WFA NAN) discovery;
        send, to a network device, a request for location information associated with the second UE, the request for location information being a request for a current location of the second UE, the location information including the current location of the second UE including GPS coordinates of the second UE; and receive a message from the network device comprising a location-carrying code to be announced by the second UE along with the location information associated with the second UE, or a security key to enable determination of the location information to be announced by the second UE, the second UE being different than the first UE.

18. The first UE of claim 17, wherein the request for the location information is sent to the network device in a match report message.

19. The first UE of claim 17, wherein the at least one processor is further configured to:
receive the location information when the first UE is authorized to receive the location information.

20. The first UE of claim 19, wherein the location information is received from the second UE in a broadcast message,
wherein said message from the network device includes the location-carrying code to be announced by the second UE along with the location information; and
wherein the at least one processor is further configured to process the broadcast message using the location-carrying code, processing the broadcast message including using the location-carrying code to retrieve the location information associated with the second UE.

21. The first UE of claim 19, wherein the location information is received from the second UE in a broadcast message, the location information being protected with the security key,
wherein said message from the network device includes the security key; and
wherein the at least one processor is further configured to process the broadcast message announced by the second UE using the security key to determine the location information.

22. The first UE of claim 17, wherein the network device is a proximity services (ProSe) function server.

* * * * *